(12) United States Patent
ChoFleming, Jr. et al.

(10) Patent No.: US 11,029,927 B2
(45) Date of Patent: Jun. 8, 2021

(54) METHODS AND APPARATUS TO DETECT AND ANNOTATE BACKEDGES IN A DATAFLOW GRAPH

(71) Applicant: Intel Corporation, Santa Clara, CA (US)

(72) Inventors: Kermin E. ChoFleming, Jr., Hudson, MA (US); Jesmin Jahan Tithi, San Jose, CA (US); Joshua Cranmer, Hudson, MA (US); Suresh Srinivasan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/370,935

(22) Filed: Mar. 30, 2019

(65) Prior Publication Data

US 2019/0227777 A1 Jul. 25, 2019

(51) Int. Cl.
*G06F 8/34* (2018.01)
*G06F 9/448* (2018.01)
*G06F 8/41* (2018.01)
*G06F 15/82* (2006.01)

(52) U.S. Cl.
CPC .............. *G06F 8/34* (2013.01); *G06F 8/433* (2013.01); *G06F 8/443* (2013.01); *G06F 9/4494* (2018.02); *G06F 15/82* (2013.01)

(58) Field of Classification Search
CPC .......... G06F 8/34; G06F 9/4494; G06F 8/433; G06F 8/443; G06F 15/82
USPC ...................................................... 717/109
See application file for complete search history.

(56) References Cited

U.S. PATENT DOCUMENTS

| 5,093,920 A | 3/1992 | Agrawal et al. |
| 5,560,032 A | 9/1996 | Nguyen et al. |
| 5,574,944 A | 11/1996 | Stager |
| 5,581,767 A | 12/1996 | Katsuki et al. |

(Continued)

FOREIGN PATENT DOCUMENTS

| EP | 2660716 | 11/2013 |
| EP | 2854026 | 4/2015 |

(Continued)

OTHER PUBLICATIONS

Bouakaz et al, "Symbolic Analyses of Dataflow Graphs", [Online], 2017, pp. 1-25, [Retrieved from internet on Jul. 8, 2020], <https://dl.acm.org/doi/pdf/10.1145/3007898> (Year: 2017).*

(Continued)

*Primary Examiner* — Geoffrey R St Leger
*Assistant Examiner* — Zengpu Wei
(74) *Attorney, Agent, or Firm* — Hanley, Flight & Zimmerman, LLC

(57) ABSTRACT

Disclosed examples to detect and annotate backedges in data-flow graphs include: a characteristic detector to store a node characteristic identifier in memory in association with a first node of a dataflow graph; a characteristic comparator to compare the node characteristic identifier with a reference criterion; and a backedge identifier generator to generate a backedge identifier indicative of a backedge between the first node and a second node of the dataflow graph based on the comparison, the memory to store the backedge identifier in association with a connection arc between the first and second nodes.

24 Claims, 16 Drawing Sheets

(56) References Cited

U.S. PATENT DOCUMENTS

| | | |
|---|---|---|
| 5,655,096 A | 8/1997 | Branigin |
| 5,787,029 A | 7/1998 | de Angel |
| 5,805,827 A | 9/1998 | Chau et al. |
| 5,930,484 A | 7/1999 | Tran et al. |
| 5,933,429 A | 8/1999 | Bubenik et al. |
| 6,020,139 A | 2/2000 | Schwartz et al. |
| 6,088,780 A | 7/2000 | Yamada et al. |
| 6,141,747 A | 10/2000 | Witt |
| 6,205,533 B1 | 3/2001 | Margolus |
| 6,314,503 B1 | 11/2001 | D'Errico et al. |
| 6,393,454 B1 | 5/2002 | Chu |
| 6,393,536 B1 | 5/2002 | Hughes et al. |
| 6,460,131 B1 | 10/2002 | Trimberger |
| 6,553,448 B1 | 4/2003 | Mannion |
| 6,553,482 B1 | 4/2003 | Witt |
| 6,604,120 B1 | 8/2003 | De Angel |
| 6,615,333 B1 | 9/2003 | Hoogerbrugge et al. |
| 6,725,364 B1 | 4/2004 | Crabill |
| 6,728,945 B1 | 4/2004 | Wang |
| 7,000,072 B1 | 2/2006 | Aisaka et al. |
| 7,181,578 B1 | 2/2007 | Guha et al. |
| 7,203,936 B2 | 4/2007 | Gillies et al. |
| 7,257,665 B2 | 8/2007 | Niell et al. |
| 7,290,096 B2 | 10/2007 | Jeter, Jr. et al. |
| 7,379,067 B2 | 5/2008 | Deering et al. |
| 7,380,108 B1 | 5/2008 | Uht et al. |
| 7,486,678 B1 | 2/2009 | Devanagondi et al. |
| 7,509,484 B1 | 3/2009 | Golla et al. |
| 7,546,331 B2 | 6/2009 | Islam |
| 7,630,324 B2 | 12/2009 | Li et al. |
| 7,660,911 B2 | 2/2010 | McDaniel |
| 7,817,652 B1 | 10/2010 | MacAdam et al. |
| 7,911,960 B1 | 3/2011 | Aydemir et al. |
| 7,936,753 B1 | 5/2011 | Colloff et al. |
| 7,987,479 B1 | 7/2011 | Day |
| 8,001,510 B1 | 8/2011 | Miller et al. |
| 8,010,766 B2 | 8/2011 | Bhattacharjee et al. |
| 8,055,880 B2 | 11/2011 | Fujisawa et al. |
| 8,156,284 B2 | 4/2012 | Vorbach et al. |
| 8,160,975 B2 | 4/2012 | Tang et al. |
| 8,225,073 B2 | 7/2012 | Master et al. |
| 8,356,162 B2 | 1/2013 | Muff et al. |
| 8,495,341 B2 | 7/2013 | Busaba et al. |
| 8,561,194 B2 | 10/2013 | Lee |
| 8,578,117 B2 | 11/2013 | Burda et al. |
| 8,619,800 B1 | 12/2013 | Finney et al. |
| 8,812,820 B2 | 8/2014 | Vorbach et al. |
| 8,935,515 B2 | 1/2015 | Colavin et al. |
| 8,966,457 B2 | 2/2015 | Ebcioglu et al. |
| 8,990,452 B2 | 3/2015 | Branson et al. |
| 9,026,769 B1 | 5/2015 | Jamil et al. |
| 9,104,474 B2 | 8/2015 | Kaul et al. |
| 9,110,846 B2 | 8/2015 | Buchheit et al. |
| 9,135,057 B2 | 9/2015 | Branson et al. |
| 9,170,846 B2 | 10/2015 | Delling et al. |
| 9,213,571 B2 | 12/2015 | Ristovski et al. |
| 9,268,528 B2 | 2/2016 | Tannenbaum et al. |
| 9,285,860 B2 | 3/2016 | Hofmann |
| 9,473,144 B1 | 10/2016 | Thiagarajan et al. |
| 9,594,521 B2 | 3/2017 | Blagodurov et al. |
| 9,696,928 B2 | 4/2017 | Cain, III et al. |
| 9,658,676 B1 | 5/2017 | Witek et al. |
| 9,760,291 B2 | 9/2017 | Beale et al. |
| 9,762,563 B2 | 9/2017 | Davis et al. |
| 9,847,783 B1 | 12/2017 | Teh et al. |
| 9,886,072 B1 | 2/2018 | Venkataraman |
| 9,916,187 B2 * | 3/2018 | Schmid ............... G06F 16/24 |
| 9,923,905 B2 | 3/2018 | Amiri et al. |
| 9,946,718 B2 | 4/2018 | Bowman et al. |
| 10,108,417 B2 | 10/2018 | Krishna et al. |
| 10,120,685 B2 * | 11/2018 | Chen .................. G06F 15/7867 |
| 10,187,467 B2 | 1/2019 | Nagai |
| 10,331,583 B2 | 6/2019 | Ahsan et al. |
| 10,346,145 B2 * | 7/2019 | Zhang ................. G06F 8/37 |
| 10,474,375 B2 | 11/2019 | Fleming, Jr. et al. |
| 10,558,575 B2 | 2/2020 | Fleming, Jr. et al. |
| 10,572,376 B2 | 2/2020 | Fleming, Jr. et al. |
| 2002/0026493 A1 | 2/2002 | Scardamalia et al. |
| 2002/0090751 A1 | 7/2002 | Grigg et al. |
| 2002/0103943 A1 | 8/2002 | Lo et al. |
| 2002/0178285 A1 | 11/2002 | Donaldson et al. |
| 2002/0184291 A1 | 12/2002 | Hogenauer |
| 2003/0023830 A1 | 1/2003 | Hogenauer |
| 2003/0028750 A1 | 2/2003 | Hogenauer |
| 2003/0120802 A1 | 6/2003 | Kohno |
| 2003/0126233 A1 | 7/2003 | Bryers et al. |
| 2003/0163649 A1 | 8/2003 | Kapur et al. |
| 2003/0177320 A1 | 9/2003 | Sah et al. |
| 2003/0225814 A1 | 12/2003 | Saito et al. |
| 2003/0233643 A1 | 12/2003 | Thompson et al. |
| 2004/0001458 A1 | 1/2004 | Dorenbosch et al. |
| 2004/0022094 A1 | 2/2004 | Radhakrishnan et al. |
| 2004/0022107 A1 | 2/2004 | Zaidi et al. |
| 2004/0124877 A1 | 7/2004 | Parkes |
| 2004/0128401 A1 | 7/2004 | Fallon et al. |
| 2004/0263524 A1 | 12/2004 | Lippincott |
| 2005/0025120 A1 | 2/2005 | O'Toole et al. |
| 2005/0076187 A1 | 4/2005 | Claydon |
| 2005/0108776 A1 | 5/2005 | Carver et al. |
| 2005/0134308 A1 | 6/2005 | Okada et al. |
| 2005/0138323 A1 | 6/2005 | Snyder |
| 2005/0166038 A1 | 7/2005 | Wang et al. |
| 2005/0172103 A1 | 8/2005 | Inuo et al. |
| 2005/0223131 A1 | 10/2005 | Goekjian et al. |
| 2006/0041872 A1 | 2/2006 | Poznanovic et al. |
| 2006/0101237 A1 | 5/2006 | Mohl et al. |
| 2006/0130030 A1 | 6/2006 | Kwiat et al. |
| 2006/0179255 A1 | 8/2006 | Yamazaki |
| 2006/0179429 A1 | 8/2006 | Eggers et al. |
| 2006/0200647 A1 | 9/2006 | Cohen |
| 2006/0236008 A1 | 10/2006 | Asano et al. |
| 2007/0011436 A1 | 1/2007 | Bittner, Jr. |
| 2007/0033369 A1 | 2/2007 | Kasama et al. |
| 2007/0079036 A1 | 4/2007 | Mukherjee |
| 2007/0118332 A1 | 5/2007 | Meyers et al. |
| 2007/0143546 A1 | 6/2007 | Narad |
| 2007/0180315 A1 | 8/2007 | Aizawa |
| 2007/0203967 A1 | 8/2007 | Dockser |
| 2007/0204137 A1 | 8/2007 | Tran |
| 2007/0226458 A1 | 9/2007 | Stuttard et al. |
| 2007/0266223 A1 | 11/2007 | Nguyen |
| 2007/0276976 A1 | 11/2007 | Gower et al. |
| 2007/0299980 A1 | 12/2007 | Amini et al. |
| 2008/0072113 A1 | 3/2008 | Tsang et al. |
| 2008/0082794 A1 | 4/2008 | Yu et al. |
| 2008/0133889 A1 | 6/2008 | Glew |
| 2008/0133895 A1 | 6/2008 | Sivtsov et al. |
| 2008/0155135 A1 | 6/2008 | Garg et al. |
| 2008/0184255 A1 | 7/2008 | Watanabe et al. |
| 2008/0218203 A1 | 9/2008 | Arriens et al. |
| 2008/0263330 A1 | 10/2008 | May et al. |
| 2008/0270689 A1 | 10/2008 | Gotoh |
| 2008/0307258 A1 | 12/2008 | Challenger et al. |
| 2009/0013329 A1 | 1/2009 | May et al. |
| 2009/0037697 A1 | 2/2009 | Ramani et al. |
| 2009/0063665 A1 | 3/2009 | Bagepalli et al. |
| 2009/0113169 A1 | 4/2009 | Yang et al. |
| 2009/0119456 A1 | 5/2009 | Park et al. |
| 2009/0119484 A1 | 5/2009 | Mohl et al. |
| 2009/0175444 A1 | 7/2009 | Douglis et al. |
| 2009/0182993 A1 | 7/2009 | Fant |
| 2009/0300324 A1 | 12/2009 | Inuo |
| 2009/0300325 A1 | 12/2009 | Paver et al. |
| 2009/0300388 A1 | 12/2009 | Mantor et al. |
| 2009/0309884 A1 | 12/2009 | Lippincott et al. |
| 2009/0328048 A1 | 12/2009 | Khan et al. |
| 2010/0017761 A1 | 1/2010 | Higuchi et al. |
| 2010/0115168 A1 | 5/2010 | Bekooij |
| 2010/0180105 A1 | 7/2010 | Asnaashari |
| 2010/0191911 A1 | 7/2010 | Heddes et al. |
| 2010/0217915 A1 | 8/2010 | O'Connor et al. |
| 2010/0228885 A1 | 9/2010 | McDaniel |
| 2010/0254262 A1 | 10/2010 | Kantawala et al. |
| 2010/0262721 A1 | 10/2010 | Asnaashari et al. |

(56) References Cited

U.S. PATENT DOCUMENTS

| | | |
|---|---|---|
| 2010/0302946 A1 | 12/2010 | Yang et al. |
| 2011/0004742 A1 | 1/2011 | Hassan |
| 2011/0008300 A1 | 1/2011 | Wouters et al. |
| 2011/0040822 A1 | 2/2011 | Eichenberger et al. |
| 2011/0083000 A1 | 4/2011 | Rhoades et al. |
| 2011/0099295 A1 | 4/2011 | Wegener |
| 2011/0107337 A1 | 5/2011 | Cambonie |
| 2011/0145799 A1 | 6/2011 | Bartolomeo |
| 2011/0202747 A1 | 8/2011 | Busaba et al. |
| 2011/0292708 A1 | 12/2011 | Kang et al. |
| 2011/0302358 A1 | 12/2011 | Yu et al. |
| 2011/0314238 A1 | 12/2011 | Finkler et al. |
| 2011/0320724 A1 | 12/2011 | Mejdrich et al. |
| 2012/0017066 A1 | 1/2012 | Vorbach et al. |
| 2012/0066483 A1 | 3/2012 | Boury et al. |
| 2012/0079168 A1 | 3/2012 | Chou et al. |
| 2012/0089812 A1 | 4/2012 | Smith |
| 2012/0124117 A1 | 5/2012 | Yu et al. |
| 2012/0126851 A1 | 5/2012 | Kelem et al. |
| 2012/0144126 A1 | 6/2012 | Nimmala et al. |
| 2012/0174118 A1 | 7/2012 | Watanabe et al. |
| 2012/0239853 A1 | 9/2012 | Moshayedi |
| 2012/0260239 A1 | 10/2012 | Martinez Canedo et al. |
| 2012/0278543 A1 | 11/2012 | Yu et al. |
| 2012/0278587 A1 | 11/2012 | Caufield et al. |
| 2012/0303932 A1 | 11/2012 | Farabet et al. |
| 2012/0303933 A1 | 11/2012 | Manet et al. |
| 2012/0317388 A1 | 12/2012 | Driever et al. |
| 2012/0324180 A1 | 12/2012 | Asnaashari et al. |
| 2012/0330701 A1 | 12/2012 | Hyder et al. |
| 2013/0021058 A1 | 1/2013 | Huang et al. |
| 2013/0024875 A1 | 1/2013 | Wang et al. |
| 2013/0036287 A1 | 2/2013 | Chu et al. |
| 2013/0067138 A1 | 3/2013 | Schuette et al. |
| 2013/0080652 A1 | 3/2013 | Cradick et al. |
| 2013/0080993 A1 | 3/2013 | Stravers et al. |
| 2013/0081042 A1 | 3/2013 | Branson et al. |
| 2013/0125127 A1 | 5/2013 | Mital et al. |
| 2013/0145203 A1 | 6/2013 | Fawcett et al. |
| 2013/0151919 A1 | 6/2013 | Huynh |
| 2013/0166879 A1 | 6/2013 | Sun et al. |
| 2013/0315211 A1 | 11/2013 | Balan et al. |
| 2014/0032860 A1 | 1/2014 | Yamada et al. |
| 2014/0098890 A1 | 4/2014 | Sermadevi et al. |
| 2014/0115300 A1 | 4/2014 | Bodine |
| 2014/0188968 A1 | 7/2014 | Kaul et al. |
| 2014/0215189 A1 | 7/2014 | Airaud et al. |
| 2014/0281409 A1 | 9/2014 | Abdallah et al. |
| 2014/0380024 A1 | 12/2014 | Spadini et al. |
| 2015/0007182 A1 | 1/2015 | Rossbach et al. |
| 2015/0026434 A1 | 1/2015 | Basant et al. |
| 2015/0033001 A1 | 1/2015 | Ivanov |
| 2015/0067305 A1 | 3/2015 | Olson et al. |
| 2015/0082011 A1 | 3/2015 | Mellinger et al. |
| 2015/0082075 A1 | 3/2015 | Denman et al. |
| 2015/0089162 A1 | 3/2015 | Ahsan et al. |
| 2015/0089186 A1 | 3/2015 | Kim et al. |
| 2015/0100757 A1 | 4/2015 | Burger et al. |
| 2015/0106596 A1 | 4/2015 | Vorbach et al. |
| 2015/0113184 A1 | 4/2015 | Stanford-Jason et al. |
| 2015/0188847 A1 | 7/2015 | Chopra et al. |
| 2015/0220345 A1 | 8/2015 | Corbal et al. |
| 2015/0261528 A1 | 9/2015 | Ho et al. |
| 2015/0268963 A1 | 9/2015 | Etsion et al. |
| 2015/0317134 A1 | 11/2015 | Kim et al. |
| 2015/0379670 A1 | 12/2015 | Koker et al. |
| 2016/0062736 A1* | 3/2016 | Stanfill ............... G06F 9/4494 717/105 |
| 2016/0062737 A1* | 3/2016 | Stanfill ............... G06F 3/0482 717/105 |
| 2016/0077568 A1 | 3/2016 | Kandula et al. |
| 2016/0098279 A1 | 4/2016 | Glew |
| 2016/0098420 A1 | 4/2016 | Dickie et al. |
| 2016/0117358 A1* | 4/2016 | Schmid ............... G06F 16/24 707/736 |
| 2016/0239265 A1 | 8/2016 | Duong et al. |
| 2017/0031866 A1 | 2/2017 | Nowatzki et al. |
| 2017/0062075 A1 | 3/2017 | Barber et al. |
| 2017/0083313 A1 | 3/2017 | Sankaralingam et al. |
| 2017/0092371 A1 | 3/2017 | Harari |
| 2017/0123795 A1* | 5/2017 | Chen ................. G06F 15/7867 |
| 2017/0163543 A1 | 6/2017 | Wang et al. |
| 2017/0255414 A1 | 9/2017 | Gerhart et al. |
| 2017/0262383 A1 | 9/2017 | Lee et al. |
| 2017/0286169 A1 | 10/2017 | Ravindran et al. |
| 2017/0293766 A1 | 10/2017 | Schnjakin et al. |
| 2017/0315815 A1 | 11/2017 | Smith et al. |
| 2017/0315978 A1 | 11/2017 | Boucher et al. |
| 2017/0371836 A1 | 12/2017 | Langhammer |
| 2018/0081806 A1 | 3/2018 | Kothinti Naresh et al. |
| 2018/0081834 A1 | 3/2018 | Wang et al. |
| 2018/0088647 A1 | 3/2018 | Suryanarayanan et al. |
| 2018/0095728 A1 | 4/2018 | Hasenplaugh et al. |
| 2018/0113797 A1 | 4/2018 | Breslow et al. |
| 2018/0218767 A1 | 4/2018 | Wolff |
| 2018/0188983 A1 | 7/2018 | Fleming, Jr. et al. |
| 2018/0188997 A1 | 7/2018 | Fleming, Jr. et al. |
| 2018/0189063 A1 | 7/2018 | Fleming et al. |
| 2018/0189231 A1 | 7/2018 | Fleming et al. |
| 2018/0189239 A1 | 7/2018 | Nurvitadhi et al. |
| 2018/0189675 A1 | 7/2018 | Nurvitadhi et al. |
| 2018/0248994 A1 | 8/2018 | Lee et al. |
| 2018/0285385 A1 | 10/2018 | West et al. |
| 2018/0293162 A1 | 10/2018 | Tsai et al. |
| 2018/0300181 A1 | 10/2018 | Hetzel et al. |
| 2018/0316760 A1 | 11/2018 | Chernin et al. |
| 2018/0332342 A1 | 11/2018 | Wu et al. |
| 2018/0336020 A1* | 11/2018 | Berg ................. G06F 16/9024 |
| 2018/0365181 A1 | 12/2018 | Cottam et al. |
| 2018/0373509 A1* | 12/2018 | Zhang ................ G06F 8/443 |
| 2019/0004878 A1 | 1/2019 | Adler et al. |
| 2019/0004945 A1 | 1/2019 | Fleming et al. |
| 2019/0004955 A1 | 1/2019 | Adler et al. |
| 2019/0004994 A1 | 1/2019 | Fleming et al. |
| 2019/0005161 A1 | 1/2019 | Fleming et al. |
| 2019/0007332 A1 | 1/2019 | Fleming et al. |
| 2019/0018815 A1 | 1/2019 | Fleming et al. |
| 2019/0042217 A1 | 2/2019 | Glossop et al. |
| 2019/0042218 A1 | 2/2019 | Zhang |
| 2019/0042513 A1 | 2/2019 | Fleming, Jr. et al. |
| 2019/0089354 A1 | 3/2019 | Venugopal et al. |
| 2019/0095369 A1 | 3/2019 | Fleming et al. |
| 2019/0095383 A1 | 3/2019 | Fleming et al. |
| 2019/0101952 A1 | 4/2019 | Diamond et al. |
| 2019/0102179 A1 | 4/2019 | Fleming et al. |
| 2019/0102338 A1 | 4/2019 | Tang et al. |
| 2019/0129720 A1 | 5/2019 | Ivanov |
| 2019/0205263 A1 | 7/2019 | Fleming et al. |
| 2019/0205269 A1 | 7/2019 | Fleming, Jr. et al. |
| 2019/0205284 A1 | 7/2019 | Fleming et al. |
| 2019/0229996 A1 | 7/2019 | ChoFleming, Jr. et al. |
| 2019/0303153 A1 | 10/2019 | Halpern et al. |
| 2019/0303168 A1 | 10/2019 | Fleming, Jr. et al. |
| 2019/0303263 A1 | 10/2019 | Fleming, Jr. et al. |
| 2019/0303297 A1 | 10/2019 | Fleming, Jr. et al. |
| 2019/0303312 A1 | 10/2019 | Ahsan et al. |

FOREIGN PATENT DOCUMENTS

| | | |
|---|---|---|
| RU | 2374684 | 11/2009 |
| WO | 89/01203 | 2/1989 |
| WO | 2007031696 WO | 3/2007 |
| WO | 2014035449 | 3/2014 |
| WO | 2015/044696 | 4/2015 |

OTHER PUBLICATIONS

Kim et al, "Applying dataflow analysis to detecting software vulnerability", [Online], 2008, pp. 255-258, [Retrieved from internet on Jul. 8, 2020], <https://ieeexplore.ieee.org/stamp/stamp.jsp?tp=&arnumber=4493756> (Year: 2008).*

(56) References Cited

OTHER PUBLICATIONS

Cooper et al, "An empirical study of iterative data-flow analysis", [Online], 2006, pp. 1-8, [Retrieved from internet on Jul. 8, 2020], <https://ieeexplore.ieee.org/stamp/stamp.jsp?tp=&arnumber=4023820> (Year: 2006).*
Gao Guang Rong, "A Pipelined Code Mapping Scheme for Static Data Flow Computers," PhD Thesis, Massachusetts Institute of Technology, Jan. 27, 1987 (253 pages).
Wikichip, "Configurable Spatial Accelerator (CSA)—Intel," available Mar. 5, 2019 (8 pages) [https://en.wikichip.org/w/index.php?title=intel/configurable_spatial_accelerator&oldid=83060].
Ball, "What's in a Region?" ACM Letters on Programming Languages and Systems (LOPLAS), vol. 2, Nos. 1-4, pp. 1-16, 1993 (16 pages).
CORAL Collaboration: Oak Ridge, Argonne, Livermore, "Benchmark Codes," available Jun. 19, 2014, (6 pages), retrieved from the Internet on Oct. 31, 2019 [https://asc.llnl.gov/CORAL-benchmarks/].
Fleming, "Scalable Reconfigurable Computing Leveraging Latency-Insensitive Channels," Phd Thesis, Massachusetts Institute of Technology, Apr. 2, 2013 (197 pages).
Shuo-Li, "Case Study: Computing Black-Scholes with Intel Advanced Vector Extensions," Intel Software Developer Zone, Jan. 2, 2015 (16 pages).
McCalpin, "Memory Bandwidth and Machine Balance in High Performance Computers," IEEE Technical Committee on Computer Architecture (TCCA) Newsletter, pp. 1-7, 1995 (7 pages).
McCalpin, "Stream: Sustainable Memory Bandwidth in High Performance Computers," 2016 (5 pages), retrieved from the Internet Nov. 7, 2019 [https://www.cs.virginia.edu/stream/].
Raaijmakers, "Run-Time Partial Reconfiguration on the Virtex-II Pro," Master of Science Thesis in Computer Engineering, Delft University of Technology, The Netherlands, 2007 (67 pages).
Kalte et al., "Context Saving and Restoring for Multitasking in Reconfigurable Systems,".
International Conference on Field Programmable Logic and Applications, 2005, Tampere, Finland, pp. 223-228 (6 pages).
Arvind et al., "Executing a Program on the MIT Tagged-Token Dataflow Architecture," Mar. 1990, IEEE Transactions on Computers, vol. 39, No. 3, pp. 300-318 (19 pages).
Asanovic et al., "The Landscape of Parallel Computing Research: A View from Berkeley," Dec. 18, 2006, Electrical Engineering and Computer Sciences University of California at Berkeley, Technical Report No. UCB/EECS-2006-183, 56 pages.
BLUESPEC, "Bluespec System Verilog Reference Guide," Jun. 16, 2010, Bluespec, Inc., 453 pages, retrieved from the Internet Nov. 18, 2019 [http://csg.csail.mit.edu/6.S078/6_S078_2012_www/resources/reference-guide.pdf].
"Configurable Flow Accelerators," Mar. 3, 2016, XP055475839, retrieved from the Internet Nov. 15, 2019 [http://groups.inf.ed.ac.uk/pasta/rareas_cfa.html], 3 pages.
Burger, et al., "Scaling to the End of Silicon with EDGE Architectures," Jul. 12, 2004, vol. 37 (7), retrieved from [https://ieeexplore.ieee.org/document/1310240], pp. 44-55.
Carloni et al. "The Theory of Latency Insensitive Design," Sep. 2001, IEEE Transactions on Computer-Aided Design of Integrated Circuits and Systems, vol. 20, No. 9 (18 pages).
Wikipedia, The Free Encyclopedia, "Feedback Arc Set," Jan. 9, 2019 Revision, 5 pages [https://en.wikipedia.org/w/index.php?title=Feedback_arc_set&oldid=877608624].
Compton et al., "Reconfigurable Computing: A Survey of Systems and Software," ACM Computing Surveys, Jun. 2002, vol. 34, No. 2, pp. 171-210, (40 pages).
Cong et al., "Supporting Address Translation for Accelerator-Centric Architectures," Feb. 2017, IEEE International Symposium on High Performance Computer Architecture (HPCA), (12 pages).
Johnson, "Finding all the Elementary Circuits of a Directed Graph," SIAM Journal on Computing, vol. 4, No. 1, Mar. 1975, 8 pages.
Dennis et al., "A Preliminary Architecture for a Basic Data-Flow Processor," Proceedings of the 2nd Annual Symposium on Computer Architecture, 1975, pp. 125-131 (7 pages).

Dijkstra, "Guarded Commands, Nondeterminacy and Formal Derivation of Programs," Communications of the ACM, vol. 18 , No. 8, Aug. 1975, pp. 453-457 (5 pages).
Yu et al., "An Asynchronous Array of Simple Processors for DSP Applications," IEEE International Solid-State Circuits Conference, ISSCC'06, Feb. 8, 2006 (3 pages).
Emer et al., "Asim: a Performance Model Framework," Feb. 2002, Computer, vol. 35, No. 2, pp. 68-76 (9 pages).
Emer et al., "A Characterization of Processor Performance in the VAX-11/780," Proceedings of the 11th Annual International Symposium on Computer Architecture, Jun. 1984, vol. 12, No. 3, pp. 274-283 (10 pages).
Fleming et al., "Leveraging Latency-Insensitivity to Ease Multiple FPGA Design," Proceedings of the ACM/SIGDA International Symposium on Field Programmable Gate Arrays (FPGA'12), Feb. 22-24, 2012, pp. 175-184 (10 pages).
Govindaraju et al., "Dynamically Specialized Datapaths for Energy Efficient Computing," Proceedings of the 17th IEEE International Conference on High Performance Computer Architecture, 2011 (12 pages).
Hauser et al., "Garp: a MIPS Processor with a Reconfigurable Coprocessor," Proceedings of the 5th Annual IEEE Symposium on Field-Programmable Custom Computing Machines, 1997 (10 pages).
Hoogerbrugge et al., "Transport-Triggering v. Operation-Triggering," In Compiler Construction, Lecture Notes in Computer Science, vol. 786, 1994, Springer, pp. 435-449 (15 pages).
Ibrahim, "Binary Floating Point Fused Multiply Add Unit," Thesis Submission for Masters of Science in Electronics and Communications Engineering, Faculty of Engineering at Cairo University, Giza, Egypt, 2012 (100 pages).
Kim et al., "Energy-Efficient and High Performance CGRA-based Multi-Core Architecture," Journal of Semiconductor Technology and Science, vol. 14, No. 3, Jun. 2014 (16 pages).
King et al., "Automatic Generation of Hardware/Software Interfaces," Proceedings of the 17th International Conference on Architectural Support for Programming Languages and Operating Systems, ASPLOS'12, Mar. 2012 (12 pages).
Knuth et al., "Fast Pattern Matching in Strings," SIAM Journal of Computing, vol. 6, No. 2, Jun. 1977, pp. 323-350 (28 pages).
Lee et al., "Hardware Context-Switch Methodology for Dynamically Partially Reconfigurable Systems," Journal of Information Science and Engineering, vol. 26, Jul. 2010, pp. 1289-1305 (17 pages).
Marquardt et al., "Speed and Area Tradeoffs in Cluster-Based FPGA Architectures," IEEE Transactions on Very Large Scale Integration (VLSI) Systems, vol. 8, No. 1, Feb. 2000 (10 pages).
Ye et al., "CHIMAERA: A High-Performance Architecture with a Tightly-Coupled Reconfigurable Functional Unit," Proceedings of the 27th Inernational Symposium on Computer Architecture (ISCA'00), 2000 (11 pages).
Mei et al., "ADRES: An Architecture with Tightly Coupled VLIW Processor and Coarse-Grained Reconfigurable Matrix," Proceedings of the International Conference on Field-Programmable Logic and Applications, Lisbon, Portugal,Sep. 2003 (10 pages).
Merrill et al., "Revisiting Sorting for GPGPU Stream Architectures," Proceedings of the 19th International Conference on Parallel Architectures and Compilation Techniques (PACT'10), Feb. 2010 (17 pages).
Mirsky et al., "MATRIX: A Reconfigurable Computing Architecture with Configurable Instruction Distribution and Deployable Resources," Proceedings of the IEEE Symposium on FPGAs for Custom Computing Machines, Apr. 1996 (10 pages).
Wikipedia, The Free Encyclopedia, "TRIPS Architecture," last edited Jan. 28, 2019 (4 pages), retrieved from the Internet on Nov. 6, 2019 [https://en.wikipedia.org/wiki/TRIPS_architecture].
Panesar et al., "Deterministic Parallel Processing," International Journal of Parallel Programming, Aug. 2006, vol. 34, No. 4 (16 pages).
Parashar et al., "Efficient Spatial Processing Element Control via Triggered Instructions," IEEE MICRO, vol. 34, No. 3, 2014, pp. 120-137 (18 pages).

(56) References Cited

OTHER PUBLICATIONS

Parashar et al., "LEAP: A Virtual Platform Architecture for FPGAs," Workshop on the Intersections of Computer Architecture and Reconfigurable Logic (CARL 2010), Atlanta, US, Dec. 2010 (6 pages).

Pellauer et al., "Efficient Control and Communication Paradigms for Coarse-Grained Spatial Architectures," ACM Transactions on Computer Systems, 2015, vol. 33, No. 3, Article 10 (32 pages).

Pellauer et al., "Soft Connections: Addressing the Hardware-Design Modularity Problem," Proceedings of the 46th ACM/IEEE Design Automation Conference 2009 (DAC'09), pp. 276-281 (7 pages).

Schmit et al., "PipeRench: A Virtualized Programmable Datapath in 0.18 Micron Technology," Proceedings of the IEEE 2002 Custom Integrated Circuits Conference, 2002, pp. 63-66 (4 pages).

Shin et al., "Minimizing Buffer Requirements for Throughput Constrained Parallel Execution of Synchronous Dataflow Graph," ASPDAC '11 Proceedings of the 16th Asia and South Pacific Design Automation Conference, Jan. 2011 (6 pages).

Smith et al., "Dataflow Predication," Proceedings of the 39th Annual IEEE/ACM International Symposium on Microarchitecture, Orlando, FL, Dec. 2006 (12 pages).

Swanson et al., "The WaveScalar Architecture," ACM Transactions on Computer Systems, May 2007, vol. 25, No. 2, Article No. 4 (35 pages).

Taylor et al., "The Raw Microprocessor: A Computational Fabric for Software Circuits and General-Purpose Programs," IEEE Micro, 2002, vol. 22, No. 2, pp. 25-35 (11 pages).

Truong et al., "A 167-Processor Computational Platform in 65 nm CMOS," IEEE Journal of Solid-State Circuits, Apr. 2009, vol. 44, No. 4, pp. 1130-1144 (15 pages).

Van De Geijn et al., "SUMMA: Scalable Universal Matrix Multiplication Algorithm," Concurrency: Practice and Experience, vol. 9, Issue 4, pp. 255-274, 1997, retrieved from [https://courses.cs.washington.edu/courses/csep524/02au/summa.pdf], (19 pages).

Vijayaraghavan et al., "Bounded Dataflow Networks and Latency-Insensitive Circuits," Proceedings of the 7th IEEE/ACM International Conference on Formal Methods and Models for Co-Design (MEMOCODE'09), Jul. 13-15, 2009, pp. 171-180 (11 pages).

Wikipedia, The Free Encyclopedia, "Priority Encoder," Oct. 30, 2016 revision (2 pages), retrieved from the Internet on Nov. 6, 2019 [https://en.wikipedia.org/w/index.php?Title=Priority_encoder&oldid=746908667].

Wikipedia, The Free Encyclopedia, "Truth Table," Logical Implication Table, Nov. 18, 2016 revision (9 pages), retrieved from the Internet Nov. 6, 2019 [https://en.wikipedia.org/wiki/Truth_table#Logical_implication].

Li S., et al., "Case Study: Computing Black-Scholes with Intel Advanced Vector Extensions," Developer Zone, Sep. 6, 2012, 15 pages.

Canis A., et al., "LegUp: An Open-Source High-Level Synthesis Tool for FPGA-Based Processor/Accelerator Systems," ACM Transactions on Embedded Computing Systems, vol. 1, Article 1, Jul. 2012, 25 pages.

Govindaraju et al., "DySER: Unifying Functionality and Parallelism Specialization for Energy-Efficient Computing," IEEE Computer Society, Sep./Oct. 2012, pp. 38-51, 14 pages.

Smith A., et al., "Compiling for EDGE Architectures," Appears in the Proceedings of the 4th International Symposium on code Generation and Optimization, 2006, 11 pages.

"The LLVM Compiler Infrastructure," retrieved from http://www.llvm.org/, on May 1, 2018, maintained by the llvm-admin team, 3 pages.

Ye et al., "CHIMAERA: A High-Performance Architecture with a Tightly-Coupled Reconfigurable Functional Unit," Proceedings of the 27th International Symposium on Computer Architecture (ISCA'00), 2000, 11 pages. Retrieved from [https://www.cse.unsw.edu.au/~cs4211/papers/isca00-ye-chimaera.pdf] Apr. 16, 2020.

"Benchmarking DNN Processors," MIT EEMS, 2016, 2 pages.

Chen Y., et al., "Eyeriss: A Spatial Architecture for Energy-Efficient Dataflow for Convolutional Neural Networks," Jun. 2016, 53 pages.

Chen Y., et al., "Eyeriss: A Spatial Architecture for Energy-Efficient Dataflow for Convolutional Neural Networks," International Symposium on Computer Architecture (ISCA), Jun. 2016, pp. 367-379.

Chen Y., et al., "Eyeriss: An Energy-Efficient Reconfigurable Accelerator for Deep Convolutional Neural Networks," IEEE International Conference on Solid-State Circuits (ISSCC), Feb. 2016, pp. 262-264.

Chen Y., et al., "Eyeriss: An Energy-Efficient Reconfigurable Accelerator for Deep Convolutional Neural Networks," IEEE International Solid-State Circuits Conference, ISSCC, 2016, 12 pages.

Chen Y., et al., "Eyeriss: An Energy-Efficient Reconfigurable Accelerator for Deep Convolutional Neural Networks," IEEE International Solid-State Circuits Conference, ISSCC 2016, Digest of Technical Papers, retrieved from eyeriss-isscc2016, spreadsheet, http://eyeriss.mit.edu/benchmarking.html, 2016, 7 pages.

Chen Y., et al., "Eyeriss v2: A Flexible and High-Performance Accelerator for Emerging Deep Neural Networks," Jul. 2018, 14 pages.

Chen Y., et al., "Understanding the Limitations of Existing Energy-Efficient Design Approaches for Deep Neural Networks," SYSML '18, Feb. 2018, 3 pages.

Chen Y., et al., "Using Dataflow to Optimize Energy Efficiency of Deep Neural Network Accelerators," IEEE Micro's Top Picks from the Computer Architecture Conferences, May/Jun. 2017, pp. 12-21.

Chen Y.H., et al., "Eyeriss: An Energy-Efficient Reconfigurable Accelerator for Deep Convolutional Neural Networks," 2016 IEEE International Solid-State Circuits Conference (ISSCC), Jan. 2016, 12 pages.

Emer J., et al., "Hardware Architectures for Deep Neural Networks at CICS/MTL Tutorial," Mar. 27, 2017, 258 pages.

Emer J., et al., "Hardware Architectures for Deep Neural Networks at ISCA Tutorial," Jun. 24, 2017, 290 pages.

Emer J., et al., "Hardware Architectures for Deep Neural Networks at MICRO Tutorial," Oct. 16, 2016, 300 pages.

Emer, et al., "Tutorial on Hardware Architectures for Deep Neural Networks," Nov. 2016, 8 pages.

"Full Day Tutorial Held at MICRO-49," Oct. 15-19, 2016, retrieved from https://www.microarch.org/micro49/ on Feb. 14, 2019, 2 pages.

Han S., et al., "Deep Compression: Compressing Deep Neural Networks with Pruning, Trained Quantization and Huffman Coding," ICLR, Feb. 2016, 14 pages.

Han S., et al., "EIE: Efficient Inference Engine on Compressed Deep Neural Network," 43rd ACM/IEEE Annual International Symposium on Computer Architecture, ISCA 2016, Seoul, South Korea, Jun. 18-22, 2016, retrieved from eie-isca2016, spreadsheet, http://eyeriss.mit.edu/benchmarking.html, 7 pages.

Han S., et al., "EIE: Efficient Inference Engine on Compressed Deep Neural Network," ISCA, May 2016, 12 pages.

Hsin Y., "Sixth Global Deep Learning Summit," Boston, May 2016, retrieved from https://www.re-work.co/events/deep-learning-boston-2016 on Feb. 14, 2019, 10 pages.

Hsin Y., "Deep Learning & Artificial Intelligence," at GPU Technology Conference, Mar. 26-29, 2018, retrieved from http://www.gputechconf.com/resources/poster-gallery/2016/deep-learning-artificial-intelligence on Feb. 14, 2019, 4 pages.

Suleiman A., et al., "Towards Closing the Energy Gap Between HOG and CNN Features for Embedded Vision," IEEE International Symposium of Circuits and Systems (ISCAS), May 2017, 4 pages.

Sze V., "Designing Efficient Deep Learning Systems," in Mountain View, CA, Mar. 27-28, 2019, retrieved from https://professional.mit.edu/programs/short-programs/designing-efficient--deep-learning-systems-OC on Feb. 14, 2019, 2 pages.

Sze V., et al., "Efficient Processing of Deep Neural Networks: A Tutorial and Survey," Mar. 2017, 32 pages.

Sze V., et al., "Efficient Processing of Deep Neural Networks: A Tutorial and Survey," Proceedings of the IEEE, Dec. 2017, vol. 105 (12), pp. 2295-2329.

Sze V., et al. "Hardware for Machine Learning: Challenges and Opportunities," IEEE Custom Integrated Circuits Converence (CICC), Oct. 2017, 9 pages.

"Tutorial at MICRO-50," The 50th Annual IEEE/ACM International Symposium on Microarchitecture, Oct. 14-18, 2017, retrieved from https://www.microarch.org/micro50/ on Feb. 14, 2019, 3 pages.

(56) References Cited

OTHER PUBLICATIONS

"Tutorial on Hardware Architectures for Deep Neural Networks at ISCA 2017," the 44th International Symposium on Computer Architecture, Jun. 24-28, 2017, retrieved from http://isca17.ece.utoronto.ca/doku.php on Feb. 14, 2019, 2 pages.

Yang et al., "Deep Neural Network Energy Estimation Tool," IEEE Conference on Computer Vision and Pattern Recognition CVPR 2017, Jul. 21-26, 2018, retrieved from Https://energyestimation.mit.edu/ on Feb. 21, 2019, 4 pages.

Yang et al., "NetAdapt: Platform-Aware Neural Network Adaptation for Mobile Applications," European conference on Computer vision (ECCV), Version 1, Apr. 9, 2018, 16 pages.

Yang et al., "A Method to Estimate the Energy Consumption of Deep Neural Networks," Asilomar Conference on Signals, Systems and Computers, Oct. 2017, 5 pages.

Yang et al., "Designing Energy-Efficient Convolutional Neural Networks using Energy-Aware Pruning," IEEE Conference on Computer Vision and Pattern Recognition (CVPR), Jul. 2017, 9 pages.

Yang et al., "Designing Energy-Efficient Convolutional Neural Networks using Energy-Aware Pruning," IEEE Conference on Computer Vision and Pattern Recognition (CVPR), ,Jul. 21-26, 2017, retrieved from http://www.rle.mit.edu/eems/wp-content/uploads/2017/07/2017_cvpr_poster.pdf on Feb. 21, 2019, 1 page.

Yang et al., "Designing Energy-Efficient Convolutional Neural Networks using Energy-Aware Pruning," IEEE CVPR, Mar. 2017, 6 pages.

Yang et al., "NetAdapt: Platform-Aware Neural Network Adaptation for Mobile Applications," european Conference on Computer vision (ECCV), Version 2, Sep. 28, 2018, 16 pages.

Intel Architecture, "Instruction Set Extensions and Future Features Programming Reference," 319433-034, May 2018, 145 pages.

Intel, "Intel 64 and IA-32 Architectures Software Developer Manuals," Oct. 12, 2016, Updated May 18, 2018, 19 pages.

Lewis et al. "The Stratix™ 10 Highly Pipelined FPGA Architecture," FPGA 2016, Altera, Feb. 23, 2016, 26 pages.

Lewis et al. "The Stratix™ 10 Highly Pipelined FPGA Architecture," FPGA 2016, ACM Feb. 21-23, 2016, pp. 159-168, 10 pages.

Chandy et al., "Parallel Program Design: A Foundation," Addison-Wesley Publishing Company, Aug. 1988, 552 pages.

Dally et al., "Principles and Practices of Interconnection Networks," Morgan Kauffmann, 2003, 582 pages.

Eisenhardt et al., "Optimizing Partial Reconfiguration of Multi-Context Architectures," 2008 International Conference on Reconfigurable Computing and FPGAs, Dec. 2008, 6 pages.

Matsen et al., "The CMU Warp Processor," In Supercomputers: Algorithms, Architectures, and Scientific Computation, 1986, pp. 235-247, 12 pages.

Jerger et al., "On-Chip Networks," Synthesis Lectures on Computer Architecture, Morgan and Claypool Publishers, 2009, 148 pages.

Williston, Roving Reporter, Intel Embedded Alliance, "Roving Reporter: FPGA + Intel Atom = Configurable Processor," Dec. 2010, 5 pages.

United States Patent and Trademark Office, "Notice of Allowance," dated Apr. 7, 2020 in connection with U.S. Appl. No. 16/370,934, 8 pages.

United States Patent and Trademark Office, "Notice of Allowance," dated Jul. 23, 2020 in connection with U.S. Appl. No. 16/370,934, 8 pages.

European Patent Office, "Extended European Search Report," dated Aug. 13, 2020 in connection with European Patent Application No. 20158896.9, 9 pages.

* cited by examiner

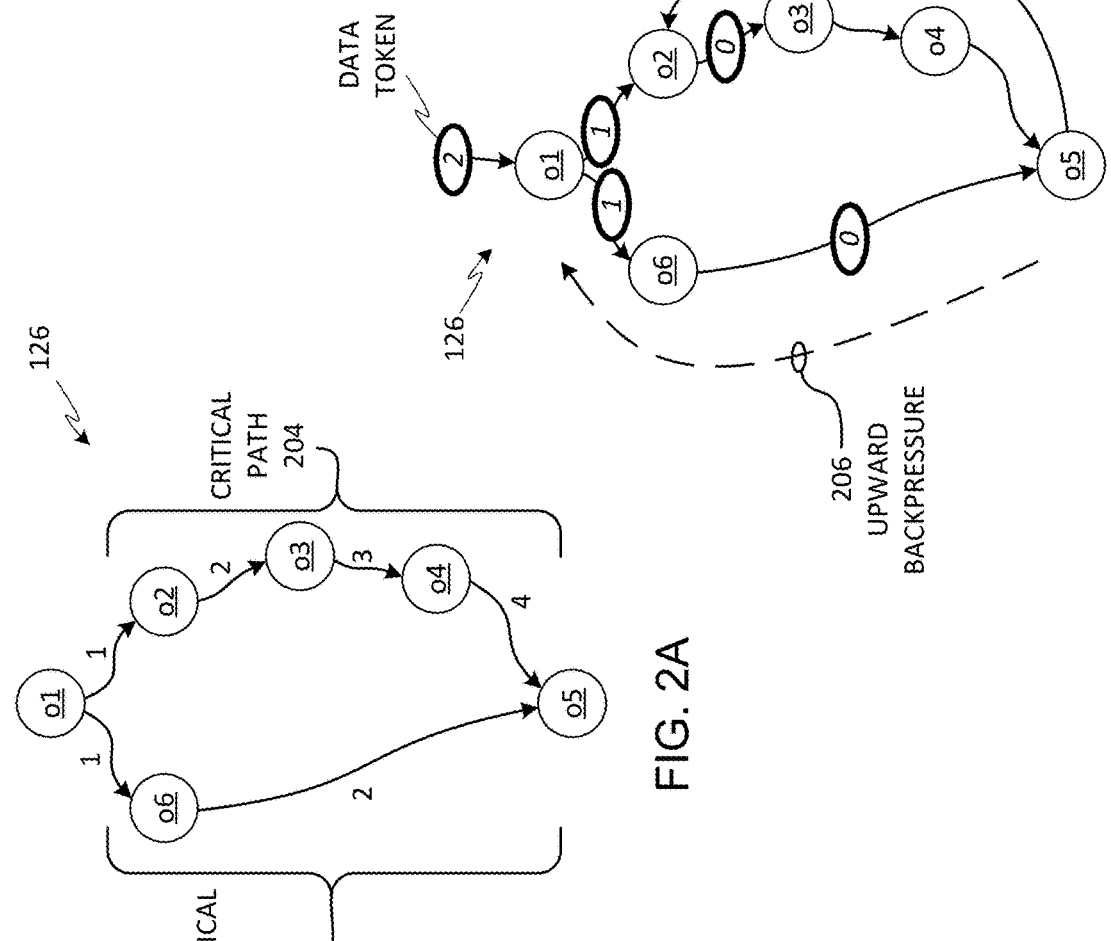

DFS PROGRAMMING INSTRUCTIONS TO
ANNOTATE BACKEDGES

ANNOTATED BACKEDGES IN A DFG
USING DEPTH-FIRST SEARCH (DFS)

800

```
BFS_Backedge_annotate(G,S)

For each vertex u in G, D[u]=inf
D[s]=0
G_DAG=G
q.insert(s)
while(!q.empty())
  u=q.dequeue()
  for all v in G.netNeighbors(u)
    if(D[v]==inf)
      D[v]=D[u]+1
      q.insert(v)

For all edge e(u,v) in G
  if D[u] > D[v]
    if(v in u.ancestor())
      G_DAG.annotate(G)
Return G_DAG
```

BREADTH-FIRST SEARCH (BFS)
PROGRAMMING INSTRUCTIONS TO
ANNOTATE BACKEDGES

```
//Get the Postorder traversal order
1. V_P=PostorderTraversal(G,s)
//Get a reverse preordering
2. R_V_P=Reverse(V_P)
//Get Dominators set for each vertex
3. Dom_set=GetDominators (V_P)
//Identify BackEdge
4. For each edge (i,j)
//if the edge goes from high order to low
5.     If R_V_P[i]>R_V_P[j]
6.     If j dominates i (search in Dom_set(i))
7.         then e(i,j) is a back_edge
```

```
Dom_set=GetDominators (G,V_P,s)

//initialize s or super_source
1. Dom set[s]={s}
//initialize all other nodes to be dominated by all others
2. For each vertex, x
3.     Dom set[x]={V_P}
// now refine the set
4. For each vertex, x
5.   For all p that is a predecessor of x
6.       Dom set[x]∩=Dom_set[p]
7.   Dom set[x]U={x}
8. Return Dom_set
```

PROGRAMMING INSTRUCTIONS FOR POST-ORDER
TRAVERSAL AND DOMINATOR ANALYSIS TO ANNOTATE
BACKEDGES

FIG. 9

ARRAY OF PROCESSING ELEMENTS (PEs)
OF CGRA DEVICE

COMPARISON OF STORAGE BOXES USED BY
AUTOMATIC BUFFER INSERTION (ABI)

COMPARISON OF PERFORMANCE OF A PRACTICAL DATAFLOW GRAPH TO A DATAFLOW GRAPH WITH UNPRACTICALLY DEEP 128 DEPTH BUFFERS

METHODS AND APPARATUS TO DETECT AND ANNOTATE BACKEDGES IN A DATAFLOW GRAPH

STATEMENT REGARDING FEDERALLY SPONSERED RESEARCH AND DEVELOPMENT

This invention was made with Government support under subcontract number B620873 awarded by the Department of Energy. The Government has certain rights in this invention.

FIELD OF THE DISCLOSURE

This disclosure relates generally to programmable computing devices and more particularly, to methods and apparatus to detect and annotate backedges in a dataflow graph.

BACKGROUND

A processor, or set of processors, execute(s) instructions from an instruction set (e.g., an instruction set architecture (ISA)). The instruction set is the part of the computer architecture related to programming, and generally includes native data types, instructions, register architecture, addressing modes, memory architecture, interrupt and exception handling, and external input and output (I/O) information. Instructions may be macro-instructions provided to a processor for execution, and/or may be micro-instructions generated by a processor based on decoding macro-instructions.

BRIEF DESCRIPTION OF THE DRAWINGS

FIGS. 2A-2C depict an example dataflow graph including a back-pressured noncritical path and a critical path including a backedge.

FIG. 8 depicts example pseudocode representing machine-readable instructions that may be executed by a processor to implement a Breadth-First Search to detect and annotate backedges in a dataflow graph.

FIG. 9 depicts example pseudocode representing machine-readable instructions that may be implemented by a processor to implement post-order traversal and dominator analyses to detect and annotate backedges in dataflow graphs.

The figures are not to scale. Instead, the thickness of the layers or regions may be enlarged in the drawings. In general, the same reference numbers will be used throughout the drawing(s) and accompanying written description to refer to the same or like parts.

Figure 1:
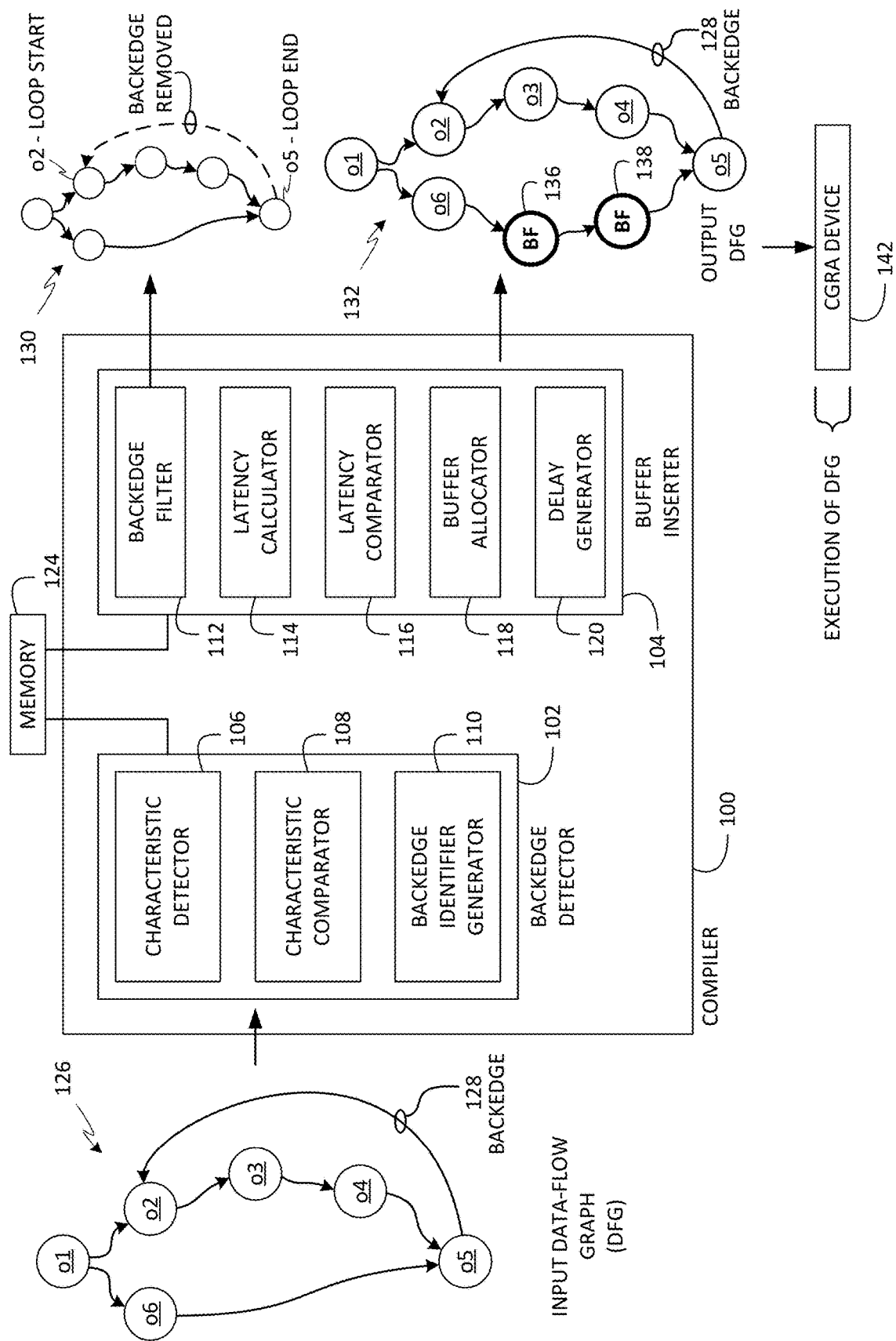
FIG. 1 depicts an example backedge detector and an example buffer inserter implemented in accordance with teachings of this disclosure to detect and remove backedges from dataflow graphs and insert buffers in the dataflow graphs.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Examples disclosed herein latency-balance a dataflow graph (e.g., cyclic dataflow graphs and/or acyclic dataflow graphs) by injecting buffers into the dataflow graph. As used herein, a dataflow graph (DFG) is a graphical representation of a computer program. A cyclic DFG is a general dataflow graph that contains cycles or loops to represent looping or iterative operations in a computer program. An acyclic DFG is a general dataflow graph that does not contain cycles or loops. DFGs may be produced by a compiler, a software framework, or written by hand. Examples disclosed herein are described in connection with DFGs generated for an example type of computer architecture known as a coarse-grained reconfigurable architecture (CGRA). CGRA-based devices include thousands of tiny reconfigurable processing elements (PEs) arranged or formed on a spatial grid and connected via on-chip reconfigurable network connections. A particular example of a CGRA is a configurable spatial accelerator (CSA) architecture developed by Intel Corporation of Santa Clara, Calif., USA. Examples disclosed herein may be used to process dataflow graphs targeted for execution on a CSA architecture, targeted for execution any other type of CGRA, and/or targeted for execution on any other type of machine architecture.

A CSA target device can be programmed by writing CSA-specific assembly instructions (e.g., using an instruction set architecture (ISA)). Examples disclosed herein may be implemented in connection with a compiler for CSA target devices that can be used to compile high-level languages such as the C programming language, the C++ programming language, the FORTRAN programming language, etc. into CSA-specific LLVM IR (Intermediate Representation) language. The term LLVM is not an acronym but is a term in itself that refers to a manner of representing code for use in compiler-based analysis and optimization. LLVM code representations are defined by the LLVM Foundation. However, examples disclosed herein may be implemented in connection with a general LLVM IR or any other suitable type of compiler IR for any other type of machine or architecture in addition to or instead of a machine-specific LLVM IR such as CSA-specific LLVM IR. The compiler can optimize and compile compiler IR code or LLVM IR code into a CSA assembly which is then used to create a DFG. During such transformation, the compiler can propagate or hold high-level program-specific information as well as programmer-specified hints to the assembly level such as loop membership, performance critical operations, throughput, etc. which can be used by subsequent tools for preparing the program for loading on a target device. For example, such subsequent tools can use the dataflow representation of the DFG to optimize the DFG by fusing suitable operations together, balancing available buffering with latency in accordance with teachings of this disclosure, mapping operations to target hardware, and placing and routing operations and storage in the target hardware. A high-level workflow representation of a compiler for CSA devices and/or any other type of CGRA devices is shown in Table 1 below.

TABLE 1

Compiler Workflow

Compiler generates LLVM IR from C/C++/Fortran code
Compiler generates Assembly code
Operation Elaboration and Fusion
Buffer Insertion
Place and Route
Binary Configuration Generation While Table 1 above shows an example manner of organizing a compiler workflow, the example stages depicted in Table 1 can be reordered, one or more of the stages can be run multiple times in any sequence, one or more of the stages can be omitted, and/or one or more other stages can be inserted. Example latency-balancing techniques disclosed herein may be implemented in the Buffer Insertion phase of a compiler shown in Table 1 above by analyzing DFGs generated by the Operation Elaboration and Fusion phase. A DFG is formed using interconnected nodes in which each node represents an operation (e.g., a compute operation, a memory operation, a control operation, etc.) and each interconnection or arc represents a producer-consumer dataflow relationship (e.g., an input-output dependency) between two operations. For example, for two interconnected nodes forming an input-output dependency, a first node is a producer/source node and a second node is a consumer/destination/sink node. The producer/source node is the dominator node that performs a producer/source operation to produce an output that is consumed as input in the consumer/destination/sink node to perform a consumer/destination/sink operation.

A DFG defines nodes of operations and their interconnections and is used to configure PEs of CGRA devices. Different PEs of a CGRA device may be structured for different types of operations. For example, some PEs may be structured to perform integer arithmetic operations, some PEs may be structured to perform floating point arithmetic operations, some PEs may be structured to perform communication operations, and some PEs may be structured as in-fabric storage to store data. In the above example, multiple nodes of a DFG may be configured in a single PE or may be configured in different PEs depending on the types of operations of the multiple nodes. In examples disclosed herein, in-fabric storage PEs, also referred to as storage boxes, are memory (e.g., random access memory (RAM), static RAM (SRAM), dynamic RAM (DRAM), etc.) used to implement buffers for use in latency-balancing DFGs. Additionally or alternatively, storage boxes can be used for other functionalities such as addressable memory. A buffer may be of any size so long as it does not exceed the capacity of the storage box from which it is allocated. The number of buffers available in a CGRA device is based on the number of storage boxes in the CGRA device because the buffers are allocated from the storage boxes.

In examples disclosed herein, a DFG includes one or more cycles or loops between start nodes and corresponding end nodes. For a corresponding set of start and end nodes there may be multiple paths between the two. Each path has a corresponding latency which is the duration of performing their respective operations between the start node and the end node. In those multiple paths is a critical path that is attributable to the longest latency between the start and end nodes relative to latencies of the other path(s) between the start and end nodes. The long latency of the critical path is due to the critical path having more operation nodes and/or longer-latency nodes than the other paths. Latency-balancing by buffering means adding storage elements (e.g., buffers) and/or processing elements on interconnecting arcs between nodes along a path between start and end nodes to make the overall storage in that path produce a path latency tolerance that is similar or equal to a latency of the critical path (e.g., a critical path latency). Contrary to conventional design principals of reducing latency in programs to increase performance, latency-balancing techniques disclosed herein add latency to paths to increase performance. As described in greater detail below, increasing a latency of one or more noncritical paths to be similar or equal to the critical path latency balances the latency between the noncritical and critical paths which increases the data processing throughput of the noncritical and critical paths.

Example latency-balancing techniques disclosed herein include two phases, namely an example backedge detection phase and an example buffer insertion phase. As used herein, a backedge in a DFG is an interconnecting arc between a child node or operation and a parent node or operation. A backedge transfers execution control from the child node to the parent node and denotes a cyclic dependency among operations in the DFG between the child and parent nodes. That is, operations or nodes form a cyclic dependency when execution of a node (e.g., an ancestor node or parent node) is dependent on output(s) from one or more successor nodes (e.g., one or more child nodes or descendent nodes). In examples disclosed herein, detection and removal of backedges is performed before buffer insertion. As such, the example backedge detection phase involves: (a) analyzing a DFG to detect backedges that form loops in a program between loop start nodes and loop end nodes, and (b) annotating the backedges in the DFG. The example buffer insertion phase involves removing the annotated backedges and analyzing the remaining paths in the DFG to determine suitable quantities of buffers to insert in noncritical paths between loop start and loop end nodes to increase data throughputs of those noncritical and critical paths between loop start and loop end nodes.

FIG. 1 depicts an example compiler 100 including an example backedge detector 102 and an example buffer inserter 104 implemented in accordance with teachings of this disclosure to latency-balance paths in the DFGs by detecting and removing backedges from the DFGs and inserting buffers in the DFGs. Although not shown, the example compiler 100 includes other components such as components to implement the processes of the compiler workflow shown in Table 1 above, and the example compiler workflow described below in connection with FIG. 10, and/or other components not reflected in those example compiler workflows. For purposes of this disclosure, such other components are omitted from the example of FIG. 1. However, it should be understood that a compiler implemented in accordance with teachings of this disclosure could include one or more of such omitted components. Examples of features that could be implemented in the compiler 100 are described below in connection with FIGS. 5 and 10. In addition, although the backedge detector 102 and the buffer inserter 104 are shown as part of the example compiler 100, in other examples, the backedge detector 102 and the buffer inserter 104 may be implemented separate from the compiler 100. For example, the backedge detector 102 and the buffer inserter 104 may be implemented in later tools to optimize DFGs after processes by the compiler 100 are completed.

In the illustrated example of FIG. 1, the example backedge detector 102 includes an example characteristic detector 106, an example characteristic comparator 108, and an example backedge identifier generator 110. Also in the illustrated example of FIG. 1, the example buffer inserter 104 includes an example backedge filter 112, an example latency calculator 114, an example latency comparator 116, an example buffer allocator 118, and an example delay generator 120. In the example of FIG. 1, the backedge detector 102 and the buffer inserter 104 are in circuit with example memory 124. The example memory 124 may be implemented by one or more volatile memory devices (e.g., dynamic random access memory (DRAM), static random access memory (SRAM), cache memory, etc.) and or one or more nonvolatile memory devices (e.g., flash memory, NAND flash memory, 3D NAND flash memory, NOR flash memory, etc.). In the example of FIG. 1, the backedge detector 102 uses the memory 124 to store information representative of backedges detected in DFGs, and the buffer inserter 104 accesses the backedge information from the memory 124 for use in a buffer insertion process to insert buffers into DFGs.

In the example of FIG. 1, the backedge detector 102 obtains an example input DFG 126. The example input DFG 126 is generated by the compiler 100 based on source code in at least one of a high-level programming language (e.g., the C programming language, the C++ programming language, the FORTRAN programming language, etc.) or a low-level programming language such as the assembly programming language. As persons skilled in the art would readily understand, a high-level programming language is more similar to a spoken or written language, whereas a low-level programming language is more similar to machine code. The example backedge detector 102 analyzes the input DFG 126 for the presence of backedges, and annotates detected backedges in the input DFG 126. In the example of FIG. 1, the input DFG 126 includes 5 nodes or operations labeled as example operations o1-o6. The example operations o1-o6 may be arithmetic operations, communication operations, bit manipulation operations, storage operations, and/or any other types of operations for which PEs are available to perform in a target device that is to execute the DFG. The example input DFG 126 includes a noncritical path (e.g., an example noncritical path 202 of FIG. 2) formed by operations o1, o6, and o5. The example input DFG 126 also includes a critical path (e.g., an example critical path 204 of FIG. 2) formed by operations o1-o5. The path of operations o1-o5 is regarded as the critical path because it has a longer latency to completion (e.g., reaching operation o5) than the noncritical path of operations o1, o6, and o5. The example input DFG 126 also includes an example backedge 128 that returns execution control from operation o5 to operation o2 in the critical path. Although only a single backedge 128 is shown in the illustrated example of FIG. 1, examples disclosed herein may be used to process input DFGs having multiple backedges. In addition, although the example backedge 128 is shown in connection with the critical path, examples disclosed herein may be implemented in connection with backedges along noncritical paths.

In the example of FIG. 1, the buffer inserter 104 removes backedges from DFGs and inserts buffers into the DFGs to latency-balance noncritical paths and critical paths of operations between source nodes (e.g., the source node of operation o1 in FIG. 1) and sink nodes (e.g., the source node of operation o5 in FIG. 1). For example, as shown in FIG. 1, the buffer inserter 104 removes annotated backedges from the input DFG 126 to generate an acyclic DFG represented by an example intermediate DFG 130. The example buffer inserter 104 also labels the source node of the removed backedge as a loop end node (e.g., the fifth node o5) and labels the sink node of the removed backedge as a loop start node (e.g., the second node o2) in the intermediate DFG 130. The buffer inserter 104 then uses the intermediate DFG 130 to perform buffer insertion analyses in accordance with examples disclosed herein, and inserts two example buffers 136, 138 in the example input DFG 126 based on the buffer insertion analyses to generate an example output DFG 132. As shown in the example of FIG. 1, the output DFG 132 also includes the backedge 128, as in the input DFG 126. Uses of the example buffers 136, 138 to latency-balance the output DFG 132 are described below in connection with FIGS. 3A-3C. When the DFG 132 is loaded on a target device, the example buffers 136, 138 are implemented by storage PEs in the array of PEs of the target device. In the example of FIG. 1, a target device is shown as an example course-grain reconfigurable architecture (CGRA) device 142 which includes an array of PEs interconnected by a network. The example output DFG 132 is used to configure the PEs in the CGRA device 142 so that the CGRA device 142 is structured to implement the process defined by the output 132. Ones of the nodes o1-o6 may be executed by a same PE or different PEs of the CGRA device 142. For example, the second node o2 may be executed by a first one of the PEs, and the third node o3 may be executed by a second one of the PEs. Alternatively, the second node o2 and the third node o3 may be executed by the same PE.

Turning to the example backedge detector 102, to improve performance of the input DFG 126 which is targeted to be executed by the CGRA device 142, the backedge detector 102 analyzes the input DFG 126 to detect backedges. The example backedge detector 102 may perform such analyses using a depth-first search (DFS) technique, a breadth-first search (BFS) technique, a technique that combines Johnson's algorithm with DFS, a post-order traversal and dominator analysis technique, a manual backedge annotation technique, or any other suitable technique. Example backedge analysis techniques are described in greater detail below in connection with FIGS. 6-9.

In some backedge detection examples, the backedge detector 102 analyzes characteristics of the nodes o1-o6 and compares such characteristics to reference criteria to determine which nodes are connected to backedges. The example backedge detector 102 is provided with the characteristic detector 106 to store node characteristic identifiers in the memory 124 in association with nodes of the input DFG 126. For example, the characteristic detector 106 can store a node characteristic identifier in the memory 124 in association with the second node o2 of the input DFG 126. As defined herein, a node characteristic identifier represents information about an execution status of a node or a hierarchical location of a node relative to other nodes in a DFG. Example node characteristic identifiers are described below in connection with FIGS. 7-9.

The example backedge detector 102 is provided with the example characteristic comparator 108 to compare node characteristic identifiers with reference criteria. As defined herein, a reference criterion represents a value to which a node characteristic identifier is compared to determine whether a node corresponding to the node characteristic identifier is connected to a backedge. Example reference criteria are described below in connection with FIGS. 7-9. The example backedge detector 102 is provided with the example backedge identifier generator 110 to generate a backedge identifier indicative of a backedge between the second node o2 and the fifth node o5 of the DFG 126 based on the comparison performed by the characteristic comparator 108. The example backedge identifier generator 110 annotates a backedge by storing the backedge identifier in the memory 124 in association with a connection arc between the first and second nodes (e.g., the connection arc between the second node o2 and the fifth node o5). For example, the memory 124 may store a data structure or table of records or entries corresponding to connection arcs between different ones of the nodes o1-o6 of the DFG 126. Additionally or alternatively, the memory 124 may store assembly code of the DFG 126 in which the backedge identifier generator 110 inserts backedge mnemonics as backedge identifiers at locations in the assembly code corresponding to connection arcs of the DFG 126 identified as being backedges. In any case, the memory 124 may store a bit value, a string value, a mnemonic, or any other value as a backedge identifier to represent a backedge in records or entries or as lines of code corresponding to ones of the connection arcs identified as backedges. In the example of FIG. 1, the connection arc between the second node o2 and the fifth node o5 is annotated in the memory 124 as the backedge 128. An example backedge annotation identifier that may be generated by the backedge identifier generator 110 in assembly code is described below in connection with FIG. 4 as a backedge attribute ".attrib backedge" 408. In such examples, the backedge identifier generator 110 can insert such backedge attributes in assembly code of the DFG 126 in the memory 124 as backedge identifiers to represent where backedges exist in the assembly code. However, examples disclosed herein are not limited to any particular manner of annotating backedges in the memory 124. Instead, examples disclosed herein may employ any suitable manner of annotating an edge by the backedge detector 102 that adds an attribute to an interconnecting arc's name corresponding to a detected backedge. Annotating an edge with a backedge attribute by adding backedge-identifying text before the edge's declaration provides a hint regarding that interconnecting arc forming a backedge which can then be used by the buffer inserter 104 to optimize/handle backedges (e.g., remove backedges) in accordance with examples disclosed herein to perform buffer insertion. In some examples, the backedge detector 102 may perform a verification process to confirm the DFG 126 would be acyclic if all annotated backedges were removed before performing a buffer insertion process. In this manner, if the backedge detector 102 determines that an acyclic DFG would not be produced, the backedge detector 102 can re-analyze the DFG 126 for additional backedges.

After the backedge identifier generator 110 annotates the backedges of the input DFG 126, the example buffer inserter 104 accesses the backedge identifiers stored in the memory 124 to perform a buffer insertion process by removing backedges from the input DFG 126 and inserting buffers to generate the output DFG 132. The example buffer inserter 104 includes the example backedge filter 112 to remove backedges between nodes to generate an acyclic DFG as represented by the intermediate DFG 130. For example, the backedge filter 112 accesses a backedge identifier from the memory 124 identifying the connection arc between the second node o2 and the fifth node o5 as being a backedge 128. Based on the backedge identifier, the backedge filter 112 removes the backedge 128 between the second node o2 and the fifth node o5 of the input DFG 126. Thus, although the example input DFG 126 is cyclic because it includes a cycle formed by the backedge 128, example latency-balancing techniques disclosed herein detect and remove backedges such as the backedge 128 to remove cycles which creates acyclic DFGs (e.g., the intermediate DFG 130) before inserting buffers. In addition, although the example backedge 128 is removed from a critical path of the DFG 126, implementations of examples disclosed herein may annotate and/or remove backedges from critical paths and/or noncritical paths to perform buffer insertion. That is, examples disclosed herein may be used to make a DFG acyclic by annotating and removing all backedges regardless of whether those backedges occur on critical paths and/or noncritical paths of the DFG.

The buffer inserter 104 is provided with the example latency calculator 114 to determine critical path latencies of critical paths of DFGs. For example, the latency calculator 114 can determine a critical path latency of the critical path of the intermediate DFG 130 formed by the nodes o1-o5. The example latency calculator 114 also determines the noncritical path latency of the noncritical path formed by the nodes o1, o6, o5. In the example of FIG. 1, the path formed by the nodes o1-o5 is the critical path of the intermediate DFG 130 because it has a longer latency to completion (e.g., terminating at the fifth node o5) relative to the noncritical path formed by node o1, o6, o5 (e.g., also terminating at the fifth node o5).

The buffer inserter 104 is provided with the example latency comparator 116 to compare the critical path latency to a latency sum of a buffer latency and the noncritical path latency. In examples disclosed herein, a buffer latency is an amount of latency introduced into a path of a DFG for each inserted buffer (e.g., one of the buffers 136, 138 of FIG. 1). The latency comparator 116 analyzes the latency sum of a buffer latency and the noncritical path latency to determine whether adding a buffer (e.g., one of the buffers 136, 138 of FIG. 1) to the noncritical path will exceed the critical path latency of the intermediate DFG 130. That is, examples disclosed herein latency-balance paths of the DFG so that a noncritical path latency is equal to or substantially similar to, but not greater than, the critical path latency of the DFG. In other examples, techniques disclosed herein may be used to insert a number of buffers in the noncritical path that would result in increasing the latency of the noncritical path to exceed the critical path latency. In such other examples, the noncritical path becomes the new critical path, and the previous critical path becomes a noncritical path. In this manner, critical and noncritical paths may be interchanged through path-latency adjustments to produce a DFG with a desired target data throughput.

The buffer inserter 104 is provided with the example buffer allocator 118 to insert one or more buffers in non-critical paths of DFGs based on buffer insertion analyses of acyclic, intermediate DFGs (e.g., the intermediate DFG 130). For example, the buffer allocator 118 inserts the buffer 136 in the noncritical path (e.g., nodes o1, o6, o5) of the input DFG 126 when the comparator determines that the latency sum (e.g., the sum of the buffer latency and the noncritical path latency) is less than the critical path latency of the critical path of the intermediate DFG 130. In examples disclosed herein, a capacity sum of a path or edge is at least as large as its latency sum because the capacity should be large enough to tolerate the latency (or buffers) in that path. As such, when the capacity sum of the noncritical path is less than the latency of the critical path, examples disclosed herein can add more capacity to the noncritical path so that the capacity of the noncritical path is proportional to the latency of the critical path. In such examples, the proportion is equal to the desired throughput of the part of the DFG under analysis. For examples in which a maximum throughput of one (e.g., one data token per cycle) is desired, the capacity sum of the noncritical path is made equal to the latency of the critical path. After inserting the buffer 136, the latency calculator updates the noncritical path latency to be based on the critical path being formed by nodes o1, o6, o5 and the inserted buffer 136. Subsequently, the buffer inserter 104 can use the latency comparator 116 to determine whether to insert another buffer. For example, the latency comparator 115 can compare the critical path latency of the critical path (nodes o1-o5) to a latency sum of a buffer latency and the updated noncritical path latency. If the example latency comparator 116 determines that the latency sum does not exceed the critical path latency, the buffer allocator 118 inserts another buffer 138 in the noncritical path of the input DFG 126. In this manner, the buffer inserter 104 can use the latency calculator 114 and the latency comparator 116 to determine when inserting another buffer into the noncritical path would exceed the critical path latency of the intermediate DFG 130. When the example latency comparator 116 determines that the critical path latency would be exceeded by inserting another buffer in the noncritical path, the buffer inserter 104 determines that no further buffer should be inserted into the noncritical path of the input DFG 126. Alternatively as described above, in some examples, the latency of a noncritical path is intentionally made to exceed a latency of a critical path through inserting one or more buffers in the noncritical path. In such examples, the previous noncritical path becomes the current critical path, and the previous critical path becomes a noncritical path. This may be done to facilitate latency-balancing a DFG to achieve a desired target data throughput, or due to buffer box storage granularity and latency constraints. In the example of FIG. 1 after the buffer inserter 104 performs the latency analyses based on the intermediate DFG 130 and the buffer allocator 118 inserts a number of buffers into the noncritical path, the buffer inserter 104 provides the output DFG 132 as an output of the buffer insertion process implemented by the buffer inserter 104. Thereafter, the output DFG 132 can be used to configure PEs of the CGRA device 142 to structure the CGRA device 142 to implement the process defined by the output DFG 132.

In some examples, the buffer allocator 118 determines that another buffer resource is not available in the target CGRA device 142 to insert a further buffer in the input DFG 126. When this happens, and the input DFG 126 is not yet latency-balanced, the buffer inserter 104 can instead insert a delay operation in the input DFG 126 to generate additional latency in the noncritical path. To accomplish such additional latency generation in the noncritical path, the buffer inserter 104 is provided with the example delay generator 120. For example, the delay generator 120 inserts a delay operation in the noncritical path when the buffer allocator 118 determines that another buffer is not available for insertion in the noncritical path to increase a similarity between the critical path latency and the noncritical path latency.

Additionally or alternatively, if the buffer allocator 118 determines that sufficient buffer resources are not available in the target CGRA device 142 to insert a sufficient number of buffer(s) in the input DFG 126 to latency-balance the DFG 126, a slackening process may be used to relax the buffer requirements for latency-balancing. Under such a slackening approach, the example buffer inserter 104 introduces a SLACK parameter into the buffer insertion analysis of the intermediate DFG 130 to decrease a target data throughput of the DFG 126 to be less than one (e.g., less than one data token per logical clock cycle). In such examples, the SLACK parameter is a multiplier of the throughput equation according to Little's Law as described herein in connection with Constraint 3. By varying the SLACK parameter to reduce the target data throughput of a DFG, slackening can be used to reduce the number of buffers needed to sufficiently latency-balance the DFG such that the DFG satisfies the target data throughput. Such a slackening approach is useful when implementing examples disclosed herein in connection with CGRA devices having insufficient storage box resources to achieve a higher target data throughput. Example slackening techniques may be implemented in accordance with Constraint 3 described in greater detail below in which a SLACK constraint is multiplied by a throughput parameter of an edge (throughput$_{i,j}$) to decrease the target data throughput of that edge. In some examples, slackening is implemented on a per-edge basis as each edge is analyzed for buffer insertion. In other examples, slackening is implemented on all edges of a DFG, and buffer insertion is performed after such all-edge slackening. In some examples in which buffer resources are depleted during a buffer insertion process of a DFG, any buffers inserted to that point are removed from the DFG so that the slackening process can be performed again on all edges of the DFG. The buffer insertion process is then restarted based on the original DFG (e.g., in the original state of the DFG before the previous buffer insertion process inserted any buffer(s)). Such slackening and restarting of the buffer insertion process may be repeated any number of times until the DFG is latency-balanced in accordance with a target data throughput for which sufficient buffers are available.

FIGS. 2A-2C depict the example 126 of FIG. 1 including the example noncritical path 202 and the example critical path 204. For ease of illustration, the example backedge 128 is not shown in FIG. 2A although the input DFG 126 of FIG. 2A does include the backedge 128. As described above, examples disclosed herein insert buffers into noncritical paths of DFGs to latency-balance noncritical paths and critical paths starting at the same starting nodes and terminating at the same ending nodes. Buffer insertion in a DFG (e.g., the DFG 126) means inserting buffers (i.e., storage) in the interconnecting network between two nodes in the DFG. For example, the input to the buffer insertion process described above in connection with FIG. 1 is the DFG 126 for which the buffer insertion process produces the buffered output DFG 132 of FIG. 1 as an output. Buffer insertion in an interconnecting arc between nodes enables holding more data which, in turn, increases latency tolerance. In a DFG, a node executes its operation as soon as all of the node's input connection arcs from preceding nodes have data ready and there is at least one buffer at the node's output connection arc to hold the new output data to be generated by the node. According to Little's Law, throughput is equal to buffer divided by latency (e.g., Throughput=Buffer/Latency). To improve throughput of a DFG, examples disclosed herein balance buffering in the DFG by performing overall latency-balancing of the paths of the DFG. As such, examples disclosed herein are useful to implement a DFG performance optimization feature of a compiler (e.g., the compiler 100 of FIG. 1) to improve throughput performance of DFGs. For example, to improve throughput performance of DFGs, examples disclosed herein adjust path latencies of noncritical paths to match or be substantially similar to the longest path latency (e.g., a critical path latency) of a DFG by inserting buffers in the noncritical paths.

FIGS. 2A-2C show how the DFG 126 is imbalanced when the nodes o1-o6 operate to process data. In the examples of FIGS. 2A-2C, ovals enumerated 0, 1, 2 represent data tokens as inputs and/or outputs of nodes, and connection arcs between the nodes represent flows of the data tokens guided by a producer-consumer relationship. For example, a producer node generates an output data token that is consumed by a consumer node. In examples disclosed herein, an operation of a node is described as being performed during a logical clock cycle (e.g., one node operation per logical clock cycle) such that a node consumes an input data token, processes the input data token, and produces an output data token in a single logical clock cycle. As such, logical clock cycles can be used to refer to sequential stages of execution of multiple nodes of a DFG. Logical clock cycles differ from physical clock cycles in that a logical clock cycle is the demarcation between executions of nodes of a DFG in examples disclosed herein, and physical clock cycles are tied to hardware operations (e.g., hardware operations of PEs in CGRA devices that implement the nodes of a DFG) in which one or more physical clock cycles implement a single logical clock cycle. For example, a PE of a CGRA device may perform multiple hardware operations over multiple physical clock cycles to execute a node operation in a single logical clock cycle. However, examples disclosed herein may also be implemented in connection with DFGs in which multiple logical clock cycles are used to execute a node operation for one or more nodes of the DFG.

In the example of FIGS. 2A-2C, an external input data token to the DFG 126 is provided to a starting node represented by the first node o1, an output data token of the DFG 126 is produced by an ending node represented by the fifth node o5, each of the nodes (o1, o2, o3, o4, o5, o6) can produce only one data token per logical clock cycle, and a buffer can only store one data token per connection arc between two nodes. In the example of FIGS. 2A-2C, the DFG 126 takes two logical clock cycles for a data token to reach the ending node o5 from the starting node o1 and the ending node o5 via the noncritical path 202, and the DFG 126 takes four logical clock cycles for a data token to reach the ending node o5 from the starting node o5 via the critical path 204. For example, as shown in FIG. 2B, the noncritical path 202 processes data token 0 in two logical clock cycles to reach the ending node o5 (e.g., the first node o1 executes during a first logical clock cycle and the sixth node o6 executes during a second logical clock cycle). Concurrently, while the critical path 204 also processes the data token 0 during the same two logical clock cycles, the data token 0 does not yet propagate through the entirety of the critical path 204 to reach the ending node o5.

Each node o1-o6 of the example DFG 126 includes one input buffer per input connection arc to hold an input data token form a preceding node. As such, since the DFG 126 of FIGS. 2A-2C can buffer or hold only one data token per connection arc, by the time token 0 reaches the input connection arc between the sixth node o6 and the ending node o5 along the noncritical path 202, the noncritical path 202 begins exerting upward backpressure 206 because the ending node o5 needs input data tokens at both of its inputs to perform its operation. As such, before the data token 0 can be consumed by the ending node o5, advancement of the data token 0 is stalled in the noncritical path 202 until the data token 0 fully propagates through the critical path 204 to reach the ending node o5. When the data token 0 stalls in the noncritical path 202 before being consumed by the ending node o5, the data token 0 prevents the data token 1 from advancing to the sixth node o6. As such, the data token 1 is stalled between the starting node o1 and the sixth node o6 in the noncritical path 202. This stalling of the data tokens 0, 1 in the noncritical path 202 creates the upward backpressure 206 on the starting node o1. The upward backpressure 206 prevents the starting node o1 from executing, which prevents data token 2 from entering the DFG 126. The stalling and upward backpressure 206 causes a loss in data throughput performance of the DFG 126.

Referring to the example of FIG. 2C, after four logical clock cycles, the ending node o5 will have data tokens 0 ready at both of its inputs at which time the ending node o5 can consume both inputs and execute its operation. This frees up the input buffer slots of the ending node o5 for both the noncritical path 202 and the critical path 204. Freeing up the input buffer slot of the ending node o5 for the noncritical path 202 releases the upward backpressure 206. This allows the starting node o1 to process data token 2 at the fourth logical clock cycle. In the fifth logical clock cycle, data token 1 can retire (e.g., after being processed by the ending node o5), and another external data token can be consumed by the starting node o1 to enter the DFG 126. The process continues in this manner for additional external input data tokens.

FIG. 2C shows the example backedge 128 that represents a loop or transfer of execution control from the ending node o5 to the second node o2 as the second node o2 waits without data at its input buffer in an idle state until the fourth logical clock cycle at which time the starting node o1 provides the data token 2 to the second node o2. In the example of FIGS. 2A-2C, the second node o2 operates on two inputs (e.g., as noted based on the backedge 128 of FIG. 2C and the forward edge between the first node o1 and the second node o2). When the second node o2 executes for the first time, it receives a first input value from the starting node o1 and receives a second input value seeded as an initial value at the output channel of the fifth node o5. Thereafter, further executions of the second node o2 are based on data from the starting node o1 and data produced by the fifth node o5. Without modification, the DFG 126 of FIGS. 2A-2C processes two data tokens per four logical clock cycles resulting in an effective data throughput or data-rate of 0.5. This matches data throughput as defined by Little's Law (e.g., data throughput of 0.5=2 data tokens/4 logical clock cycles). Applying Little's Law to the data throughput of the DFG 126, two buffers can be inserted into the noncritical path 202 between the sixth node o6 and the fifth node o5 to obtain a throughput of one for the DFG 126.

Figure 3C:
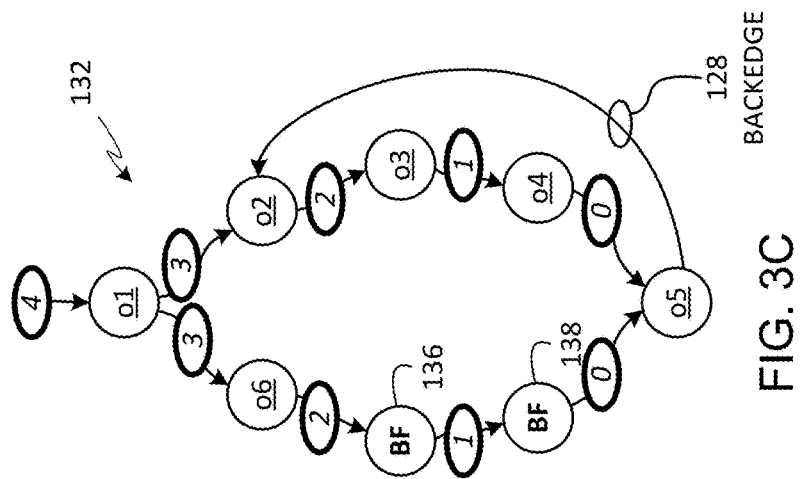
FIGS. 3A-3C depict an example dataflow graph including buffers inserted in the noncritical path of FIGS. 2A-2C.
Figure 3B:
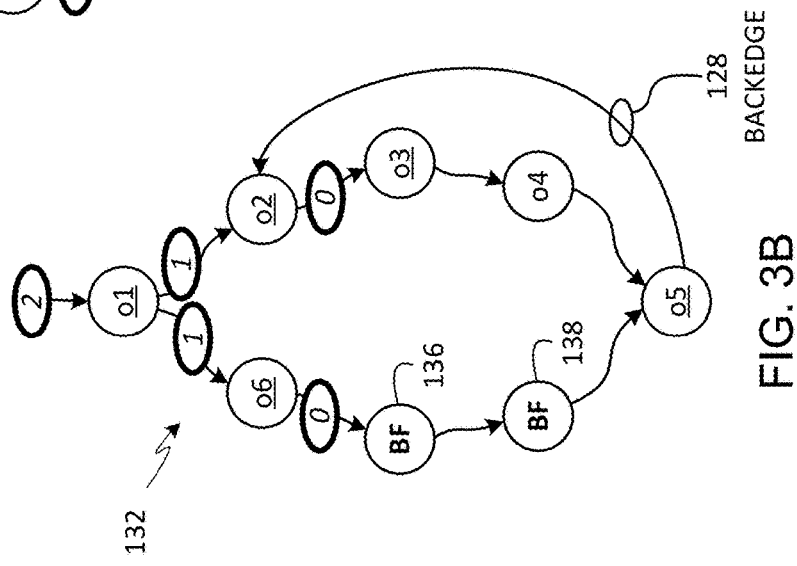
Figure 3A:
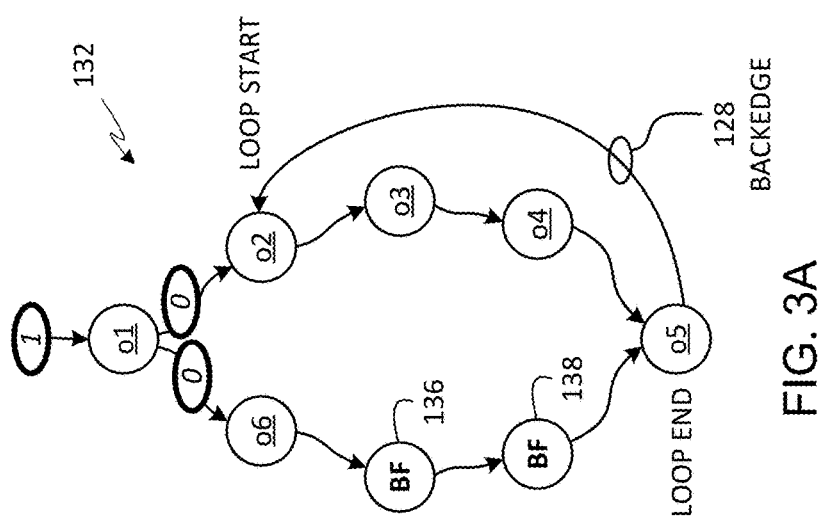

FIGS. 3A-3C depict the example output DFG 132 of FIG. 1 including the two example buffers 136, 138 inserted in the noncritical path 202 of FIGS. 2A-2C. With the two example buffers 136, 138 in the noncritical path 202, the data throughput of the DFG 132 is maximized because the inserted example buffers 136, 138 eliminate the need to stall the noncritical path 202 at any logical clock cycle. For example, FIG. 3A shows the starting node o1 passing data token 0 to the sixth node o6. In a second logical clock cycle shown in FIG. 3B, the sixth node o6 is able to store data token 0 in the first buffer 136 so that the sixth node o6 can accept the data token 1 from the starting node o1. Similarly, at a third logical clock cycle, the first buffer 136 outputs data token 0 to the second buffer 138 so that the first buffer 136 can consume data token 1 from the sixth node o6, and the sixth node o6 can consume data token 2 from the starting node o1. As shown in the example of FIG. 3C, at a fourth logical clock cycle, the ending node o5 consumes data token 0 from the second buffer 138, the second buffer 138 consumes data token 1 from the first buffer 136, the first buffer 136 consumes data token 2 from the sixth node o6, and the sixth node o6 is able to consume data token 3 from the starting node o1. A similar producer-consumer process occurs concurrently along the critical path 204 at the nodes o1-o5. In this manner, both the noncritical path 202 and the critical path 204 process data at all logical clock cycles without the noncritical path 202 stalling. In this manner, by inserting the buffers 136, 138 in the noncritical path 202 (FIG. 2) of the input DFG 126 (FIGS. 1 and 2A-2C), the output DFG 132 (FIGS. 1 and 3A-3B) is latency-balanced to have an increased data throughput relative to the input DFG 126. That is, the latency-balanced output DFG 132 has an increased data throughput because each node o1-o6 executes its operation once per logical clock cycle, and the noncritical path 202 of the input DFG 126 need not stall consumption of a subsequent data token at the starting node o1 after the second logical clock cycle. As also shown in FIGS. 3A-3C and in FIG. 1, when the input to the buffer insertion process is a cyclic DFG (e.g., the input DFG 126 of FIG. 1), the output of the buffer insertion process is also a cyclic DFG which includes the previously removed backedges (e.g., the backedge 128) in addition to the inserted buffers (e.g., the inserted buffers 136, 138). Backedges of an input DFG should come properly buffered (either when generated by a compiler or when written by a programmer) to ensure correctness of the DFG.

The above examples of FIGS. 2A-2C and FIGS. 3A-3C show that inserting buffers into some connection arcs of a DFG may be used to improve data throughout in a DFG. Examples disclosed herein facilitate determining how much buffering to insert and where to insert the buffers using a processor-implemented algorithmic techniques. Examples disclosed herein provide latency-balancing solutions by using a constraint-based linear programming optimization problem for which the quantity of buffers inserted in a DFG is minimized while maximizing data throughput performance of the DFG. When the number of buffers is fixed (e.g., due to limited buffer resources in a target device), the optimization problem is to optimize the overall throughput or minimize the loss in throughput given the buffer budget.

A CGRA device can be synchronous or asynchronous. A synchronous CGRA device has a global clock and data moves at each logical clock cycle. Although prior techniques provide buffer insertion solutions for synchronous dataflow architectures, examples disclosed herein are useful for inserting buffers in DFGs that run on asynchronous CGRA devices. An asynchronous CGRA device often has no global clock, and the interconnecting arcs and PEs can have variable data rates which makes it more difficult to solve the buffer insertion problem. Examples disclosed herein may be employed to insert buffers in DFGs written for asynchronous CGRA devices by employing an algorithmic computational procedure to optimally insert buffers on edges (e.g., noncritical paths) in a general DFG. In addition, examples disclosed herein can be implemented in connection with asynchronous CGRA architectures and/or synchronous CGRA architectures.

Prior techniques for inserting buffers are directed to buffer insertion on directed acyclic graphs (DAGs) implemented for synchronous systems. However, most computer programs contain cycles. For example, a computer program contains cycles when it includes a "while loop" or nested loops with inner loop dependencies. Such types of loops are often present in computer programs. To perform a buffer insertion process, examples disclosed herein first perform a backedge detection and annotation process to detect backedges in input DFGs (e.g., the input DFG 126) and annotate the backedges in the DFGs. In this manner, the subsequent buffer insertion process can remove the annotated backedges from the DFGs to latency-balance the DFGs by inserting a suitable number of buffers in one or more noncritical paths.

Examples disclosed herein perform backedge detection by analyzing DFGs for dominant nodes and return paths to those dominant nodes. A node 'x' in a flow graph dominates node 'y' if every path from the source node to 'y' goes through node 'x'. As such, every node dominates itself and the source node dominates every other node in the DFG. For example, the test condition of a while loop dominates all blocks in the body of the while loop. Similarly, the test of an if-then-else statement dominates all blocks in either branch. During analysis time, the example backedge detector 102 of the compiler 100 (FIG. 1) can detect backedges by running a suitable graph-traversal analysis (e.g., a depth-first search (DFS) traversal, a breadth-first-search (BFS) traversal, a post-order traversal (left-right-root), etc.) and then detecting retreating edges and backedges. A retreating edge is an edge that goes from a node to its ancestor in a traversal order. This includes a self-loop that goes from a node to itself. An example manner of detecting retreating edges is to perform a post-order traversal and detect all edges that go from a high-ranked node to a low-ranked node in the reverse ordering of that post-order traversal. The characteristic detector 106 (FIG. 1) can tag those detected high-to-low node-transition edges as retreating edges. The characteristic comparator 108 can confirm a retreating edge as a backedge if its head node (e.g., a loop start node) dominates its tail node (e.g., a loop end node). Although every backedge is a retreating edge in a traversal order analysis of a DFG, not every retreating edge is a backedge. Examples disclosed herein use such graph-traversal analyses to detect backedges, annotate the backedges in DFGs, and remove the annotated backedges to generate acyclic DFGs (e.g., the intermediate DFG 130 of FIG. 1). In this manner, examples disclosed herein can analyze the acyclic DFGs to determine optimal quantities of buffers to insert into the DFGs to latency-balance their paths and, in turn, improve data throughput capabilities of the DFGs. A challenge encountered in latency-balancing DFGs is that the problem of deleting a minimal set of backedge connection arcs to create a directed acyclic graph from an arbitrary graph is known to be NP-complete. The acronym NP stands for nondeterministic polynomial time. A problem that is NP-complete means that although a solution to the NP-complete problem can be verified quickly, there is no known way to find a solution quickly. That is, the time required to solve the problem using any currently known algorithm increases rapidly as the size of the problem grows. As such, processing large DFGs can require a significant amount of time. However, examples disclosed herein leverage topology characteristics of DFGs to perform backedge detection and annotation. For example, the dataflow graphs have designated start and end nodes, and backedges have specific properties based on topologies of their DFGs, which examples disclosed herein leverage to perform backedge detection and annotation in an efficient manner.

Figure 4:
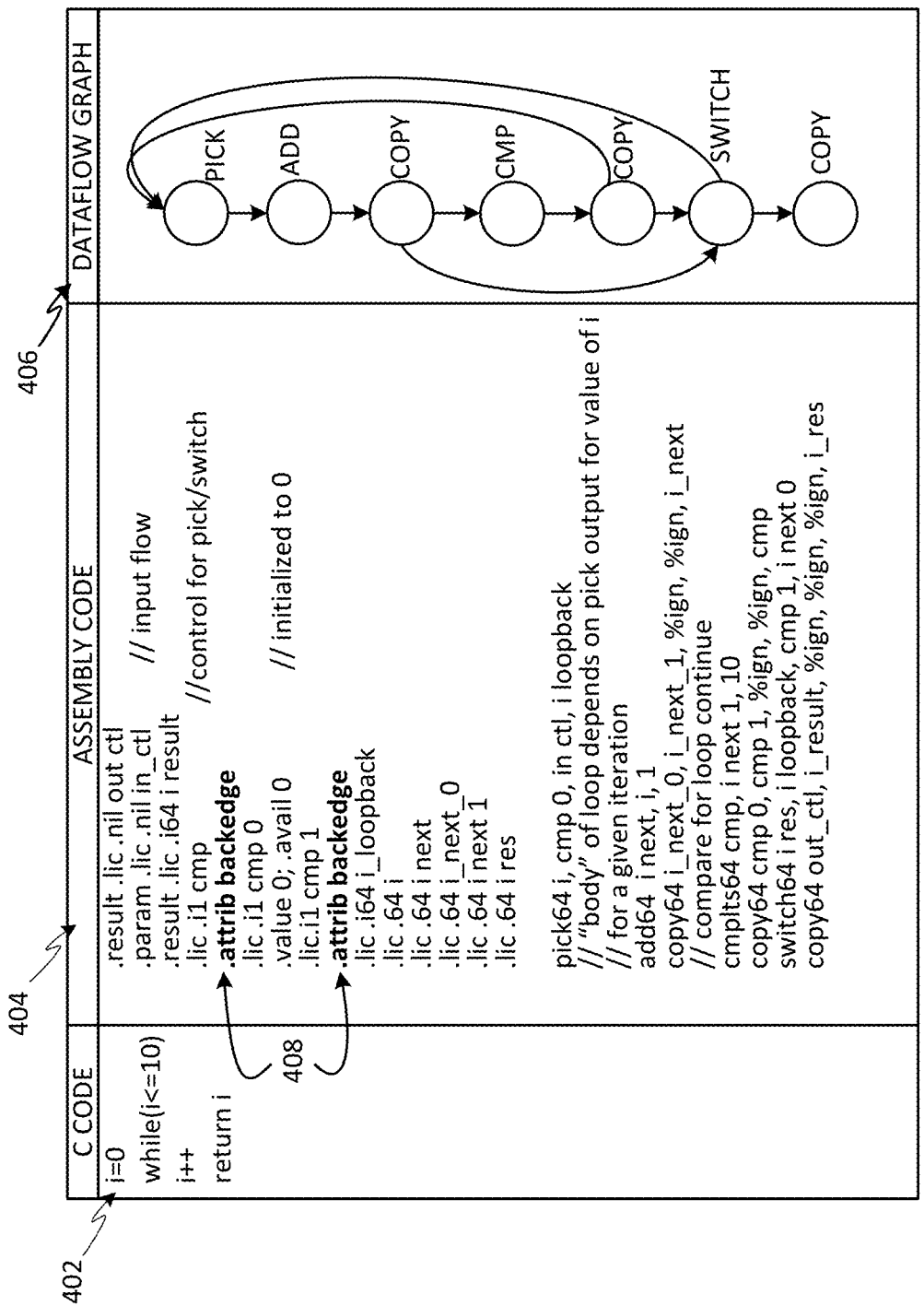
FIG. 4 illustrates example source code in the C programming language, corresponding assembly code, and a corresponding dataflow graph of the operations in the assembly code.

FIG. 4 illustrates example source code 402 in the C programming language for a cyclic computer program containing a while loop, corresponding assembly code 404, and a corresponding cyclic DFG 406 of the operations set forth in the assembly code. The example assembly code 404 is a compiler IR representation. For example, the compiler IR representation may be a machine-specific LLVM IR representation or a general LLVM IR representation. In the example assembly code 404 of FIG. 4, the .lic mnemonic represents a connection arc in the DFG 406, the word next to the .lic mnemonic denotes its type and the next word denotes the name of the .lic mnemonic. A pick operation in the DFG 406 picks between two inputs (e.g., in_ctl and i_loopback in the assembly code 404) based on the value of cmp_0 (in the assembly code 404) which starts with an initial value of 0 and gets a new value based on a loop termination condition comparison (e.g., i<10 or cmplts64 cmp, i_next_1, 10 in the assembly code 404). The add operation in the DFG 406 computes the potential next value of i, and the copy operation in the DFG 406 takes a value and produces multiple copies of its input to feed other operations. The cmp operation of the DFG 406 compares the i_next with the loop boundary 10 (e.g., cmplts64 cmp, I next 1, 10 in the assembly code 404). The result of the cmp operation is copied to two different destinations as values cmp_0 and cmp_1. The cmp_0 value is used to switch the i_next value to i_loopback or to i_result based on the cmplts output which triggers the output signal. As shown in FIG. 4, the while loop of the source code 402 and corresponding loopback instructions of the assembly code 404 result in the DFG 406 containing cycles. Examples disclosed herein provide a buffer insertion solution to insert buffers in cyclic DFGs that contain cycles/loops such as the example DFG 406. Examples disclosed herein improve on prior buffer insertion solutions. For example, prior buffer insertion solutions do not address the problem that when a buffer is inserted in a forward edge of a cycle, such buffer insertion can increase the latency of a corresponding cycle/loop, thus, reducing the overall data throughput of the DFG. Using examples disclosed, buffers can be inserted without reducing data throughput. Instead, example buffer insertion techniques disclosed herein increase data throughput of a DFG.

Still referring to FIG. 4, buffer insertion examples disclosed herein involve annotating backedges in DFGs, as described above in connection with FIG. 1. To perform backedge annotation in accordance with examples disclosed herein, the source code 402 (in a high-level programming language such as the C programming language) can be provided to the compiler 100 of FIG. 1 to generate the corresponding assembly code 404 and DFG 406. The backedge detector 102 of FIG. 1 can then analyze the DFG 406 to annotate backedges. As such, examples disclosed herein enable providing the example compiler 100, which is capable of generating assembly code from a program written in a high-level programming language such as C/C++/Fortran, with capabilities to annotate backedges of cyclic DFGs. In the example of FIG. 4, such backedge annotation can be performed by the backedge detector 102 (FIG. 1) of the compiler 100 inserting a backedge attribute such as ".attrib backedge" 408 preceding an edge declaration in the dataflow assembly code 404.

Examples disclosed herein leverage topology awareness capabilities of the compiler 100 to perform backedge detection and annotation. For example, the compiler 100 has complete topology information of an input program as well as the corresponding dataflow IR because the compiler 100 generates the LLVM IR from the high-level language description of the source code 402. The compiler 100 generates information describing which code belongs to a loop and what interconnect arc represents the backedge in the loop that feeds back a new value for each loop invariant. By leveraging the graph topology information of the compiler 100, as well as loop membership information, examples disclosed herein use such information to enhance capabilities of the compiler 100 to annotate backedges in the generated dataflow code. This provides effective and efficient backedge annotation and buffer insertion solutions in the compiler 100.

By detecting and annotating backedges in cyclic DFGs, examples disclosed herein enable buffer insertion to work on input DFGs that are cyclic and asynchronous. That is, by detecting and annotating backedges in DFGs in accordance with examples disclosed herein, the example compiler 100 (FIG. 1) can convert an input DFG that contains cycles or loops (e.g., the input DFG 126 of FIGS. 1, 2A-2C, and 3A-3C) into an acyclic DFG (e.g., the intermediate DFG 130 of FIG. 1) by removing annotated backedges between child and parent operations. In particular, after the example backedge detector 102 (FIG. 1) annotates backedges in an input cyclic DFG, the example buffer inserter 104 (FIG. 1) converts the input cyclic DFG into an acyclic DFG, and solves the buffer insertion problem for the acyclic DFG using a constraints-based linear programming solver (or any other suitable solver or algorithmic format) while substantially reducing or eliminating a likelihood of adding additional latency in performance-critical loops. Absent examples disclosed herein, prior buffer insertion techniques are unable to optimize many dataflow programs that contain loops and cycles. For example, techniques disclosed herein can be used to latency-balance a DFG of a binary-search program and/or any other program which contains multiple cycles to increase data throughput of such programs.

Figure 5:
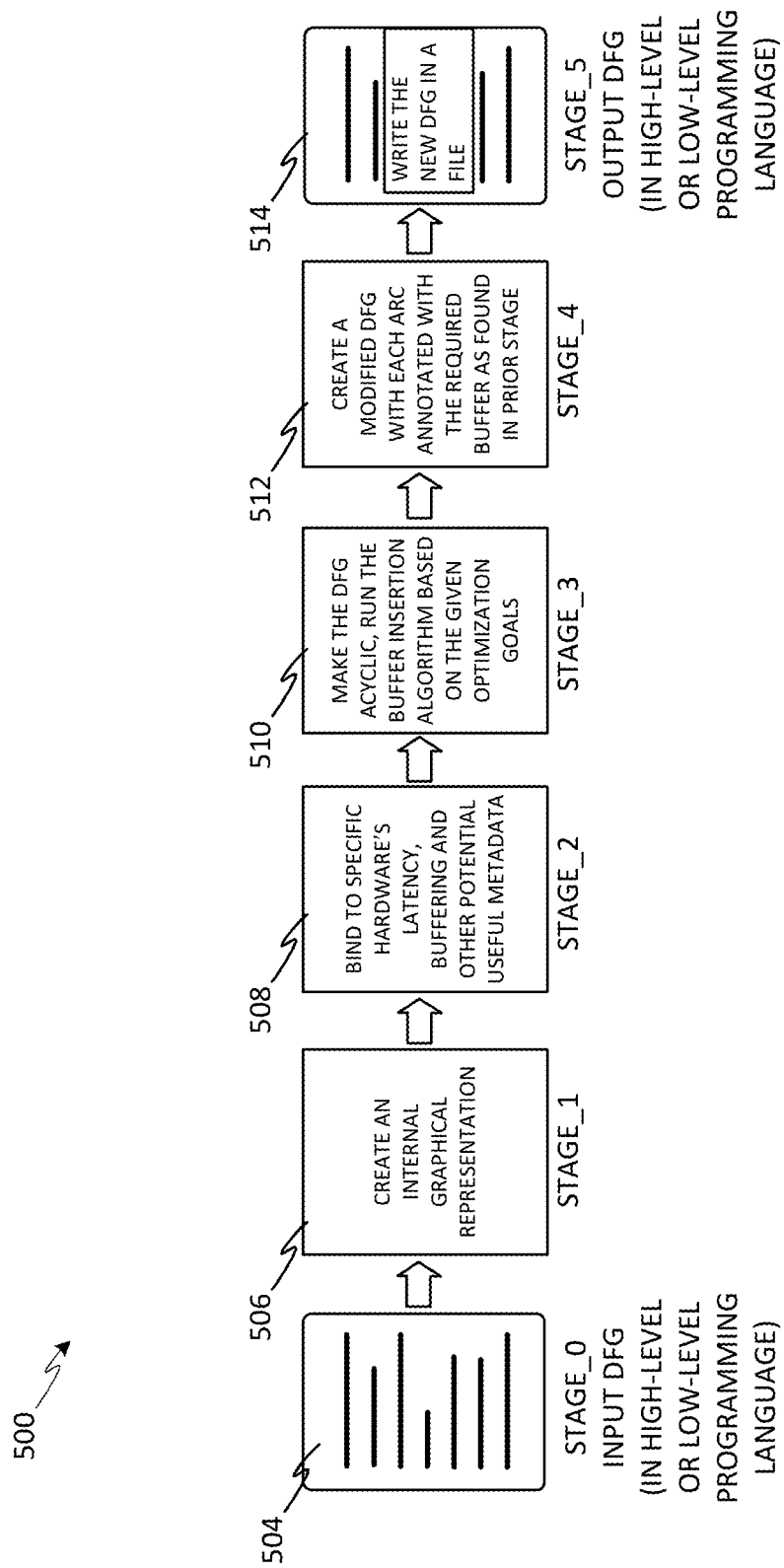
FIG. 5 is an example compiling and optimization workflow of the compiler of FIG. 1.

FIG. 5 represents an example high-level workflow 500 of the compiler 100 of FIG. 1 to compile and optimize DFGs. The example high-level workflow 500 includes backedge detection and annotation examples disclosed herein and buffer insertion examples disclosed herein to increase data throughput of DFGs. The example workflow 500 is implemented by the compiler 100 to latency-balance DFGs by inserting buffers in accordance with algorithm-based processor-implemented analyses disclosed herein to increase data throughput of DFGs. The example workflow 500 includes multiple stages shown as stage_0 504 through stage_5 514. In other examples, the complier 100 may be implemented with fewer or more stages. Also, in other implementations, features shown in FIG. 5 as performed in a particular stage may alternatively be performed in other stages of the workflow 500.

At an example stage_0 504 of FIG. 5, the example compiler 100 receives an input DFG (e.g., the input DFG 126 of FIGS. 1, 2A-2C, and 3A-3C) as a portable assembly representation which is a high-level description of a computer program or compute kernel. The input DFG may be written in or translated from a high-level programming language or a low-level programming language. At an example stage_1 506, the example compiler 100 processes the input DFG to create an internal graphical representation with visually perceivable nodes (e.g., viewable via a graphical user interface) representing operations of the DFG and connection arcs representing paths or edges of data flow between the nodes. Example graphical representations are shown in FIGS. 2A-2C, 3A-3C, and FIG. 5. At an example stage_2 508, the example compiler 100 binds the DFG to specific target hardware (e.g., the CGRA device 142 of FIG. 1) to account for resource characteristics (e.g., quantities and types of PEs, quantities/sizes of storage boxes, latency/buffer characteristics, and/or other metadata pertaining to target device characteristics) of the target hardware. At the example stage_2 508, the compiler 100 labels edges between nodes with hardware-specific characteristics of the target device such as latency and pre-existing buffering (e.g., buffers existing in the original input DFG). At an example stage_3 510, the compiler 100 implements example backedge detection and annotation techniques disclosed herein as well as example buffer insertion techniques disclosed herein. At an example stage_4 512, the compiler 100 produces an optimized, machine-bound DFG (e.g., the output DFG 132 of FIGS. 1, 2A-2C, and 3A-3C) as an output which can be used by subsequent tools of a CGRA development platform. At an example stage_5 514, the compiler 100 generates or writes the output DFG to an output file (e.g., in a high-level programming language or a low-level programming language). In some examples, the output file can be inspected by a programmer.

Examples disclosed herein may be implemented in stage_3 510 of the workflow 500. For example, at stage_3 510, the backedge detector 102 analyzes the input DFG 126 by traversing the DFG 126 to find cycles and identify backedges in those cycles. Example techniques for analyzing the input DFG 126 for detecting and annotating backedges are described below in connection with FIGS. 6-9. Also at stage_3 510, the example buffer inserter 104 breaks cycles in the input DFG 126 by removing the backedges annotated therein by the backedge detector 102 to generate the intermediate DFG 130 of FIG. 1. In addition, the example buffer inserter 104 marks sink nodes of removed backedges as loop start nodes and source nodes of removed backedges as loop end nodes. For example, in the intermediate DFG 130 shown in FIG. 1, the buffer inserter 104 labels node o5 as a loop end node by storing a loop end identifier in the memory 124 in association with the instruction(s) corresponding to the node o5. Similarly, the example buffer inserter 104 labels node o2 as a loop start node by storing a loop start identifier in the memory in association with the instruction(s) corresponding to node o2. The example buffer inserter 104 can run backedge detection analyses using any suitable technique from all unvisited nodes of a DFG to detect backedges for subsequent removal and breaking of simple cycles in the DFG.

Examples disclosed herein may be implemented in connection with other processes that confirm all backedges of a DFG are buffered properly by users or a compiler or a smart code generator. In this manner, cycles in the DFG do not cause deadlock during execution. For purposes of examples disclosed herein, it is assumed that such proper buffering of backedges is confirmed through suitable techniques.

Figure 7:
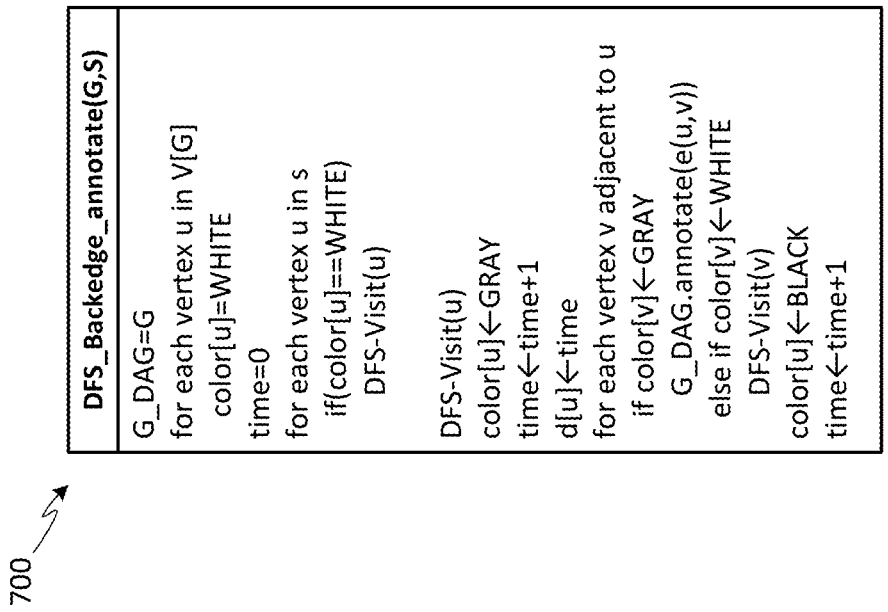
FIG. 7 depicts example pseudocode representing machine-readable instructions that may be executed by a processor to implement a Depth-First Search to detect and annotate backedges in a dataflow graph.
Figure 6:
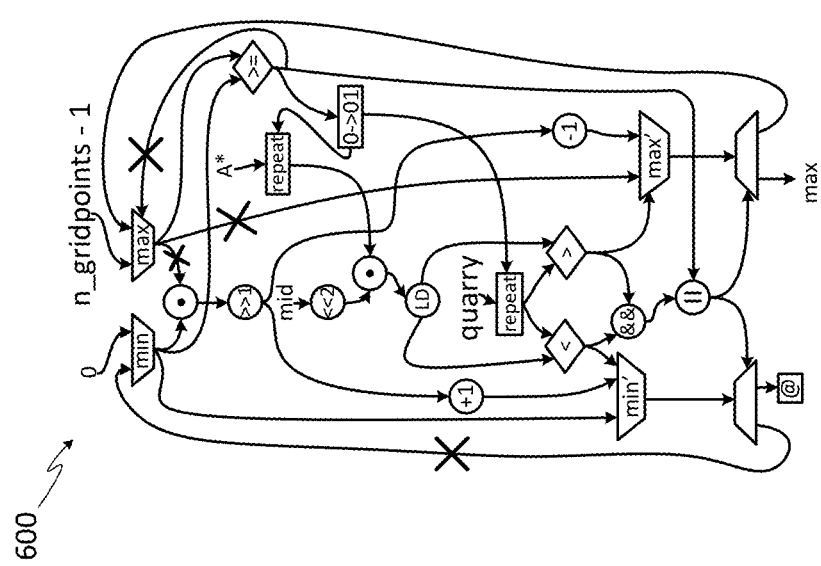
FIG. 6 is a dataflow graph showing backedges annotated using a Depth-First Search technique.

FIG. 6 is an example DFG 600 showing backedges annotated by the example backedge detector 102 of FIG. 1 using a Depth-First Search (DFS) technique. The DFG 600 includes nodes (e.g., vertices) interconnected by connection arcs. FIG. 7 depicts example DFS pseudocode 700 representing computer-readable instructions that may be executed by a processor (e.g., the processor 1412 of FIG. 14) to structure the backedge detector 102 to perform DFS analyses to detect and annotate backedges in DFGs. The example backedge detector 102 performs multiple passes of a DFG during a DFS analysis, and each DFS pass is performed per logical clock cycle of the DFG. For each logical clock cycle, the characteristic detector 106 (FIG. 1) of the backedge detector 102 detects an execution status of each vertex/node of the DFG 600 and tags or labels each vertex/node with a node characteristic identifier indicative of an execution status of that vertex/node. In this manner, the backedge detector 102 can perform comparisons based on node characteristic identifiers and reference criteria to detect where backedges occur at ones of the nodes. For example, the backedge detector 102 can run a DFS analyses in accordance with the DFS pseudocode 700 and color unvisited vertices as white nodes, currently being executed vertices as gray nodes, and finished vertices as black nodes. In the illustrated example, the colors white, gray, and black are used to represent different node characteristic identifiers which include an unexecuted-status identifier, an executing-status identifier, and a completed-status identifier. For example, the color white represents the unexecuted-status identifier to indicate that an unvisited vertex has not yet been executed, the color gray represents the executing-status identifier to indicate that a currently visited node is in the process of being executed, and the color black represents the completed-status identifier to indicate that no further executions of a node are to occur during execution of the DFG. In other examples, other colors or identifying information may be used instead of white, gray, and/or black.

After marking nodes of the DFG 600 with corresponding first node characteristic identifiers during a first logical clock cycle, the backedge detector 102 performs a similar analysis on the nodes to identify their execution statuses as second node characteristic identifiers during a second logical clock cycle. Also at the second logical clock cycle, the example characteristic comparator 108 (FIG. 1) of the backedge detector 102 compares the first node characteristic identifiers identified during the first logical clock cycle with the second node characteristic identifiers of the second logical clock cycle to detect backedges. In the illustrated example, ones of the second node characteristic identifiers set to executing-status identifiers are designated as a reference criterion such that when the characteristic detector 106 detects a node is being executed during the second logical clock cycle and designates that node with an executing-status identifier, the characteristic comparator 108 compares the node characteristic identifier of the previous, first logical clock cycle for that node with the reference criterion (e.g., the executing-status identifier) of that node for the current, second logical clock cycle. In such examples, the characteristic comparator 108 confirms a match when the node characteristic identifier of the previous logical clock cycle for that node is the executing-status identifier, thus matching the reference criterion. That is, when a node is labeled as executing during a previous logical clock cycle, and that node is revisited for execution during a subsequent logical clock cycle, this means that execution control was transferred back to that node via a backedge. A backedge confirmed by the characteristic comparator 108 is represented by a cycle and an edge that goes from a child node to a parent/ancestor node. The backedge identifier generator 110 generates backedge identifiers for backedges confirmed by the characteristic comparator 108, and annotates the backedges in the memory 124 (FIG. 1). For example, the backedge identifier generator 110 stores backedge identifiers (e.g., bit values, string values, mnemonics, etc.) in records or entries or as lines of code corresponding to ones of the connection arcs identified as backedges. An example of a mnemonic-based backedge annotation is the assembly code attribute ".attrib backedge" 408 described above in connection with FIG. 4. In the illustrated example of FIG. 7, the annotation instruction is represented by G_DAG.annotate(e(u,v)). In other examples, in addition to or instead of annotating backedges, the computer-readable instructions represented by the DFS pseudocode 700 of FIG. 7 may directly remove backedges. In such other examples, to remove backedges, the annotation instruction G_DAG.annotate(e(u,v)) may be supplemented with or replaced by a backedge removal instruction G_DAG.remove(e(u,v)).

When the backedge detector 102 is configured to use DFS to detect backedges, the DFS analysis should start from a true source node. If the DFS is not run from a true source node, the DFS analysis may choose a backedge that is not the best backedge to remove from a dataflow program's perspective. For example, referring to the DFG 600 of FIG. 6, which corresponds to a binary-search algorithm, if the backedge detector 102 performs a DFS traversal starting from the "min" node, the crossed-out edges will be identified as backedges and, thus, will be removed by the buffer inserter 104 to make the graph acyclic. The DFS analysis would identify different backedges if the DFS traversal started from the "max" node. To select true source nodes, the backedge detector 102 uses metadata of programs' DFGs to identify true source nodes which are directly connected to external inputs and not dependent on internal inputs from internal nodes.

In some examples, the DFS technique may be combined with Johnson's algorithm, which is a method of finding the shortest paths between pairs of vertices (e.g., nodes) in a sparse, edge-weighted, directed graph (e.g., a DFG). Johnson's algorithm is named after Donald B. Johnson, who published the technique in a journal article titled, "Finding All The Elementary Circuits of a Directed Graph," SIAM J. Comput., Vol. 4, No. 1, March 1975. Using DFS and Johnson's algorithm, the backedge detector 102 (FIG. 1) detects the simple cycles in a DFG and annotates the edges starting at child nodes and ending in parent nodes in DFS order as backedges. Without any topology information of a DFG, a challenge in using the DFS technique is that detecting the minimum number of backedges of the DFG to remove to make the DFG acyclic has been shown to be NP-complete, as discussed above. However, examples disclosed herein overcome such minimal set backedge removal problem by using topology information obtained by the compiler 100 about the source-sink node relationships in input DFGs. In this manner, the backedge detector 102 can annotate backedges between child and parent nodes by implementing the DFS technique based on topologically sorted source nodes inside a cycle.

FIG. 8 depicts example pseudocode 800 of computer-readable instructions that may be executed by a processor (e.g., the processor 1412 of FIG. 14) to structure the backedge detector 102 to perform Breadth-First Search (BFS) analyses to detect and annotate backedges in DFGs. To implement a BFS analysis, the backedge detector 102 starts from a true start node (e.g., a node at which an external input is received and is not dependent on internal inputs from internal nodes). The example characteristic detector 106 (FIG. 1) labels all the nodes of the DFG with characteristic identifiers representing execution depths or hierarchy levels which represent enumerated sequential orders in which the nodes execute. For example, the sequential ordering of execution of the nodes corresponds to a sequential ordering of logical clock cycles at which the nodes undergo their first instances of execution. For example, the characteristic detector 106 labels the true start node with a depth of 0 and all other nodes of the DFG with a node characteristic identifier of infinite. In this example, the node characteristic identifier of infinite is a default reset node characteristic identifier representing that those nodes have not yet been executed. The example characteristic detector 106 traverses the DFG in a level-by-level manner and assigns a depth value (e.g., a node characteristic identifier) to each node based on their earliest discovery time (e.g., the logical clock cycle of their first execution).

After the characteristic detector 106 labels each node with its shortest distance (e.g., depth value) from the source node, the example characteristic comparator 108 (FIG. 1) iterates through all edges of the DFG. The example characteristic comparator 108 determines: (1) if the source node at which an edge starts is a higher depth level node (e.g., a node characteristic identifier) and the sink node at which the edge ends is a lower depth level node (e.g., a node characteristic identifier), and (2) if the sink node of the edge is an ancestor of the source node of the edge. If both are true, the characteristic comparator 108 confirms it has detected a cycle, and the backedge identifier generator 110 (FIG. 1) annotates the corresponding edge as a backedge as described above. In the comparisons performed by the characteristic comparator 108, one of the node characteristic identifiers represents a reference criterion. For example, for an edge between an ancestor node and a child node, if the node characteristic identifier of a higher depth level source node (child node) is the reference criterion, then the characteristic comparator 108 confirms a backedge flowing from the child node to the ancestor node when a comparison confirms that the node characteristic identifier of the lower depth level sink node (ancestor node) is a lower depth value than the depth value of the reference criterion corresponding to the higher depth level sink node (child node). Alternatively, if the node characteristic identifier of a lower depth level source node (ancestor node) is the reference criterion, then the characteristic comparator 108 confirms a backedge flowing from the child node to the ancestor node when a comparison confirms that the node characteristic identifier of the higher depth level source node (child node) is a higher depth value than the depth value of the reference criterion corresponding to the lower depth level sink node (ancestor node). In the illustrated example of FIG. 8, the annotation instruction is represented by G_DAG.annotate(G). In other examples, in addition to or instead of annotating backedges, the computer-readable instructions represented by the pseudocode 800 of FIG. 8 may directly remove backedges. In such other examples, to remove backedges, the annotation instruction G_DAG.annotate(G) may be supplemented with or replaced by a backedge removal instruction G_DAG.remove(G).

FIG. 9 depicts example pseudocode 900 representing computer-readable instructions that may be executed by a processor (e.g., the processor 1412 of FIG. 14) to structure the backedge detector 102 to perform post-order traversal and dominator analyses to detect and annotate backedges in DFGs. In post-order traversal and dominator analysis, the backedge detector 102 (FIG. 1) first traverses a DFG in post-order and finds a dominator set of nodes for each node/vertex. A node 'x' in a DFG dominates a node 'y' if every path from the source node to the node 'y' goes through the node 'x'. The example backedge detector 102 then uses node characteristic identifiers of dominator and dominated nodes to determine when edges between the nodes are backedges. The backedge identifier generator 110 (FIG. 1) annotates the corresponding edge as a backedge as described above.

In other examples, techniques disclosed herein may be implemented in connection with manual backedge annotation. In such examples, programmers manually annotate backedges when they program DFGs in assembly language by inserting backedge identifiers (e.g., backedge attribute mnemonics) in the assembly code of the DFGs. The manually annotated backedges can then be removed by the buffer inserter 104 (FIG. 1) to convert cyclic DFGs into acyclic DFGs. Although manual backedge annotation can be performed, it is more error prone than automatic compiler-implemented techniques and can also be time-consuming. When manual backedge annotation is used, the compiler 100 (FIG. 1) can be used to run backedge detection and annotation to ensure that all backedges are properly annotated so that backedge removal successfully generates an acyclic DFG.

After annotating backedges, the example buffer inserter 104 of FIG. 1 removes the annotated backedges and inserts buffers. That is, after the buffer inserter 104 makes a DFG acyclic by removing backedges from the DFG and marking all loop start nodes and loop end nodes (e.g., as shown in the intermediate DFG 130 of FIG. 1), the buffer inserter 104 solves the buffer insertion problem in the DFG by solving a set of constraint-based linear programming equations representing buffering and latency constraints on each connection arc in the DFG. In other examples, the buffer insertion problem in the DFG may be solved using any other suitable solver or algorithmic format instead of or in addition to constraint-based linear programming.

Example processor-implemented algorithmic techniques that can be implemented by the buffer inserter 104 to insert buffers in DFGs can be based on the following disclosed examples. Table 2 below defines variables of the following example equations.

TABLE 2

Definitions of Buffer Insertion Variables

| Variable | Description |
| --- | --- |
| $u_i$ | Firing time/start time of an operation i |
| $W_{i,j}$ | Latency of an edge e(i, j) |
| $box_{i,j}$ | The number of storage boxes on edge e(i, j) |
| C | Capacity in each storage box, constant |
| k | Latency of each storage box, constant |
| SLACK | A loss term for throughput or a throughput modulation term 0 < SLACK <= 1 |
| $throughput_{i,j}$ | Throughput of edge e(i, j) |
| $hops_{source,sink}$ | Maximum number of arcs/edges that are present in any path from a source to a sink |

In Table 2 above and in examples disclosed herein, the terms buffer and storage box are used interchangeably. In addition, the terms edge, arc, connection arc, and interconnecting arc are used interchangeably. In examples disclosed herein, the dataflow architectures (e.g., CGRA, Intel's CSA, etc.) of target devices (e.g., the CGRA device 142 of FIG. 1) have elastic buffering instead of synchronous buffering. For example, elastic buffering arises when an inserted buffer capacity can be varied relative to latency, while synchronous buffering is directly proportional or fixed to storage box capacity. Examples disclosed herein may be implemented in connection with elastic buffering and/or synchronous buffering. As such, changes in latency are not directly related to changes in capacity/buffering. Also in examples disclosed herein, each buffer resource has a constant k latency, and has a capacity C such that k≤capacity≤C. Also in examples disclosed herein, buffers are inserted only in a discrete size of C, and the buffer size is selectable to be any suitable capacity within the constraint capacity≤C of a storage box. For any acyclic DFG (e.g., a backedge-removed DFG such as the intermediate DFG 130 of FIG. 1), the following equations may be used to implement examples disclosed herein to insert buffers in the DFG.

Latency Equation

If operation j has a dependency on operation i, then the latency constraint for the inter-dependent operations i and j is defined by the latency-constraint equation $u_j \geq W_{i,j} + u_i$. If a quantity of $box_{i,j}$ buffers needs to be added on a connection arc e(i,j) to latency-balance a DFG, and if each buffer has a latency k, the above latency-constraint equation is updated to be $(u_j - u_i) \geq W_{i,j} + k*box_{i,j}$. The per-edge latency constraint is defined as shown in Constraint 1 below for each connection arc/edge.

$$\forall edge(i,j)(u_j - u_i) \geq W_{i,j} + k*box_{i,j} \qquad \text{Constraint 1}$$

Constraint 1 above can be implemented in the example buffer inserter 104 of FIG. 1 to determine quantities of buffers to insert in noncritical paths. For example, the buffer inserter 104 can use the latency calculator 114 and the latency comparator 116 of FIG. 1 to determine the number of buffers to insert into noncritical paths without exceeding a critical path latency of a DFG. In Constraint 1 above, for each edge (∀ edge(i,j)), the difference between start times of operations i and j (($u_j - u_i$)) is greater than or equal to the sum of: (a) the latency of that edge ($W_{i,j}$) and (b) the product of the latency of each buffer and the quantity of buffers on that edge ($k*box_{i,j}$). In examples disclosed herein, the buffer latency (k) of a buffer is one or more logical clock cycles. One or more logical clock cycles is also equal to the latency of a PE of a CGRA device to execute an operation of a node. However, in other examples, a buffer may have a latency less than a logical clock cycle. In some examples (e.g., as is the case in elastic buffering), one or more buffers may be aggregated in a manner that does not increase the latency of the aggregation beyond the latency of a unit single buffer. Such an aggregation may have a latency of one or more logical clock cycles.

Capacity Equation

If the interconnecting arc e(i,j) of operation i and j has a throughput of throughput$_{i,j}$, then according to Little's Law which states throughput=Buffer/Latency, a buffer constraint can be written as shown in Constraint 2 below.

$$\forall edge(i,j) box_{i,j}*C \geq throughput_{i,j}*(u_j-u_i)-capacity_{i,j} \quad \text{Constraint 2}$$

If a target CGRA device does not have enough storage boxes to balance latency in a DFG, the throughput can be slackened by a given SLACK rate. As noted above, the best achievable throughput of a DFG is 1. By slackening, a desired data throughput is adjusted to be less than 1 (e.g., less than one data token per logical clock cycle). As such, the overall capacity of the storage boxes added on a connection arc e(i,j) is configured to tolerate the throughput-modulated latency (e.g., the slackened latency) minus any pre-existing capacity$_{i,j}$ on the connection arc e(i,j). In examples disclosed herein, all edges of a DFG can be slackened uniformly, or slackening can be performed on a per-edge basis such that throughput can be modulated differently across different edges of the DFG. To determine the amount of SLACK to add to a path, the delay generator 120 uses the SLACK constraint as defined in Constraint 3 below.

$$\forall edge(i,j) box_{i,j}*C \geq SLACK*throughput_{i,j}*(u_j-u_i)-capacity_{i,j} \quad \text{Constraint 3}$$

Constraint 3 above can be implemented in the example delay generator 120 to determine an amount of delay or SLACK to configure in noncritical paths. In Constraint 3 above, for each edge ($\forall$ edge(i,j)), a product of the quantity of buffers on an edge and the capacity of each buffer (box$_{i,j}$*C) is greater than or equal to the difference between: (a) the product of a generated delay (SLACK multiplier), the throughput of the edge, and the start time difference between interdependent operations i and j (SLACK*throughput$_{i,j}$* (u$_j$-u$_i$)) and (b) the total capacity of the edge (capacity$_{i,j}$). For example, the total capacity is the capacity sum of any pre-existing storage (e.g., buffer(s)) in the edge and any additional buffer(s) inserted in the edge.

Additionally or alternatively, the example delay generator 120 (FIG. 1) can insert a delay operation in a noncritical path when sufficient buffers are not available for insertion in the noncritical path to increase a similarity between a critical path latency and a noncritical path latency to sufficiently latency-balance the DFG. In such examples, the delay operation can provide the additional latency and capacity that would be provided by an inserted buffer.

Critical Path Latency Constraint

In some examples in which it is desired to increase a latency of the critical path to facilitate latency-balancing a DFG, the example buffer inserter 104 (FIG. 1) finds a solution for u$_i$ such that the longest path latency difference between the source node and the sink node of an edge does not increase the critical path latency of the DFG prior to buffer insertion. If each connection arc on the critical path gets one buffer in the worst case, the maximum increase in latency is defined as hops$_{source,sink}$*k. To have a rough upper bound on how much the critical path latency can be increased, the buffer inserter 104 adds hops$_{source,sink}$*k to the critical path latency. As such, the critical path latency constraint is represented as shown in Constraint 4 below.

$$u_{sink}-u_{source} \leq W_{source,sink}+hops_{source,sink}*k \quad \text{Constraint 4}$$

In Constraint 4 above, the difference between start times of the sink and source nodes (u$_{sink}$-u$_{source}$) is less than or equal to the sum of: (a) the latency of that edge (W$_{source,sink}$) and (b) the product of the maximum number of hops between the sink and source nodes (hops$_{source,sink}$) and the buffer latency (k).

Critical Path Latency Constraint for any I/O Pair

In some examples, a critical path latency constraint per I/O data pair can be performed to facilitate latency-balancing a DFG. A DFG can have multiple inputs and outputs. For each input-output pair in the DFG, the example buffer inserter 104 (FIG. 1) protects against a buffer insertion solution that increases the critical path latency of the DFG in a similar way as described above for the source-sink critical path latency case. As such, to eliminate or substantially decrease the likelihood of increasing a critical path latency in a DFG, the example latency calculator 114 and example latency comparator 116 of FIG. 1 implement the critical path latency constraint of Constraint 5 below.

$$\forall(I,O)u_O-u_I \leq W_{I,O}+hops_{I,O}*k \quad \text{Constraint 5}$$

In Constraint 5 above, for each pair of input data and output data ($\forall$(I, O)), the difference between the start times of consuming input data and producing corresponding output data (u$_O$-u$_I$) at corresponding nodes is less than or equal to the sum of: (a) the latency of the corresponding edge (W$_{I,O}$) and (b) the product of the maximum number of hops between the input-output data pair (hops$_{I,O}$) and the buffer latency (k).

Storage Box Budget Equations

The example buffer allocator 118 (FIG. 1) monitors buffer allocation so that the number of storage boxes on each connection arc is non-negative, and the sum of all storage boxes is within the maximum storage boxes available on the target CGRA device (e.g., the CGRA device 142 of FIG. 1). The buffer allocator 118 uses this storage box quantity constraint as represented in Constraint 6 below.

$$\forall e(i,j) box_{i,j} \geq 0, \forall e(i,j) \Sigma box_{i,j} \leq \text{Max Storage Boxes} \quad \text{Constraint 6}$$

In Constraint 6 above, for each edge ($\forall$ e(i,j)), the number of storage boxes is greater than or equal to zero, and for each edge ($\forall$ e(i,j)), the total quantity of storage boxes on that edge ($\Sigma$box$_{i,j}$) is less than or equal to the maximum quantity of storage boxes (Max Storage Boxes) available on the CGRA device.

Optimization Goal

In some examples, the buffer inserter 104 inserts a quantity of buffers that contribute towards an optimization goal to maximize data throughput of a DFG. An example of such an optimization goal is represented in Equation 1 below.

Optimized DFG
$$\text{Throughput}=\text{Maximize}\Sigma SLACK*throughput_{i,j} \quad \text{Equation 1}$$

In some examples, the buffer inserter 104 can employ other optimization goals in addition to or instead of the above throughput optimization. Examples of other optimization goals include Maximize (minimum (SLACK$_{i,j}$)), where SLACK$_{i,j}$ denotes independent SLACK applied to each edge. If a target CGRA device has unlimited storage, an example optimization goal is to minimize the quantity of storage boxes (minimize$\Sigma$box$_{i,j}$) to not exceed the critical path latency.

The example buffer inserter 104 (FIG. 1) can also implement an iterative slackening approach to buffering a DFG. For example, the delay generator 120 (FIG. 1) starts with a SLACK value 1 and multiplies throughputs of all edges by the SLACK value so that the buffer inserter 104 can determine a buffering solution that minimizes the total buffers inserted in the DFG. If the obtained solution requires more buffers than available, the delay generator 120 decreases the SLACK value (e.g., SLACK=0.9) and repeats the process, until the buffer inserter 104 finds a solution that fits the budget (e.g., maximum available storage boxes) with a maximum possible SLACK value.

Avoiding Latency in Critical Loops

In some examples, adding additional latency to a loop decreases its overall data throughput. To eliminate or substantially decrease the likelihood of adding additional latency to the original cycles, the buffer inserter 104 can be configured to add an additional constraint called Loop Latency Constraint, as represented in Constraint 7 below.

$$\forall (\text{loopStart}, \text{loopEnd}) u_{loopEnd} - u_{loopStart} \le W_{loopStart,loopEnd} + hop_{loopStart,loopEnd} * k * \text{LOOP}_{loopStart,loopEnd}$$ Constraint 7

In Constraint 7 above, for each loop start node and corresponding loop end node, the difference between start times of the loop start and loop end nodes ($u_{loopEnd} - u_{loopStart}$) is less than or equal to the sum of: (a) the latency of that edge ($W_{loopStart,loopEnd}$) and (b) the product of the maximum number of hops between the loop start and loop end nodes ($hops_{loopStart,loopEnd}$) and the buffer latency (k). In Constraint 7, $\text{LOOP}_{loopStart,loopEnd}$ is a modulation term which is set based on the criticality of the loop. If a loop is not on the critical path of the main DFG, the buffer inserter 104 sets a value of $\text{LOOP}_{loopstart,loopEnd} > 1$ which represents that it is permissible to increase latency of the loops of the DFG if it is needed to minimize buffering.

Figure 10:
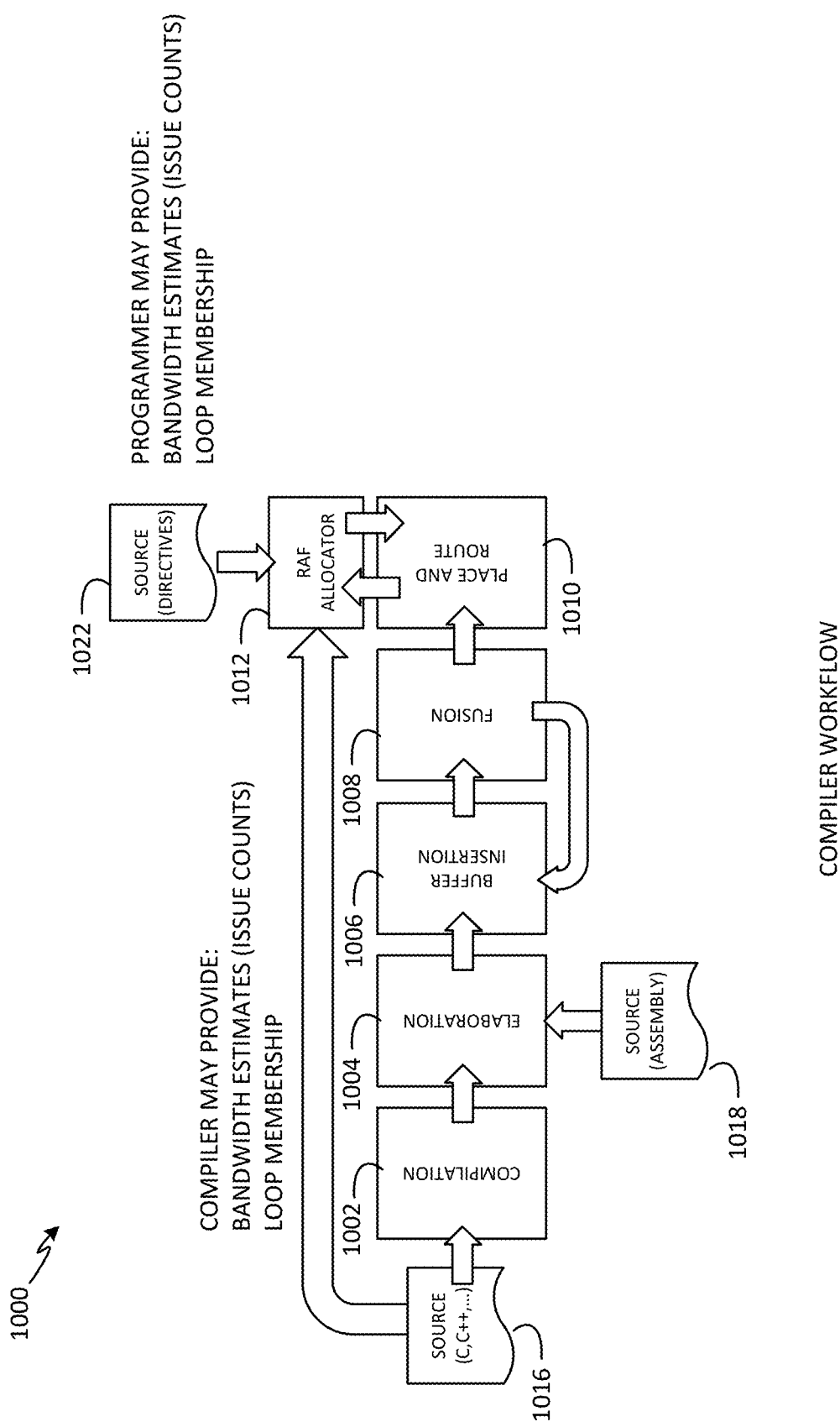
FIG. 10 depicts an example workflow of the compiler of FIG. 1 in which examples disclosed herein may be implemented to latency-balance dataflow graphs for execution on coarse-grain reconfigurable architecture (CGRA) devices.

FIG. 10 depicts an example workflow 1000 of the compiler 100 of FIG. 1 in which examples disclosed herein may be implemented to latency-balance DFGs for execution on CGRA devices (e.g., the CGRA device 142 of FIG. 1). The example compiler 100 includes an example compilation process 1002, an example elaboration process 1004, an example buffer insertion process 1006, an example fusion process 1008, an example place and route process 1010, and an example request address file (RAF) allocator process 1012. The example processes of the workflow 1000 may be implemented by one or more logic circuits and/or one or more processors (e.g., the processor 1412 of FIG. 14). While FIG. 10 shows an example manner of organizing the example workflow 1000, the example processes depicted in FIG. 10 can be reordered, one or more of the processes can be run multiple times in any sequence, one or more of the processes can be omitted, and/or one or more other processes can be inserted.

If the compiler 100 receives a high-level language program 1016, the example compilation process 1002 converts the high-level language program 1016 into a low-level language (e.g., assembly language) for the elaboration process 1004. If the compiler 100 receives a low-level language program 1018, the compilation process 1002 is skipped, and the example elaboration process 1004 directly receives the low-level language program 1018. The example elaboration process 1004 converts low-level language programs into DFGs (e.g., the input DFG 126 of FIGS. 1 and 2A-2C) and generates metadata describing the topology of the DFG. The example buffer insertion process 1006 performs backedge detection and annotation and performs buffer insertion in accordance with teachings of this disclosure to generate output DFGs (e.g., the output DFG 132 (FIGS. 1 and 3A-3C). In the illustrated example, the backedge detector 102 and the buffer inserter 104 of FIG. 1 implement the buffer insertion process 1006.

The example fusion process 1008 fuses, combines, or joins multiple node operations together on one PE of a target device (e.g., the CGRA device 142 of FIG. 1). The example place and route process 1010 loads the output DFG 132 to the resources of the target device and routes interconnections between the resources based on the nodes and connection arcs of the output DFG 132 to execute the output DFG 132. The example RAF allocator process 1012 allocates RAF memory interfaces to resources that need to access memory. In this manner, resources can implement operations of the output DFG 132 that need to read from memory, write to memory, copy between memory locations, etc. As shown in FIG. 10, program directives such as bandwidth estimates (e.g., issue counts) and loop membership designations may be provided by the compiler 100 and/or by a programmer. When provided by the compiler 100, the compiler 100 obtains the directives from input source code and/or generates directives based on its analysis of the input source code. When provided by a programmer, the programmer provides the directives in a source file 1022.

While an example manner of implementing the backedge detector 102 and the buffer inserter 104 are illustrated in FIG. 1, one or more of the elements, processes and/or devices illustrated in FIG. 1 may be combined, divided, re-arranged, omitted, eliminated and/or implemented in any other way. Further, the example characteristic detector 106, the example characteristic comparator 108, the example backedge identifier generator 110, the example backedge filter 112, the example latency calculator 114, the example latency comparator 116, the example buffer allocator 118, the example delay generator 120 and/or, more generally, the example backedge detector 102 and/or the example buffer inserter 104 of FIG. 1 may be implemented by hardware, software, firmware and/or any combination of hardware, software and/or firmware. Thus, for example, any of the example characteristic detector 106, the example characteristic comparator 108, the example backedge identifier generator 110, the example backedge filter 112, the example latency calculator 114, the example latency comparator 116, the example buffer allocator 118, the example delay generator 120 and/or, more generally, the example backedge detector 102 and/or the example buffer inserter 104 could be implemented by one or more analog or digital circuit(s), logic circuits, programmable processor(s), programmable controller(s), graphics processing unit(s) (GPu(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example characteristic detector 106, the example characteristic comparator 108, the example backedge identifier generator 110, the example backedge filter 112, the example latency calculator 114, the example latency comparator 116, the example buffer allocator 118, the example delay generator 120, the example backedge detector 102, and/or the example buffer inserter 104 is/are hereby expressly defined to include a non-transitory computer readable storage device or storage disk such as a memory, a digital versatile disk (DVD), a compact disk (CD), a Blu-ray disk, etc. including the software and/or firmware. Further still, the example backedge detector 102 and/or the example buffer inserter 104 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In examples disclosed herein, the characteristic detector 106 may implement means for storing a node characteristic identifier, the characteristic comparator 108 may implement means for comparing a node characteristic identifier with a reference criterion, the backedge identifier generator 110 may implement means for generating a backedge identifier, the backedge filter 112 may implement means for removing a backedge, the latency calculator 114 may implement means for determining a critical path latency of a critical path of a DFG, the latency comparator 116 may implement means for comparing a critical path latency to a latency sum of a buffer latency and a noncritical path latency, the buffer allocator 118 may implement means for inserting a buffer in a path of a DFG, and the delay generator 120 may implement means for inserting a delay operation in a path of a DFG and/or may implement means for decreasing a target data throughput performance of a DFG (e.g., using a SLACK parameter).

Figure 11:
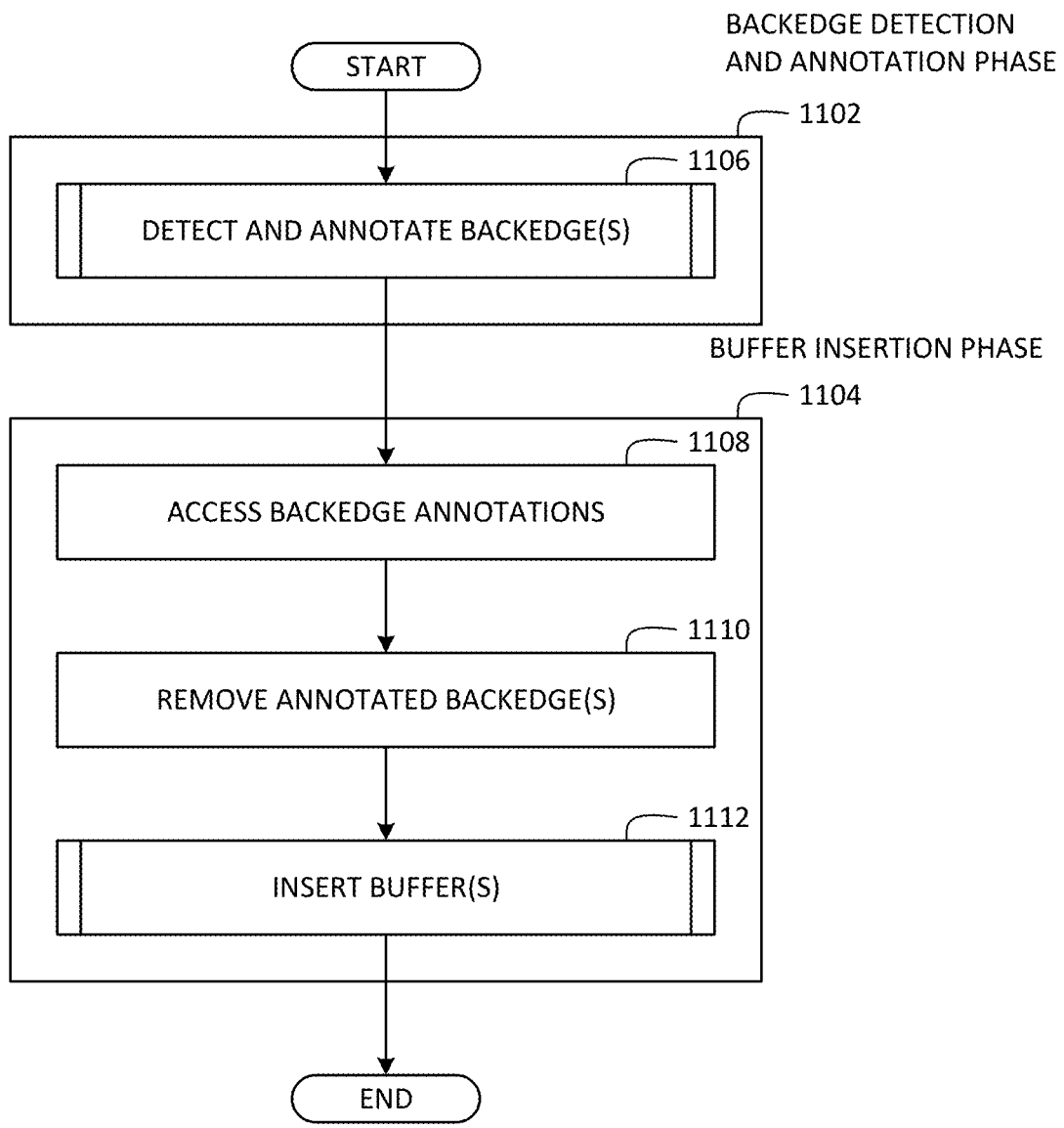
FIG. 11 is a flowchart representative of example machine-readable instructions which may be executed to implement the example compiler of FIG. 1.
Figure 12:
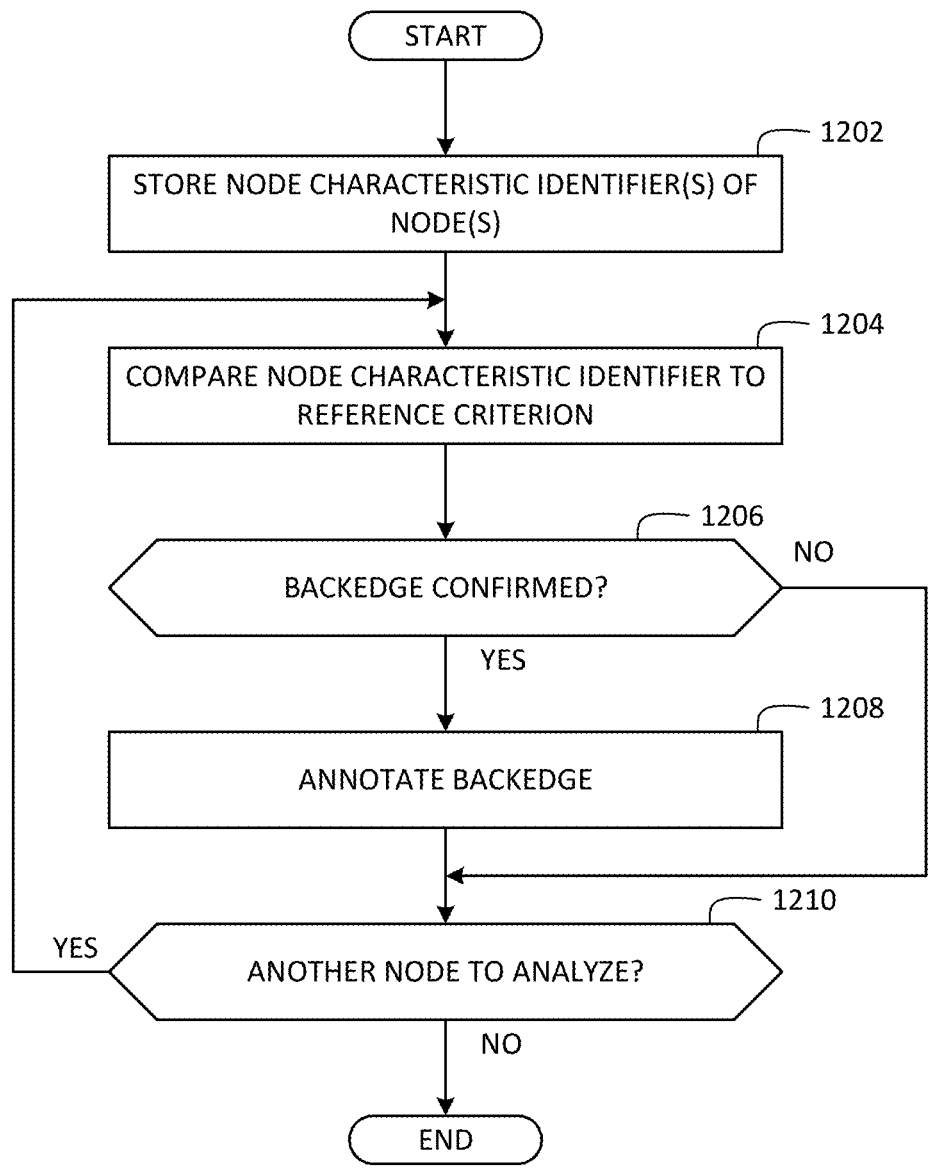
FIG. 12 is a flowchart representative of example machine-readable instructions which may be executed to implement the example backedge detector of FIG. 1 to detect and annotate backedges from dataflow graphs.
Figure 13:
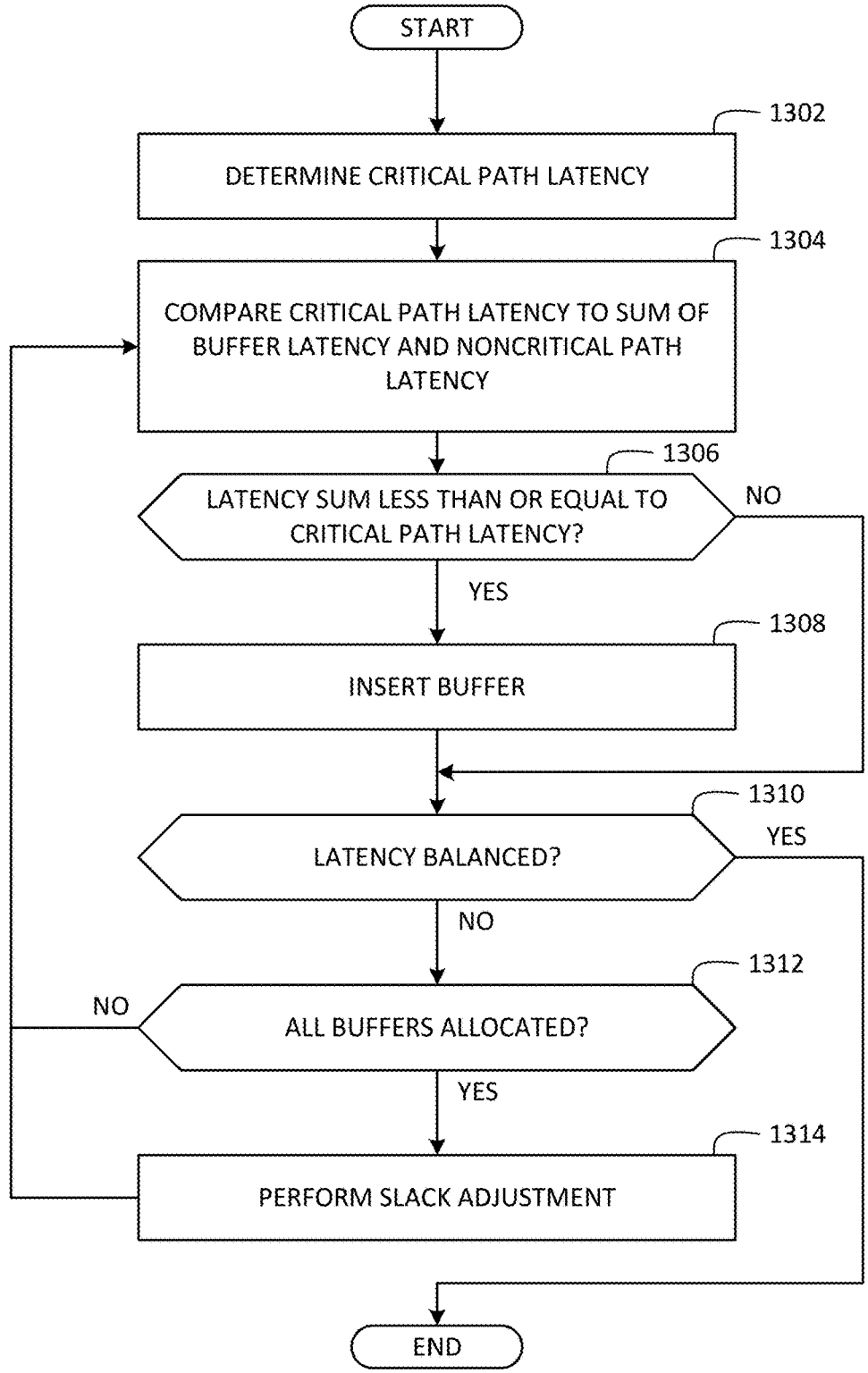
FIG. 13 is a flowchart representative of example machine-readable instructions which may be executed to implement the example buffer inserter of FIG. 1 to insert buffers in dataflow graphs.

Flowcharts representative of example hardware logic, machine readable instructions, hardware implemented state machines, and/or any combination thereof for implementing the example backedge detector 102 and/or the example buffer inserter 104 of FIG. 1 is shown in FIGS. 11-13. The machine readable instructions may be one or more executable programs or portion(s) of one or more executable programs for execution by a computer processor such as the processor 1412 shown in the example processor platform 1400 discussed below in connection with FIG. 14. The program(s) may be embodied in software stored on a non-transitory computer readable storage medium such as a CD-ROM, a floppy disk, a hard drive, a DVD, a Blu-ray disk, or a memory associated with the processor 1412, but the entirety of the program(s) and/or parts thereof could alternatively be executed by a device other than the processor 1412 and/or embodied in firmware or dedicated hardware. Further, although the example program(s) is/are described with reference to the flowcharts illustrated in FIGS. 11-13, many other methods of implementing the example backedge detector 102 and/or the example buffer inserter 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 11-13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 11 is a flowchart representative of example machine-readable instructions which may be executed to implement the example compiler 100 of FIG. 1 to detect and annotate backedges, and insert buffers in DFGs in accordance with teachings of this disclosure. The example flowchart of FIG. 11 includes an example backedge detection and annotation phase 1102 and an example buffer insertion phase 1104. In the illustrated example, the backedge detection and annotation phase 1102 is implemented by the backedge detector 102 of FIG. 1, and the buffer insertion phase 1104 is implemented by the buffer inserter 104 of FIG. 1. The example backedge detection and annotation phase 1102 and the example buffer insertion phase 1104 may be implemented by the same program or by separate programs. In addition, in some examples, the backedge and annotation phase 1102 may be performed without subsequently performing the example buffer insertion phase 1104. For example, the backedge and annotation phase 1102 may be performed to determine where backedges exist in an cyclic DFG and/or to remove such backedges to generate an acyclic DFG without subsequently inserting buffers. In some examples, the example buffer insertion phase 1104 may be performed on a DFG without performing the backedge and annotation phase 1102 on the DFG. For example, if an input DFG is already acyclic, the backedge and annotation phase 1102 does not need to be performed because the input acyclic DFG does not have any backedges that need to be removed.

The example program(s) of FIG. 11 begin(s) at block 1106 of the backedge detection and annotation phase 1102. At block 1106, the example backedge detector 102 (FIG. 1) detects and annotates backedge(s) in an input DFG (e.g., the input DFG 126 of FIG. 1). For example, the backedge detector 102 can analyze the input DFG 126 to identify backedges as described above and annotate backedges in the input DFG 126 by storing backedge identifiers in association with connection arcs of the input DFG 126 in the memory 124 (FIG. 1). An example process that may be used to implement the backedge detection and annotation of block 1106 is described below in connection with FIG. 12.

Turning to the example buffer insertion phase 1104, the backedge filter 112 (FIG. 1) accesses backedge annotations from the memory 124 (block 1108). The example backedge filter 112 removes backedge(s) based on the backedge annotations (block 1110). For example, in the input DFG 126, the backedge filter 112 removes backedge(s) between corresponding source and sink nodes having connection arc(s) annotated with backedge identifier(s) to generate an acyclic DFG as represented by the example intermediate DFG 130 of FIG. 1. Although the backedge removal is shown as part of the buffer insertion phase 1104 in FIG. 11, in other examples, the backedge removal of blocks 1108 and 1110 may instead be implemented in the backedge detection and annotation phase 1102. At block 1112, the example buffer inserter 104 inserts buffer(s) in the DFG. An example process that may be used to implement the buffer insertion of block 1112 is described below in connection with FIG. 12. The example process of FIG. 11 ends.

FIG. 12 is a flowchart representative of example machine-readable instructions which may be executed to implement the example backedge detector 102 of FIG. 1 to detect and annotate backedges from DFGs. The example program of FIG. 12 starts at block 1202 at which the characteristic detector 106 (FIG. 1) stores node characteristic identifier(s) of node(s) in the memory 124 (FIG. 1) association with the node(s). For example, the characteristic detector 106 analyzes nodes of the input DFG 126 using any suitable technique including the example DFS-based techniques described above, the BFS technique described above, the post-order traversal and dominator analysis technique described above, the manual backedge annotation technique described above, or any other suitable technique, and stores corresponding node characteristic identifier(s) in association with the nodes.

In examples in which the backedge detector 102 uses a DFS-based node analysis technique, the characteristic detector 106 sets characteristic identifiers for the nodes of the input DFG 126 for multiple logical clock cycles of the DFG 126 such that each node of the DFG 126 is assigned multiple characteristic identifiers for different execution cycles from the start of execution of the DFG 126 through completion of execution of the DFG 126. In the DFS-based node analysis technique, a node characteristic identifier is settable to: (a) an unexecuted-status identifier to indicate a node has not yet been executed during execution of the DFG, (b) an executing-status identifier indicative of a node being executing during a current logical clock cycle of the DFG, and (c) a completed-status identifier to indicate that no further executions of a node are to occur during execution of the DFG.

In examples in which the backedge detector 102 uses a BFS-based node analysis technique, the characteristic detector 106 sets characteristic identifiers for the nodes of the input DFG 126 based on their execution depth level in the DFG 126 as described above. In other examples that are not DFS-based or BFS-based node analysis techniques, the characteristic detector 106 sets characteristic identifiers for the nodes using any identification suitable for identifying nodes at which backedges occur.

The example characteristic comparator 108 (FIG. 1) compares a node characteristic identifier of a node to reference criterion (block 1204). For example, the characteristic comparator 108 compares the node characteristic identifier of the node o2 of FIGS. 1, 2A-2C, and 3A-3C to a reference criterion to determine whether a backedge connects to the node o2. In the DFS-based node analysis technique, the reference criterion is an executing-status identifier, and the characteristic comparator 108 is to confirm a presence of the backedge at the node o2 when the node characteristic identifier of the node o2 matches the executing-status identifier during two logical clock cycles. That is, during a first logical clock cycle at which the node o2 is first attributed with the executing-status identifier, the characteristic comparator 108 does not confirm a backedge because no node characteristic identifier for the node o2 for a prior logical clock cycle matches the executing-status identifier. However, when the node characteristic identifier for the node o2 is the executing-status identifier at a subsequent logical clock cycle, the characteristic comparator 108 confirms a backedge based on confirming a match between the executing-status identifier of the node o2 during the subsequent logical clock cycle and the executing-status identifier of the node o2 during a previous logical clock cycle. In such examples, the reference criterion is the executing-status identifier attributed to the node o2 during the subsequent logical clock cycle.

In the BFS-based node analysis technique, the reference criterion is a depth level identifier of a source node of an edge. For example, with reference to the input DFG 126 of FIG. 2C, the node characteristic identifier of the node o2 (e.g., a sink node relative to the node o5 along the backedge 128) is a lower depth level identifier, and the reference criterion used by the characteristic comparator 108 is a higher depth level of the node o5 (e.g., a source node relative to the node o2 along the backedge 128). The example characteristic comparator 108 confirms a presence of a backedge based on execution control of the DFG 126 returning from the higher depth level of the node o5 to the lower depth level of the node o2.

When the characteristic comparator 108 confirms a backedge (block 1206), the example backedge identifier generator 110 (FIG. 1) annotates a backedge (block 1208). For example, the backedge identifier generator 110 generates a backedge identifier indicative of a backedge at a connection arc between source and sink nodes of the DFG 126. The example backedge identifier generator 110 can store the backedge identifier in the memory 124 in association with the connection arc between the source and sink nodes.

After annotating the backedge at block 1208, or if the characteristic comparator 108 determines at block 1206 that a backedge is not confirmed, the backedge detector 102 determines whether there is another node to analyze (block 1210). If there is another node of the DFG 126 to analyze, control returns to block 1204. Otherwise, the process of FIG. 12 ends. In addition, control may return to a calling function or process such as the example process of FIG. 11.

FIG. 13 is a flowchart representative of machine-readable instructions which may be executed to implement the example buffer inserter 104 of FIG. 1 to insert buffers in noncritical paths of DFGs without exceeding critical path latencies of the DFGs. The program of FIG. 13 begins at block 1302 at which the example latency calculator 114 (FIG. 1) determines a critical path latency of a DFG. For example, the latency calculator 114 determines the critical path latency of the critical path 204 (FIG. 2A) of the intermediate DFG 130 that includes a loop start node (e.g., the second node o2) and a loop end node (e.g., the fifth node o5) from which a backedge was removed at block 1110 of FIG. 11. In such example, the loop start node receives input data, and the loop end node generates output data associated with the input data of the loop start node because the loop start node is an ancestor of the loop end node along the same edge of the intermediate DFG 130. At block 1304, the example latency comparator 116 (FIG. 1) compares the critical path latency to a latency sum of a buffer latency and a noncritical path latency. For example, the noncritical path latency is the latency of the noncritical path 202 of FIG. 2A. As described above, in examples disclosed herein, a latency sum of a path can also be referred to as a capacity sum of that path. A capacity sum of a path or edge is at least as large as its latency sum because the capacity should be large enough to tolerate the latency (or buffers) in that path. The example latency comparator 116 may perform the comparison of block 1304 in accordance with Constraint 1, Constraint 4, and/or Constraint 5 described above.

If the example latency comparator 116 determines at block 1306 that the latency sum (or capacity sum) is less than or equal to the critical path latency, the example buffer allocator 118 (FIG. 1) inserts a buffer in the noncritical path 202 (block 1308). In other examples, the latency sum comparison and analysis of blocks 1304 and 1306 can be based on inserting multiple buffers into a noncritical path simultaneously (e.g., instead of inserting only one buffer at a time). In such examples, the buffer insertion operation of block 1308 is to insert the same number of multiple buffers as involved in the analysis operations of blocks 1304 and 1306.

After the buffer insertion of block 1308 or if the latency comparator 116 determines at block 1306 that the latency sum is not less than or equal to the critical path latency, the latency comparator 116 determines whether the DFG is substantially latency-balanced (block 1310). For example, the latency comparator 116 may determine that the DFG is substantially latency-balanced when it performs a comparison the critical path latency and the buffered noncritical path latency and the comparison indicates a difference of less than one buffer latency. If the latency comparator 116 determines at block 1310 that the DFG is not latency balanced, the buffer allocator 118 determines whether all buffers available in a target device have been allocated (block 1312). The buffer allocator 118 may determine whether all buffers available in the target device have been allocated based on Constraint 6 above. For example, if the buffer allocation has not reached the maximum storage boxes available in the target CGRA device 142 (FIG. 1), control returns to block 1304 to perform another buffer insertion analysis (e.g., if any remaining latency constraints are not satisfied).

If the buffer allocator 118 determines at block 1312 that all buffers have been allocated, the delay generator 120 (FIG. 2) performs a SLACK adjustment (block 1314). For example, the delay generator 120 performs a SLACK adjustment as described above in connection with Constraint 3 to facilitate latency-balancing the DFG by decreasing a target data throughput to be less than one when insufficient buffers are available on a target device (e.g., the CGRA device 142 of FIG. 1). In examples disclosed herein, slackening at block 1314 can be performed on and applied to all edges uniformly so that all edges of a DFG have the same data throughput (e.g., the throughput of each edge of the DFG is multiplied by the same SLACK multiplier so that the whole DFG is uniformly slackened), or slackening can be performed on a per-edge basis such that data throughput can be modulated differently for different edges of the DFG. After performing the SLACK adjustment at block 1314, control returns to block 1304 to restart the buffer insertion process based on the lower target data throughput. In some examples, the delay generator 120 may additionally or alternatively insert a delay operation in the noncritical path 202 when the buffer allocator 118 determines that another buffer is not available for insertion in the noncritical path 202 to increase a similarity between the critical path latency and the noncritical path latency. When the latency comparator 116 determines at block 1310 that the DFG is latency-balanced, the process of FIG. 13 ends. In addition, control may return to a calling function or process such as the example process of FIG. 11.

Figure 14:
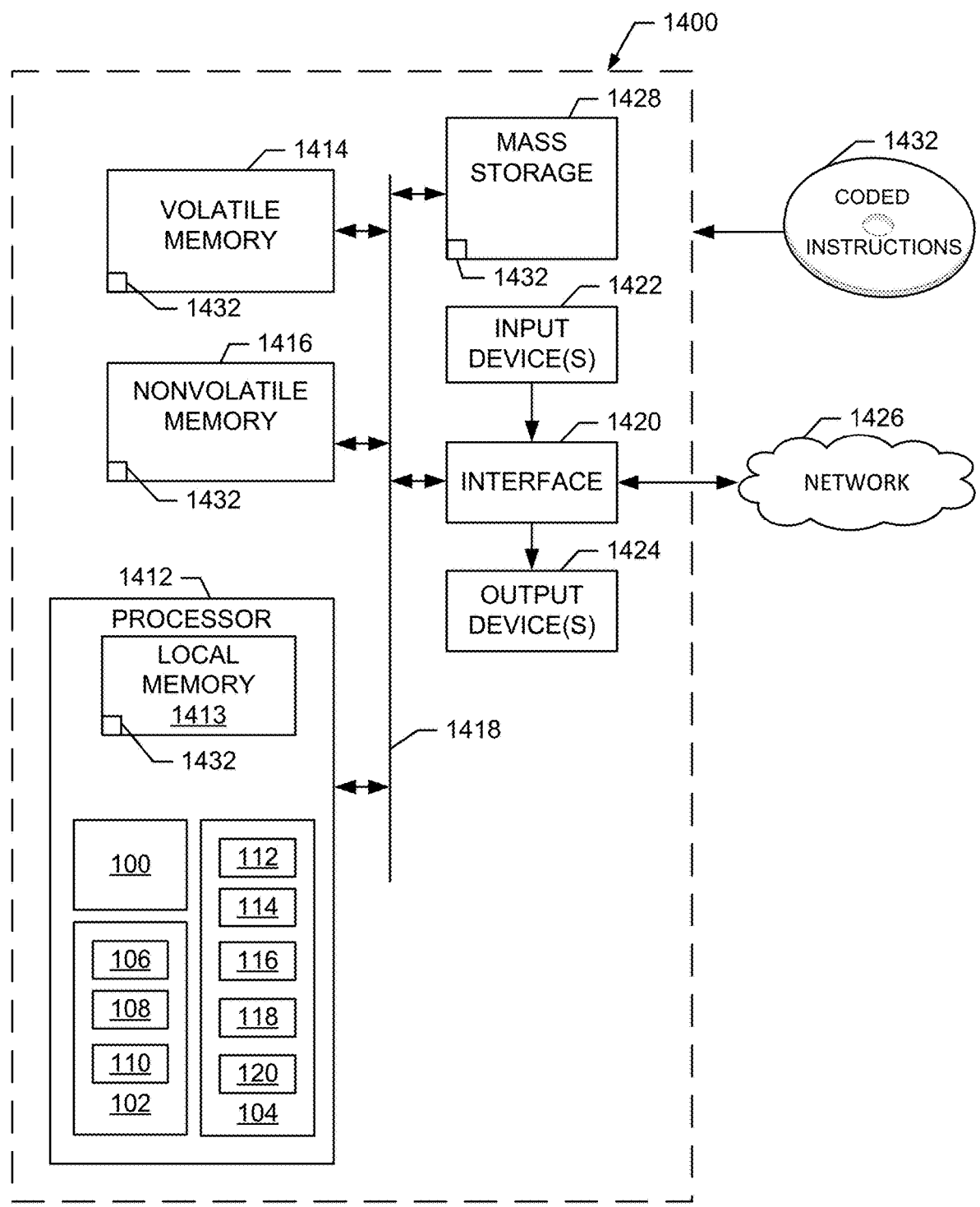
FIG. 14 is a block diagram of an example processing platform structured to execute the instructions of FIGS. 11-13 to implement the example compiler of FIG. 1, the example backedge detector of FIG. 1, and/or the example buffer inserter of FIG. 1.

FIG. 14 is a block diagram of an example processing platform 1400 structured to execute the instructions of FIGS. 11-13 to implement the example compiler 100 of FIG. 1, the example backedge detector 102 of FIG. 1, and/or the example buffer inserter 104 of FIG. 1. The processor platform 1400 can be, for example, a server, a personal computer, a workstation, a self-learning machine (e.g., a neural network), or any other suitable type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPus, DSPs, or controllers from any desired family or manufacturer. The hardware processor 1412 may be a semiconductor based (e.g., silicon based) device. In this example, the processor 1412 implements the example compiler 100, the example backedge detector 102, the example buffer inserter 104, the example characteristic detector 106, the example characteristic comparator 108, the example backedge identifier generator 110, the example backedge filter 112, the example latency calculator 114, the example latency comparator 116, the example buffer allocator 118, and the example delay generator 120.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

Machine executable instructions 1432 represented by the flowcharts of FIGS. 11-13 may be stored in the mass storage device 1428, in the volatile memory 1414, in the non-volatile memory 1416, and/or on a removable non-transitory computer readable storage medium such as a CD or DVD.

Figure 15:
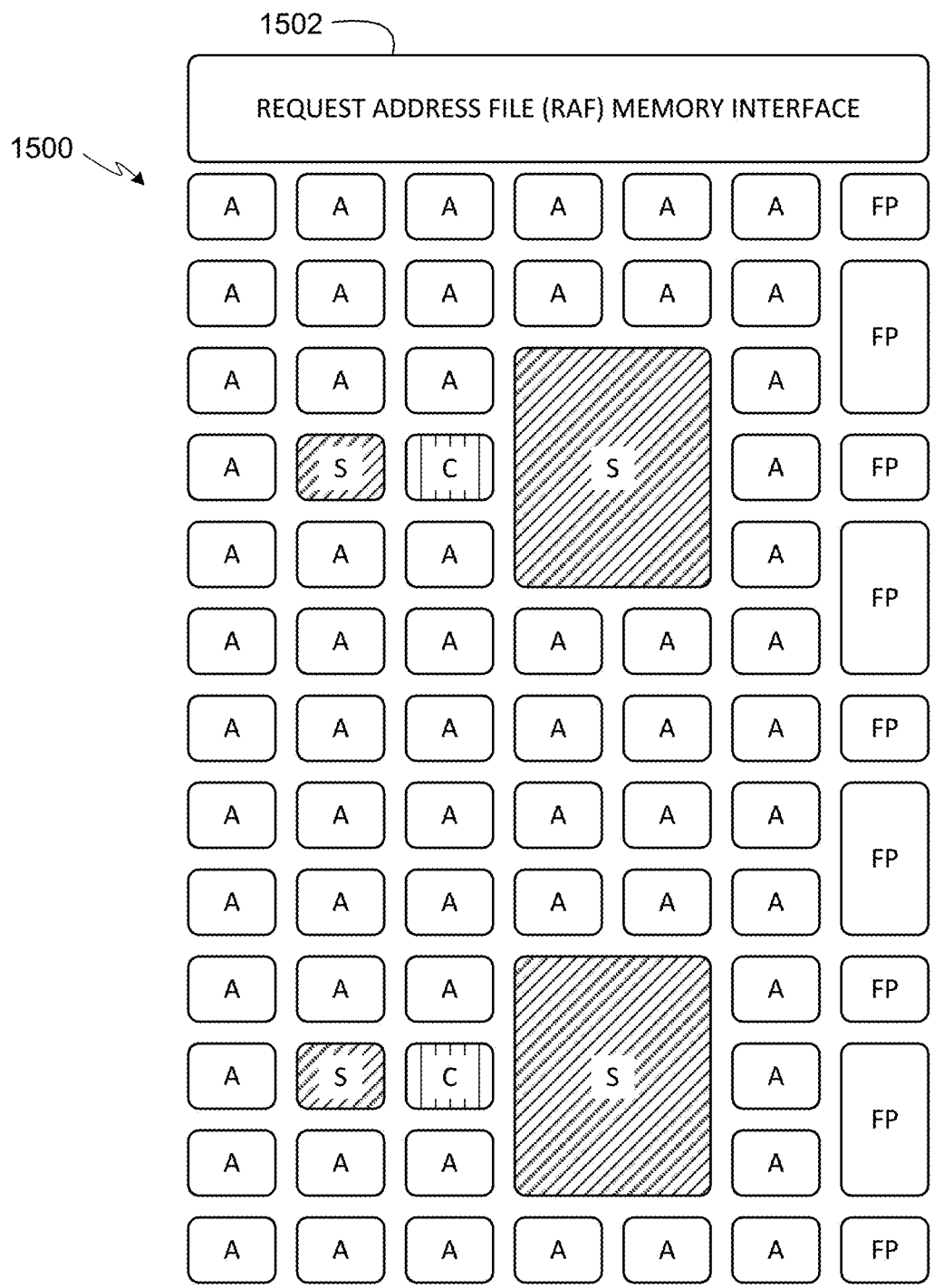
FIG. 15 depicts an example array of processing elements (PEs) of a CGRA device.

FIG. 15 depicts an example array of processing elements (PEs) 1500 of a CGRA device (e.g., the CGRA device 142 of FIG. 1). The example array of PEs 1500 may be programmed to execute DFGs such as the input DFG 126 (FIGS. 1 and 2A-2C) and/or the output DFG 132 (FIGS. 1 and 3A-3C). The example array of PEs 1500 is a heterogenous array in that the PEs are different types of hardware circuits (e.g., logic circuits and/or analog circuits) structured to perform different types of operations of nodes of a DFG. The example array of PEs 1500 may be fabricated on one or more semiconductor substrates. In the example of FIG. 15, ones of the PEs denoted by the letter CA' are integer arithmetic PEs structured to perform operations involving integer calculations, ones of the PEs denoted by the letters 'FP' are floating point arithmetic PEs structured to perform operations involving floating point calculations, ones of the PEs denoted by the letter 'C' are communication PEs structured to perform communication operations to send/receive data within and/or external to the array of PEs 1500, and ones of the PEs denoted by the letter CS' are in-fabric storage PEs (e.g., RAM, SRAM, DRAM, etc.) that implement storage boxes. For example, the in-fabric storage PEs implement buffers inserted in DFGs by the buffer inserter 104 in accordance with teachings of this disclosure.

Figure 16:
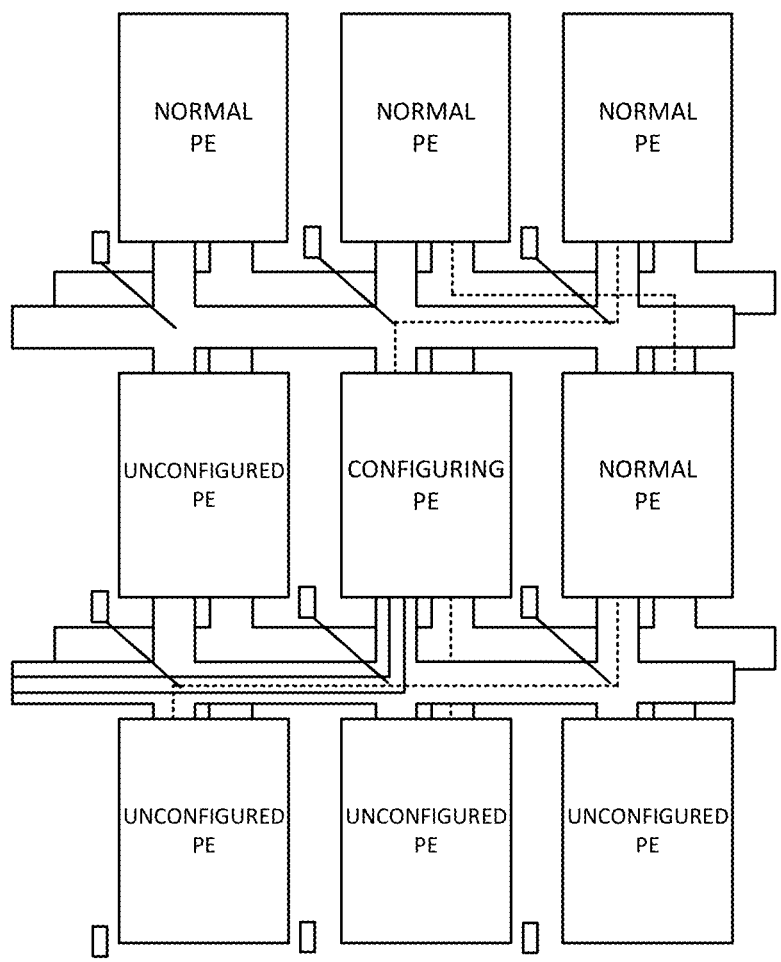
FIG. 16 depicts an enlarged view of the example array of PEs of FIG. 15.

To access memory and/or cache of a CGRA device, the array of PEs 1500 is provided with an example request address file (RAF) memory interface 1502. For example, the RAF memory interface 1502 may be used by the PEs to read external input data into nodes in a DFG from memory and/or cache and/or to write external output data from nodes of the DFG to memory and/or cache. The PEs are connected to one another via in-fabric data buses or channels as shown in FIG. 16 in an enlarged view of the example array of PEs 1500. To configure the PEs to execute a DFG, the place and route process 1010 of FIG. 10 loads or writes code representing the DFG into the array of PEs 1500 to program different types of the PEs corresponding to the different types of operations of the DFG. Producer-consumer paths are routed between the PEs based on the in-fabric data buses or channels shown in FIG. 16. Although only a single array of PEs 1500 is shown in FIG. 15, a CGRA device can be provided with multiple arrays of PEs substantially similar to the array of PEs 1500. Multiple interconnected arrays of PEs may be fabricated on one or more semiconductor substrates.

Additional details of CGRA devices (e.g., CSA devices) are disclosed in U.S. patent application Ser. No. 15/396,402, filed Dec. 30, 2016, and entitled "Processors, Methods, and Systems with a Configurable Spatial Accelerator." U.S. patent application Ser. No. 15/396,402 is incorporated herein by reference in its entirety. Although examples disclosed herein are described in connection with CGRA devices, examples disclosed herein may additionally or alternatively be implemented in connection with other types of devices such as FPGA devices, different types of CGRA architectures, etc.

From the foregoing, it will be appreciated that example methods, apparatus and articles of manufacture have been disclosed that may be used to implement a DFG performance optimization feature of a compiler (e.g., the compiler 100 of FIG. 1) to improve throughput performance of DFGs. For example, to improve throughput performance of DFGs, examples disclosed herein adjust path latencies of noncritical paths to match or be substantially similar to the longest path latency (e.g., a critical path latency) of a DFG by inserting buffers in the noncritical paths. The disclosed methods, apparatus and articles of manufacture are accordingly directed to one or more improvement(s) in the functioning of a computer.

Although prior techniques provide buffer insertion solutions for synchronous dataflow architectures, examples disclosed herein are useful for inserting buffers in DFGs that run on asynchronous CGRA devices. For example, a prior technique by Gao Guang Rong ("Gao's algorithm") seeks to buffer a synchronous acyclic DFG. (Gao's algorithm is described in a paper entitled, "A Pipelined Code Mapping Scheme for Static Data Flow Computers," Massachusetts Institute of Technology, Aug. 28, 1986.) However, Gao's algorithm assumes an unlimited supply of buffering and then tries to minimize buffering in a way that does not increase the critical path latency and constructs final silicon to match buffering requirements. Examples disclosed herein overcome physical constraints of CGRA device chips in which buffer storage is limited. As such, examples disclosed herein are useful to optimize latency while generating an acceptable reduced-performance solution when the limited buffer storage is exhausted. Examples disclosed herein also enable relaxing the critical path latency constraint to be able to fit limited budgets buffer resources while minimizing the overall increase in the critical path latency.

In addition, Gao's algorithm only works for synchronous DFGs that do not have cycles (e.g., directed acyclic graphs). However, many real-world DFGs do contain cycles, especially if there is a while loop or loops with arbitrarily complex inner loop dependency pattern. Therefore, examples disclosed herein are significantly more useful than prior techniques because they latency-balance DFGs that contain cycles. In addition, examples disclosed herein target DFGs that are more complex (e.g., DFGs that contain one or more cycles) than DFGs that can be processed using Gao's algorithm.

In addition, Gao's algorithm assumes a uniform data-rate of 1 and targets a synchronous dataflow architecture. However, examples disclosed herein can be applied to asynchronous dataflow architecture in which each operation can have a variable data rate throughput. Gao's algorithm only works for directed acyclic DFGs. However, examples disclosed herein handle buffer insertion for arbitrary DFGs that may contain cycles or loops.

Examples disclosed herein also consider a fundamentally asynchronous architecture in which the amount of buffering is not necessarily equivalent to the latency of the buffering. However, the prior technique of Gao's algorithm assumes latency is equivalent to buffering, which means if there is one buffer, then that will allow tolerating one unit of latency. In contrast, in DFG structures that may be latency-balanced using examples disclosed herein, buffering is elastic instead of being linear. That is, in examples disclosed herein, changes in latency are not directly related to changes in capacity/buffering. Some examples disclosed herein insert buffers only in certain discrete sizes (e.g., a size defined by capacity 'C'). Such discrete-size storage boxes implement the buffers (e.g., buffer boxes) for insertion in DFGs in accordance with teachings of this disclosure. Each buffer box has a maximum capacity of C and adds a constant latency of k≤C cycles at the point of insertion. The prior technique of Gao's algorithm assumes buffers can be of any arbitrary size and does not have any limit of total buffers being used. Therefore, Gao's algorithm cannot be directly applied to solve a latency-balancing problem intended to a practical solution for executing a DFG on real hardware.

In addition, each connection arc or interconnect in a target CGRA device (e.g., the CGRA device 142 of FIG. 1) has some predetermined constant C capacity. The prior technique of Gao's algorithm does not account for the pre-existing capacity. Thus, it would be pessimistic and an inefficient use of hardware resources to use Gao's algorithm "as is" because it would require inserting more buffers than actually needed. Also, unlike the prior technique of Gao's algorithm, latency-balancing through buffer insertion using examples disclosed herein can be used to increase data throughput performance of a DFG even if such buffering is not necessary to correctly execute the DFG.

Example Performance Results

Examples disclosed herein were tested in a controlled laboratory environment. In particular, the example buffer insertion techniques disclosed herein were implemented using python with networkx and some supplemental linear programming libraries. The input DFG to the examples disclosed herein was a binary search abstract DFG which included several cycles. After creating a graphical representation of the DFG, examples disclosed herein detected, annotated, and removed backedges from the DFG, and created equations to represent the DFG structure, and performed the buffer insertion process in accordance with teachings of this disclosure based on a linear programming solver from cvxpy with a goal to minimize buffers. The output DFG program was run on an Intel CSA device (e.g., a CGRA device) using its cycle-accurate simulator using the following configurations.

Unrealistic default: All edges have a default quantity of 128 storage boxes

Realistic default without BI: All edges have a default depth of three, except 1-bit edges which have a default depth of eight (Buffer Insertion is not used).

Realistic default with BI: All edges have a default depth of three, except 1-bit edges which have a default depth of eight (Buffer Insertion is used).

The test implementation assumed that a maximum of 512 storage boxes, each with a capacity of 32 bits.

Table 3 below shows that the buffer insertion techniques disclosed herein were able to insert buffers in the cyclic DFG and match the unrealistic default performance bound.

TABLE 3

Buffer Insertion in Matching Unrealistic Default Performance Bound

| Statistics | Unrealistic default | Realistic default without BI | Realistic default with BI |
| --- | --- | --- | --- |
| Cycles | 66998 | 710212 | 66634 |
| Buffer boxes | 14 (pre-existing) | 14 (pre-existing) | 31 + 14 |
| #Edges where buffers added | 7 | 7 | 18 + 7 |

Figure 17:
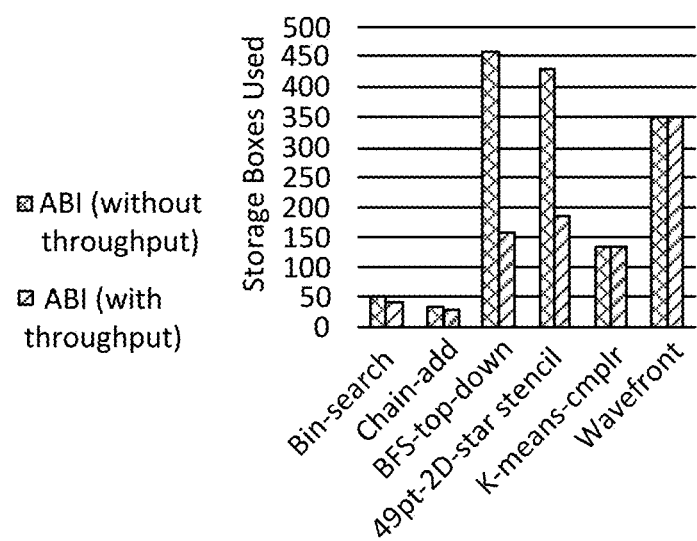
FIG. 17 is an example comparative bar graph comparing storage boxes used by an automatic buffer insertion process implemented in accordance with teachings of this disclosure with and without throughput as a constraint.
Figure 18:
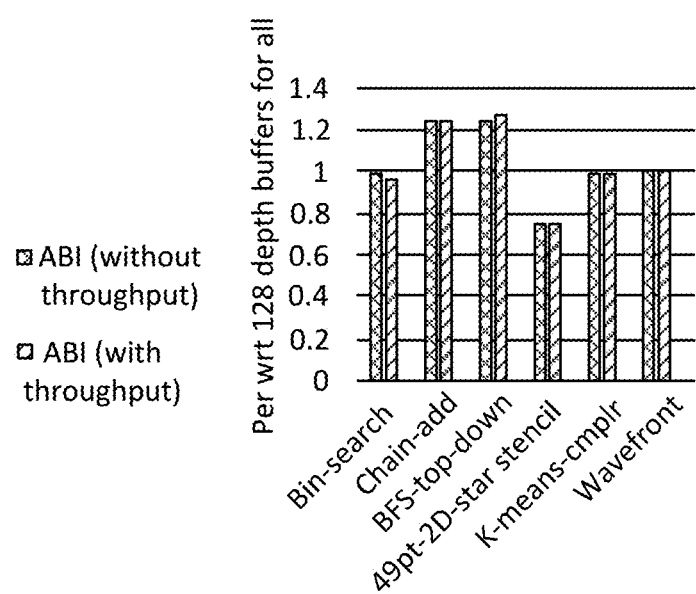
FIG. 18 is an example comparative bar graph comparing performance of a practical dataflow graph to a dataflow graph with unpractically deep 128 depth buffers for all edges when an automatic buffer insertion process is implemented in accordance with teachings of this disclosure with and without throughput as a constraint.

Similar improved trends were observed for other computer kernels. For example, FIG. 17 is an example comparative bar graph comparing storage boxes used by an automatic buffer insertion (ABI) process implemented in accordance with teachings of this disclosure when throughput is used as a constraint to the buffer insertion process and when throughput is not used as a constraint to the buffer insertion process. In addition, FIG. 18 is an example comparative bar graph comparing performance of a practical dataflow graph to a dataflow graph with unpractically deep 128 depth buffers in all interconnecting arcs (e.g., for all edges) when an ABI process implemented in accordance with teachings of this disclosure uses throughput as a constraint and when throughput is not used as a constraint. These results show that example buffer insertion techniques disclosed herein achieve performance close to the 128 buffer depth for a number of other workloads. The results also show that use of throughput as a constraint reduces the number of buffer boxes significantly in some cases.

The following pertain to further examples disclosed herein.

Example 1 is an apparatus to insert buffers in a dataflow graph. The apparatus of Example 1 includes a backedge filter to remove a backedge between a first node and a second node of the dataflow graph, the first node representing a first operation of the dataflow graph, the second node representing a second operation of the dataflow graph; a latency calculator to determine a critical path latency of a critical path of the dataflow graph that includes the first node and the second node, the critical path having a longer latency to completion relative to a second path that terminates at the second node; a latency comparator to compare the critical path latency to a latency sum of a buffer latency and a second path latency, the second path latency corresponding to the second path; and a buffer allocator to insert one or more buffers in the second path based on the comparison performed by the latency comparator.

In Example 2, the subject matter of Example 1 can optionally include that the first node is a source node that generates an output, and the second node is a sink node that executes after the source node and consumes an input.

In Example 3, the subject matter of any one of Examples 1-2 can optionally include that the first node receives input data, and the second node generates output data associated with the input data.

In Example 4, the subject matter of any one of Examples 1-3 can optionally include that the critical path latency is based on having a latency sum greater than the second path latency.

In Example 5, the subject matter of any one of Examples 1-4 can optionally include that the latency comparator is to compare the critical path latency to a second latency sum of the buffer latency, the second path latency, and a second buffer latency; and the buffer allocator is to not insert a second buffer in the second path when the latency comparator determines that the second latency sum exceeds the critical path latency.

In Example 6, the subject matter of any one of Examples 1-5 can optionally include that the backedge forms a loop with the critical path, and the backedge filter is to remove the backedge based on a backedge identifier stored in memory in association with a connection arc between the first node and the second node.

In Example 7, the subject matter of any one of Examples 1-6 can optionally include that the buffer is a storage box in a coarse-grain reconfigurable architecture, and the buffer latency corresponds to a logical clock cycle.

In Example 8, the subject matter of any one of Examples 1-7 can optionally include a delay generator to insert a delay operation in the second path when the buffer allocator determines that a second buffer is not available in a target device for insertion in the second path to increase a similarity between the critical path latency and the second path latency.

In Example 9, the subject matter of any one of Examples 1-8 can optionally include a delay generator to decrease a target data throughput performance of the dataflow graph using a SLACK parameter when a sufficient number of buffers are not available in a target device for insertion in the second path.

In Example 10, the subject matter of any one of Examples 1-9 can optionally include a delay generator to determine a latency on the second path between the first and second nodes by multiplying a multiplier with a throughput of the second path.

In Example 11, the subject matter of any one of Examples 1-10 can optionally include that a number of the one or more buffers inserted in the second path does not exceed a capacity of total buffers available on a target device for the second path.

Example 12 is a non-transitory computer readable storage medium comprising instructions that, when executed by a processor, cause the processor to at least: remove a backedge between a first node and a second node of a dataflow graph, the first node representing a first operation of the dataflow graph, the second node representing a second operation of the dataflow graph; determine a critical path latency of a critical path of the dataflow graph that includes the first node and the second node, the critical path having a longer latency to completion relative to a second path that terminates at the second node; compare the critical path latency to a latency sum of a buffer latency and a second path latency, the second path latency corresponding to the second path; and insert one or more buffers in the second path based on the comparison performed by the latency comparator.

In Example 13, the subject matter of Example 12 can optionally include that the first node is a source node that generates an output, and the second node is a sink node that executes after the source node and consumes an input.

In Example 14, the subject matter of any one of Examples 12-13 can optionally include that the first node receives input data, and the second node generates output data associated with the input data.

In Example 15, the subject matter of any one of Examples 12-14 can optionally include that the critical path latency is based on having a latency sum greater than the second path latency.

In Example 16, the subject matter of any one of Examples 12-15 can optionally include that the instructions, when executed by the processor, are to cause the processor to: compare the critical path latency to a second latency sum of the buffer latency, the second path latency, and a second buffer latency; and determine to not insert a second buffer in the second path when the second latency sum exceeds the critical path latency.

In Example 17, the subject matter of any one of Examples 12-16 can optionally include that the backedge forms a loop with the critical path, and the instructions, when executed by the processor, are to cause the processor to remove the backedge based on a backedge identifier stored in memory in association with a connection arc between the first node and the second node.

In Example 18, the subject matter of any one of Examples 12-17 can optionally include that the buffer is a storage box in a coarse-grain reconfigurable architecture, and the buffer latency corresponds to a logical clock cycle.

In Example 19, the subject matter of any one of Examples 12-18 can optionally include that the instructions, when executed by the processor, are to cause the processor to insert a delay operation in the second path when the buffer allocator determines that a second buffer is not available in a target device for insertion in the second path to increase a similarity between the critical path latency and the second path latency.

In Example 20, the subject matter of any one of Examples 12-19 can optionally include that the instructions, when executed by the processor, are to cause the processor to decrease a target data throughput performance of the dataflow graph using a SLACK parameter when a sufficient number of buffers are not available in a target device for insertion in the second path.

In Example 21, the subject matter of any one of Examples 12-20 can optionally include that the instructions, when executed by the processor, are to cause the processor to determine a latency on the second path between the first and second nodes by multiplying a multiplier with a throughput of the second path.

In Example 22, the subject matter of any one of Examples 12-21 can optionally include that a number of the one or more buffers inserted in the second path does not exceed a capacity of total buffers available on a target device for the second path.

Example 23 is a method to insert buffers in a dataflow graph. The method of Example 23 includes removing a backedge between a first node and a second node of the dataflow graph, the first node representing a first operation of the dataflow graph, the second node representing a second operation of the dataflow graph; determining a critical path latency of a critical path of the dataflow graph that includes the first node and the second node, the critical path having a longer latency to completion relative to a second path that terminates at the second node; comparing the critical path latency to a latency sum of a buffer latency and a second path latency, the second path latency corresponding to the second path; and inserting one or more buffers in the second path based on the comparison performed by the latency comparator.

In Example 24, the subject matter of Example 23 can optionally include that the first node is a source node that generates an output, and the second node is a sink node that executes after the source node and consumes an input.

In Example 25, the subject matter of any one of Examples 23-24 can optionally include that the first node receives input data, and the second node generates output data associated with the input data.

In Example 26, the subject matter of any one of Examples 23-25 can optionally include that the critical path latency is based on having a latency sum greater than the second path latency.

In Example 27, the subject matter of any one of Examples 23-26 can optionally include: comparing the critical path latency to a second latency sum of the buffer latency, the second path latency, and a second buffer latency; and determining to not insert a second buffer in the second path when the second latency sum exceeds the critical path latency.

In Example 28, the subject matter of any one of Examples 23-27 can optionally include that the backedge forms a loop with the critical path, and further include removing the backedge based on a backedge identifier stored in memory in association with a connection arc between the first node and the second node.

In Example 29, the subject matter of any one of Examples 23-28 can optionally include that the buffer is a storage box in a coarse-grain reconfigurable architecture, and the buffer latency corresponds to a logical clock cycle.

In Example 30, the subject matter of any one of Examples 23-29 can optionally include inserting a delay operation in the second path when the buffer allocator determines that a second buffer is not available in a target device for insertion in the second path to increase a similarity between the critical path latency and the second path latency.

In Example 31, the subject matter of any one of Examples 23-30 can optionally include decreasing a target data throughput performance of the dataflow graph using a SLACK parameter when a sufficient number of buffers are not available in a target device for insertion in the second path.

In Example 32, the subject matter of any one of Examples 23-31 can optionally include determining a latency on the second path between the first and second nodes by multiplying a multiplier with a throughput of the second path.

In Example 33, the subject matter of any one of Examples 23-32 can optionally include that a number of the one or more buffers inserted in the second path does not exceed a capacity of total buffers available on a target device for the second path.

Example 34 is an apparatus to insert buffers in a dataflow graph. The apparatus of Example 34 includes means for removing a backedge between a first node and a second node of the dataflow graph, the first node representing a first operation of the dataflow graph, the second node representing a second operation of the dataflow graph; means for determining a critical path latency of a critical path of the dataflow graph that includes the first node and the second node, the critical path having a longer latency to completion relative to a second path that terminates at the second node; means for comparing the critical path latency to a latency sum of a buffer latency and a second path latency, the second path latency corresponding to the second path; and means for inserting one or more buffers in the second path based on the comparison performed by the latency comparator.

In Example 35, the subject matter of Example 34 can optionally include that the first node is a source node that generates an output, and the second node is a sink node that executes after the source node and consumes an input.

In Example 36, the subject matter of any one of Examples 34-35 can optionally include that the first node receives input data, and the second node generates output data associated with the input data.

In Example 37, the subject matter of any one of Examples 34-36 can optionally include that the critical path latency is based on having a latency sum greater than the second path latency.

In Example 38, the subject matter of any one of Examples 34-37 can optionally include that the means for comparing the critical path latency is to: compare the critical path latency to a second latency sum of the buffer latency, the second path latency, and a second buffer latency; and determine not to insert a second buffer in the second path when the latency comparator determines that the second latency sum exceeds the critical path latency.

In Example 39, the subject matter of any one of Examples 34-38 can optionally include that the backedge forms a loop with the critical path, and the means for removing the backedge is to remove the backedge based on a backedge identifier stored in memory in association with a connection arc between the first node and the second node.

In Example 40, the subject matter of any one of Examples 34-39 can optionally include that the buffer is a storage box in a coarse-grain reconfigurable architecture, and the buffer latency corresponds to a logical clock cycle.

In Example 41, the subject matter of any one of Examples 34-40 can optionally include means for inserting a delay operation in the second path when the buffer allocator determines that a second buffer is not available in a target device for insertion in the second path to increase a similarity between the critical path latency and the second path latency.

In Example 42, the subject matter of any one of Examples 34-41 can optionally include means for decreasing a target data throughput performance of the dataflow graph using a SLACK parameter when a sufficient number of buffers are not available in a target device for insertion in the second path.

In Example 43, the subject matter of any one of Examples 34-42 can optionally include means for decreasing a target data throughput to determine a latency on the second path between the first and second nodes by multiplying a multiplier with a throughput of the second path.

In Example 44, the subject matter of any one of Examples 34-43 can optionally include that a number of the one or more buffers inserted in the second path does not exceed a capacity of total buffers available on a target device for the second path.

Example 45 is an apparatus to annotate back edges in a dataflow graph. The apparatus of Example 45 includes a characteristic detector to store a node characteristic identifier in memory in association with a first node of the dataflow graph; a characteristic comparator to compare the node characteristic identifier with a reference criterion; and a backedge identifier generator to generate a backedge identifier indicative of a backedge between the first node and a second node of the dataflow graph based on the comparison, the memory to store the backedge identifier in association with a connection arc between the first and second nodes.

In Example 46, the subject matter of Example 45 can optionally include that the reference criterion is an executing-status identifier, and the characteristic comparator is to confirm a presence of the backedge between the first and second nodes when the node characteristic identifier matches the executing-status identifier, the executing-status identifier indicative of the first node executing during a first logical clock cycle of the dataflow graph, and the characteristic comparator to compare the node characteristic identifier with the reference criterion corresponding to a second logical clock cycle of the dataflow graph.

In Example 47, the subject matter of any one of Examples 45-46 can optionally include that the node characteristic identifier is settable to: (a) an unexecuted-status identifier to indicate the first node has not yet been executed during execution of the dataflow graph, (b) the executing-status identifier, and (c) a completed-status identifier to indicate that no further executions of the first node are to occur during execution of the dataflow graph.

In Example 48, the subject matter of any one of Examples 45-47 can optionally include that the node characteristic identifier is a first depth level identifier of the first node, the reference criterion is a second depth level identifier of the second node, the characteristic comparator is to confirm a presence of the backedge based on execution control returning from a higher depth level corresponding to the second depth level identifier of the second node to a lower depth level corresponding to the first depth level identifier of the first node.

In Example 49, the subject matter of any one of Examples 45-48 can optionally include that the coarse-grain reconfigurable architecture device includes an array of processing elements interconnected by a network, the first node to be executed by a first one of the processing elements, and the second node to be executed by a second one of the processing elements.

In Example 50, the subject matter of any one of Examples 45-49 can optionally include that the characteristic detector, the characteristic comparator, and the backedge identifier generator are to operate in association with a compiler, the compiler to generate the dataflow graph based on source code in at least one of a high-level programming language or assembly programming language.

In Example 51, the subject matter of any one of Examples 45-50 can optionally include that the backedge identifier generator is to generate the backedge identifier as a backedge attribute and to store the backedge attribute in assembly code of the dataflow graph to represent the backedge in the assembly code.

Example 52 is a non-transitory computer readable storage medium comprising instructions that, when executed by a processor, cause the processor to at least: store a node characteristic identifier in memory in association with a first node of the dataflow graph; compare the node characteristic identifier with a reference criterion; and generate a backedge identifier indicative of a backedge between the first node and a second node of the dataflow graph based on the comparison, the memory to store the backedge identifier in association with a connection arc between the first and second nodes.

In Example 53, the subject matter of Example 52 can optionally include that the reference criterion is an executing-status identifier, and the instructions, when executed by the processor, are to cause the processor to: confirm a presence of the backedge between the first and second nodes when the node characteristic identifier matches the executing-status identifier, the executing-status identifier indicative of the first node executing during a first logical clock cycle of the dataflow graph; and compare the node characteristic identifier with the reference criterion corresponding to a second logical clock cycle of the dataflow graph.

In Example 54, the subject matter of any one of Examples 52-53 can optionally include that the node characteristic identifier is settable to: (a) an unexecuted-status identifier to indicate the first node has not yet been executed during execution of the dataflow graph, (b) the executing-status identifier, and (c) a completed-status identifier to indicate that no further executions of the first node are to occur during execution of the dataflow graph.

In Example 55, the subject matter of any one of Examples 52-54 can optionally include that the node characteristic identifier is a first depth level identifier of the first node, the reference criterion is a second depth level identifier of the second node, the instructions, when executed by the processor, are to cause the processor to confirm a presence of the backedge based on execution control returning from a higher depth level corresponding to the second depth level identifier of the second node to a lower depth level corresponding to the first depth level identifier of the first node.

In Example 56, the subject matter of any one of Examples 52-55 can optionally include that the coarse-grain reconfigurable architecture device includes an array of processing elements interconnected by a network, the first node to be executed by a first one of the processing elements, and the second node to be executed by a second one of the processing elements.

In Example 57, the subject matter of any one of Examples 52-56 can optionally include that the instructions are to be executed in association with a compiler, the compiler to generate the dataflow graph based on source code in at least one of a high-level programming language or assembly programming language.

In Example 58, the subject matter of any one of Examples 52-57 can optionally include that the instructions, when executed by the processor, are to cause the processor to generate the backedge identifier as a backedge attribute and to store the backedge attribute in assembly code of the dataflow graph to represent the backedge in the assembly code.

Example 59 is a method to annotate back edges in a dataflow graph. The method of Example 59 includes storing a node characteristic identifier in memory in association with a first node of the dataflow graph; comparing the node characteristic identifier with a reference criterion; and generating a backedge identifier indicative of a backedge between the first node and a second node of the dataflow graph based on the comparison, the memory to store the backedge identifier in association with a connection arc between the first and second nodes.

In Example 60, the subject matter of Example 59 can optionally include that the reference criterion is an executing-status identifier, and further include: confirming a presence of the backedge between the first and second nodes when the node characteristic identifier matches the executing-status identifier, the executing-status identifier indicative of the first node executing during a first logical clock cycle of the dataflow graph; and comparing the node characteristic identifier with the reference criterion corresponding to a second logical clock cycle of the dataflow graph.

In Example 61, the subject matter of any one of Examples 59-60 can optionally include that the node characteristic identifier is settable to: (a) an unexecuted-status identifier to indicate the first node has not yet been executed during execution of the dataflow graph, (b) the executing-status identifier, and (c) a completed-status identifier to indicate that no further executions of the first node are to occur during execution of the dataflow graph.

In Example 62, the subject matter of any one of Examples 59-61 can optionally include that the node characteristic identifier is a first depth level identifier of the first node, the reference criterion is a second depth level identifier of the second node, and further include confirming a presence of the backedge based on execution control returning from a higher depth level corresponding to the second depth level identifier of the second node to a lower depth level corresponding to the first depth level identifier of the first node.

In Example 63, the subject matter of any one of Examples 59-62 can optionally include that the coarse-grain reconfigurable architecture device includes an array of processing elements interconnected by a network, the first node to be executed by a first one of the processing elements, and the second node to be executed by a second one of the processing elements.

In Example 64, the subject matter of any one of Examples 59-63 can optionally include that the storing of the node characteristic identifier, the comparing of the node characteristic identifier with the reference criterion, and the generating of the backedge identifier are to be performed by a compiler, the compiler to generate the dataflow graph based on source code in at least one of a high-level programming language or assembly programming language.

In Example 65, the subject matter of any one of Examples 59-64 can optionally include generating the backedge identifier as a backedge attribute and to store the backedge attribute in assembly code of the dataflow graph to represent the backedge in the assembly code.

Example 66 is an apparatus to annotate back edges in a dataflow graph. The apparatus of Example 66 includes means for storing a node characteristic identifier in memory in association with a first node of the dataflow graph; means for comparing the node characteristic identifier with a reference criterion; and means for generating a backedge identifier indicative of a backedge between the first node and a second node of the dataflow graph based on the comparison, the memory to store the backedge identifier in association with a connection arc between the first and second nodes.

In Example 67, the subject matter of Example 66 can optionally include that the reference criterion is an executing-status identifier, and the means for comparing is to confirm a presence of the backedge between the first and second nodes when the node characteristic identifier matches the executing-status identifier, the executing-status identifier indicative of the first node executing during a first logical clock cycle of the dataflow graph, and the means for comparing is to compare the node characteristic identifier with the reference criterion corresponding to a second logical clock cycle of the dataflow graph.

In Example 68, the subject matter of any one of Examples 66-67 can optionally include that the node characteristic identifier is settable to: (a) an unexecuted-status identifier to indicate the first node has not yet been executed during execution of the dataflow graph, (b) the executing-status identifier, and (c) a completed-status identifier to indicate that no further executions of the first node are to occur during execution of the dataflow graph.

In Example 69, the subject matter of any one of Examples 66-68 can optionally include that the node characteristic identifier is a first depth level identifier of the first node, the reference criterion is a second depth level identifier of the second node, the means for comparing is to confirm a presence of the backedge based on execution control returning from a higher depth level corresponding to the second depth level identifier of the second node to a lower depth level corresponding to the first depth level identifier of the first node.

In Example 70, the subject matter of any one of Examples 66-69 can optionally include that the coarse-grain reconfigurable architecture device includes an array of processing elements interconnected by a network, the first node to be executed by a first one of the processing elements, and the second node to be executed by a second one of the processing elements.

In Example 71, the subject matter of any one of Examples 66-70 can optionally include that the means for storing, the means for comparing, and the means for generating the backedge identifier are to operate in association with a compiler, the compiler to generate the dataflow graph based on source code in at least one of a high-level programming language or assembly programming language.

In Example 72, the subject matter of any one of Examples 66-71 can optionally include that the means for generating the backedge identifier is to generate the backedge identifier as a backedge attribute and to store the backedge attribute in assembly code of the dataflow graph to represent the backedge in the assembly code.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a characteristic detector to store a node characteristic identifier in memory in association with a first node of a dataflow graph;
a characteristic comparator to compare the node characteristic identifier with a reference criterion; and
a backedge identifier generator to:
generate a backedge identifier indicative of a backedge between the first node and a second node of the dataflow graph based on the comparison; and
store the backedge identifier in assembly code of the dataflow graph as a backedge attribute to represent the backedge in the assembly code, the memory to store the backedge identifier in association with a connection arc between the first and second nodes.

2. The apparatus of claim 1, wherein the reference criterion is an executing-status identifier, and the characteristic comparator is to confirm a presence of the backedge between the first and second nodes when the node characteristic identifier matches the executing-status identifier, the executing-status identifier indicative of the first node executing during a first logical clock cycle of the dataflow graph, and the characteristic comparator to compare the node characteristic identifier with the reference criterion corresponding to a second logical clock cycle of the dataflow graph.

3. The apparatus of claim 2, wherein the node characteristic identifier is settable to multiple identifiers including at least one of: (a) an unexecuted-status identifier to indicate the first node has not yet been executed during execution of the dataflow graph, (b) the executing-status identifier, or (c) a completed-status identifier to indicate that no further executions of the first node are to occur during execution of the dataflow graph.

4. The apparatus of claim 1, wherein the node characteristic identifier is a first depth level identifier of the first node, the reference criterion is a second depth level identifier of the second node, the characteristic comparator is to confirm a presence of the backedge based on execution control returning from a higher depth level corresponding to the second depth level identifier of the second node to a lower depth level corresponding to the first depth level identifier of the first node.

5. The apparatus of claim 1, wherein the first node is to be executed by a first processing element, and the second node is to be executed by a second processing element, the first and second processing elements in a coarse-grain reconfigurable architecture device including an array of processing elements interconnected by a network.

6. The apparatus of claim 1, wherein the characteristic detector, the characteristic comparator, and the backedge identifier generator are to operate in association with a compiler, the compiler to generate the dataflow graph based on source code in at least one of a high-level programming language or assembly programming language.

7. A non-transitory computer readable medium comprising instructions that, when executed by a processor, cause the processor to at least:
store a node characteristic identifier in memory in association with a first node of a dataflow graph;
compare the node characteristic identifier with a reference criterion;
generate a backedge identifier indicative of a backedge between the first node and a second node of the dataflow graph based on the comparison; and
store the backedge identifier as a backedge attribute in assembly code of the dataflow graph to represent the backedge in the assembly code, the memory to store the backedge identifier in association with a connection arc between the first and second nodes.

8. The non-transitory computer readable medium of claim 7, wherein the reference criterion is an executing-status identifier, and the instructions, when executed by the processor, are to cause the processor to:
confirm a presence of the backedge between the first and second nodes when the node characteristic identifier matches the executing-status identifier, the executing-status identifier indicative of the first node executing during a first logical clock cycle of the dataflow graph; and
compare the node characteristic identifier with the reference criterion corresponding to a second logical clock cycle of the dataflow graph.

9. The non-transitory computer readable medium of claim 8, wherein the node characteristic identifier is settable to at least one of: (a) an unexecuted-status identifier to indicate the first node has not yet been executed during execution of the dataflow graph, (b) the executing-status identifier, and or (c) a completed-status identifier to indicate that no further executions of the first node are to occur during execution of the dataflow graph.

10. The non-transitory computer readable medium of claim 7, wherein the node characteristic identifier is a first depth level identifier of the first node, the reference criterion is a second depth level identifier of the second node, the instructions, when executed by the processor, are to cause the processor to confirm a presence of the backedge based on execution control returning from a higher depth level corresponding to the second depth level identifier of the second node to a lower depth level corresponding to the first depth level identifier of the first node.

11. The non-transitory computer readable medium of claim 7, wherein the first node is to be executed by a first processing element, and the second node is to be executed by a second processing element.

12. The non-transitory computer readable medium of claim 7, wherein the instructions are to be executed in association with a compiler, the compiler to generate the dataflow graph based on source code in at least one of a high-level programming language or assembly programming language.

13. A method comprising:
storing a node characteristic identifier in memory in association with a first node of a dataflow graph;
comparing the node characteristic identifier with a reference criterion;
generating a backedge identifier indicative of a backedge between the first node and a second node of the dataflow graph based on the comparison; and
storing the backedge identifier in assembly code as a backedge attribute of the dataflow graph to represent the backedge in the assembly code, the memory to store the backedge identifier in association with a connection arc between the first and second nodes.

14. The method of claim 13, wherein the reference criterion is an executing-status identifier, and the method further including:
confirming a presence of the backedge between the first and second nodes when the node characteristic identifier matches the executing-status identifier, the executing-status identifier indicative of the first node executing during a first logical clock cycle of the dataflow graph; and comparing the node characteristic identifier with the reference criterion corresponding to a second logical clock cycle of the dataflow graph.

15. The method of claim 14, wherein the node characteristic identifier is settable to: (a) an unexecuted-status identifier to indicate the first node has not yet been executed during execution of the dataflow graph, (b) the executing-status identifier, and (c) a completed-status identifier to indicate that no further executions of the first node are to occur during execution of the dataflow graph.

16. The method of claim 13, wherein the node characteristic identifier is a first depth level identifier of the first node, the reference criterion is a second depth level identifier of the second node, the method further including confirming a presence of the backedge based on execution control returning from a higher depth level corresponding to the second depth level identifier of the second node to a lower depth level corresponding to the first depth level identifier of the first node.

17. The method of claim 13, further including executing the first node by a first processing element, and executing the second node by a second processing element, the first and second processing elements in a coarse-grain reconfigurable architecture device including an array of processing elements interconnected by a network.

18. The method of claim 13, wherein the storing of the node characteristic identifier, the comparing of the node characteristic identifier with the reference criterion, and the generating of the backedge identifier are to be performed by a compiler, the compiler to generate the dataflow graph based on source code in at least one of a high-level programming language or assembly programming language.

19. An apparatus comprising:
means for storing a node characteristic identifier in memory in association with a first node of a dataflow graph;
means for comparing the node characteristic identifier with a reference criterion; and
means for generating a backedge identifier to:
generate the backedge identifier indicative of a backedge between the first node and a second node of the dataflow graph, and
store the backedge identifier in assembly code of the dataflow graph as a backedge attribute to represent the backedge in the assembly code, the memory to store the backedge identifier in association with a connection arc between the first and second nodes.

20. The apparatus of claim 19, wherein the reference criterion is an executing-status identifier, and the means for comparing is to confirm a presence of the backedge between the first and second nodes when the node characteristic identifier matches the executing-status identifier, the executing-status identifier indicative of the first node executing during a first logical clock cycle of the dataflow graph, and the means for comparing is to compare the node characteristic identifier with the reference criterion corresponding to a second logical clock cycle of the dataflow graph.

21. The apparatus of claim 20, wherein the node characteristic identifier is settable to multiple identifiers including at least one of: (a) an unexecuted-status identifier to indicate the first node has not yet been executed during execution of the dataflow graph, (b) the executing-status identifier, or (c) a completed-status identifier to indicate that no further executions of the first node are to occur during execution of the dataflow graph.

22. The apparatus of claim 19, wherein the node characteristic identifier is a first depth level identifier of the first node, the reference criterion is a second depth level identifier of the second node, the means for comparing is to confirm a presence of the backedge based on execution control returning from a higher depth level corresponding to the second depth level identifier of the second node to a lower depth level corresponding to the first depth level identifier of the first node.

23. The apparatus of claim 19, wherein the first node is to be executed by a first processing element, and the second node is to be executed by a second processing element, the first and second processing elements in a coarse-grain reconfigurable architecture device including an array of processing elements interconnected by a network.

24. The apparatus of claim 19, wherein the means for storing, the means for comparing, and the means for storing the backedge identifier are to operate in association with a compiler, the compiler to generate the dataflow graph based on source code in at least one of a high-level programming language or assembly programming language.

* * * * *

UNITED STATES PATENT AND TRADEMARK OFFICE
CERTIFICATE OF CORRECTION

PATENT NO. : 11,029,927 B2  
APPLICATION NO. : 16/370935  
DATED : June 8, 2021  
INVENTOR(S) : Kermin E. ChoFleming, Jr. et al.

Page 1 of 1

It is certified that error appears in the above-identified patent and that said Letters Patent is hereby corrected as shown below:

In the Claims

Column 46, Line 24 (Claim 9): Delete "and"

Signed and Sealed this  
Fifth Day of July, 2022

Katherine Kelly Vidal  
*Director of the United States Patent and Trademark Office*